United States Patent
Miyashita et al.

(10) Patent No.: US 7,170,929 B2
(45) Date of Patent: *Jan. 30, 2007

(54) DIGITAL SIGNAL TRANSMISSION SYSTEM AND METHOD OF DISPLAYING TRANSMISSION CONDITION IN DIGITAL SIGNAL TRANSMISSION SYSTEM

(75) Inventors: Atsushi Miyashita, Tokorozawa (JP); Yoshikatsu Wagatsuma, Kodaira (JP); Hiroyuki Takesue, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/103,621

(22) Filed: Apr. 12, 2005

(65) Prior Publication Data

US 2005/0190830 A1    Sep. 1, 2005

Related U.S. Application Data

(63) Continuation of application No. 09/814,133, filed on Mar. 22, 2001, now Pat. No. 6,912,247.

(30) Foreign Application Priority Data

| Mar. 23, 2000 | (JP) | ............................. 2000-081475 |
| Aug. 28, 2000 | (JP) | ............................. 2000-256816 |
| Sep. 13, 2000 | (JP) | ............................. 2000-278711 |

(51) Int. Cl.
    *H04B 3/46* (2006.01)
(52) U.S. Cl. ...................... 375/228; 375/316
(58) Field of Classification Search ................ 375/228; 348/554, 614; 324/121 R, 76.14; 345/440; 370/480; 73/628; 434/218

See application file for complete search history.

(56) References Cited

U.S. PATENT DOCUMENTS 4,740,841 A    4/1988    Slavin ........................ 348/186

(Continued)

FOREIGN PATENT DOCUMENTS

JP    09-247128    *    9/1997

(Continued)

OTHER PUBLICATIONS

De-skewing and comparing Waveforms; "www.lecroy.com/tm/library/LABs/LAB724/default.asp"; LeCroy, Digital Oscilloscopes; Technical Library; Lab Breifs; pp. 1-3.*

(Continued)

*Primary Examiner*—Tesfaldet Bocure
*Assistant Examiner*—Sudhanshu C. Pathak
(74) *Attorney, Agent, or Firm*—Mattingly, Stanger, Malur & Brundidge, P.C.

(57) ABSTRACT

A digital signal transmission system using a digital modulation system comprising a digital signal transmitter having a first digital signal processing unit and a digital signal receiver receiving a digital signal from the transmitter, wherein the digital signal receiver comprising a second digital signal processing unit for processing the digital signal from the transmitter and outputting a digital demodulated signal and a correlation value signal, a signal converter coupled with the second digital signal processing unit and supplied the correlation value signal therefrom for generating a waveform indicating a transmission condition including a main wave in response to the correlation value signal, and a display coupled with the signal converter for displaying the waveform indicating a transmission condition in the digital transmission system.

6 Claims, 66 Drawing Sheets

U.S. PATENT DOCUMENTS

| | | | | |
|---|---|---|---|---|
| 4,951,263 | A | | 8/1990 | Shope ............................ 367/2 |
| 5,089,892 | A | * | 2/1992 | Koguchi et al. ............. 348/614 |
| 5,237,416 | A | * | 8/1993 | Ito et al. ...................... 348/614 |
| 5,461,921 | A | * | 10/1995 | Papadakis et al. ............ 73/628 |
| 5,807,113 | A | * | 9/1998 | Groeber ....................... 434/218 |
| 5,808,464 | A | * | 9/1998 | Natori et al. ............ 324/121 R |
| 5,946,350 | A | | 8/1999 | Uesugi ........................ 375/233 |
| 6,229,536 | B1 | * | 5/2001 | Alexander et al. ........ 345/440.1 |
| 6,381,251 | B1 | * | 4/2002 | Sano et al. .................. 370/480 |
| 6,433,832 | B2 | * | 8/2002 | Watanabe et al. ........... 348/554 |
| 6,459,724 | B1 | | 10/2002 | Yoneyama .................. 375/150 |
| 6,541,950 | B2 | * | 4/2003 | Townsend et al. ....... 324/76.14 |
| 6,912,247 | B2 | * | 6/2005 | Miyashita et al. .......... 375/228 |
| 2001/0028409 | A1 | * | 10/2001 | Watanabe et al. ........... 348/554 |

FOREIGN PATENT DOCUMENTS

JP 9247128 9/1997

OTHER PUBLICATIONS

Making PRML Measurements with Digital Oscilloscopes; "www.lecroy.com/tm/library/AppNotes/PRMLMeas/default.asp"; LeCroy, Digital Oscilloscopes; Technical Library; Applications Notes; pp. 1-8.*

De-skewing andn comparing Waveforms; www.lecroy.com/tm/library/LABs/LAB724/default.asp; LeCroy, Digital Oscilloscopes; Technical Library; Lab Breifs; pp. 1-3.

Making PRML Measuremets with Digital Oscilloscopes; www.lecroy.com/tm/library/AppNotes/PRMLMeas/default.asp;LeCroy, Digital Oscilloscopes; Technical Library; Applications Notes; pp. 1-8.

* cited by examiner

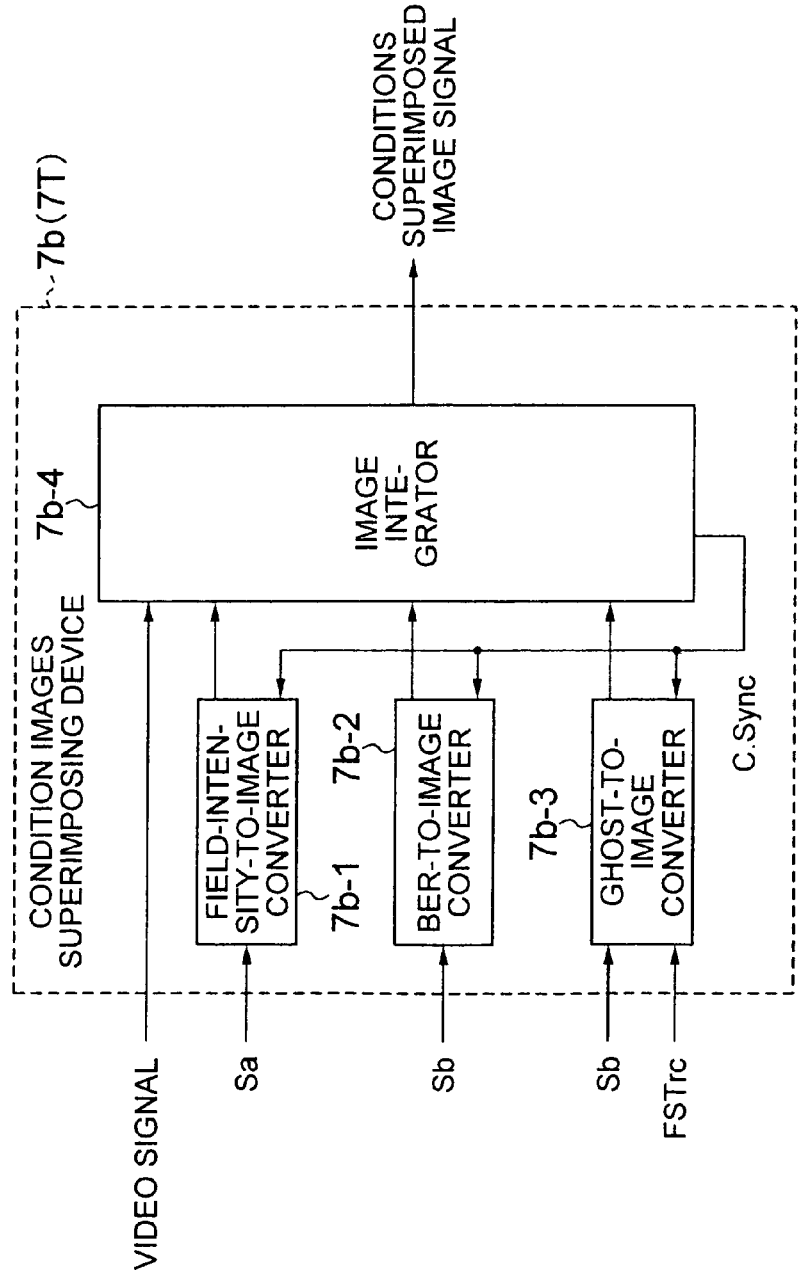

FIG. 17
PRIOR ART
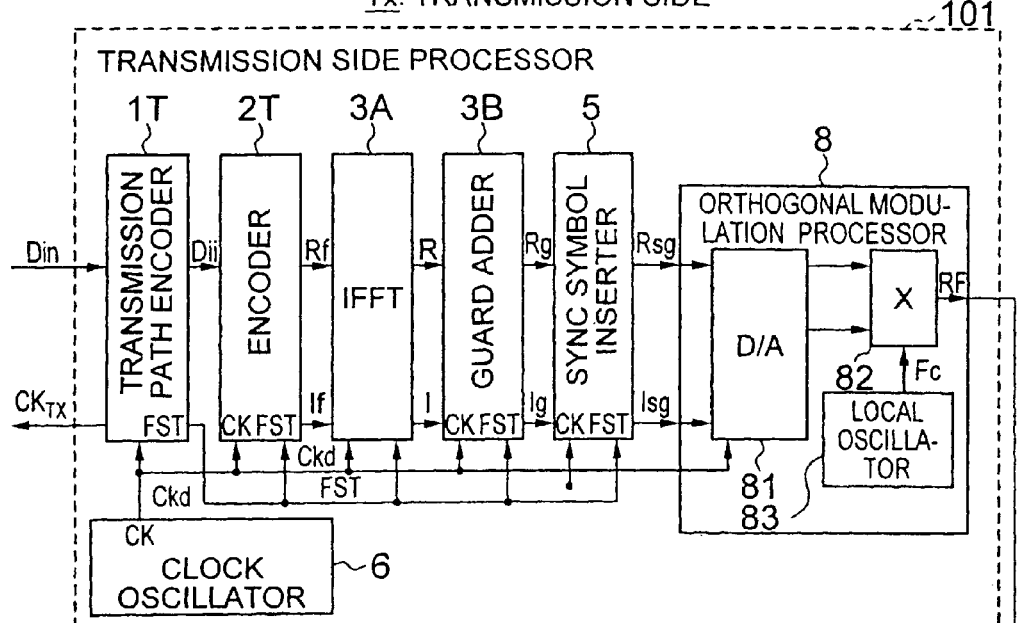
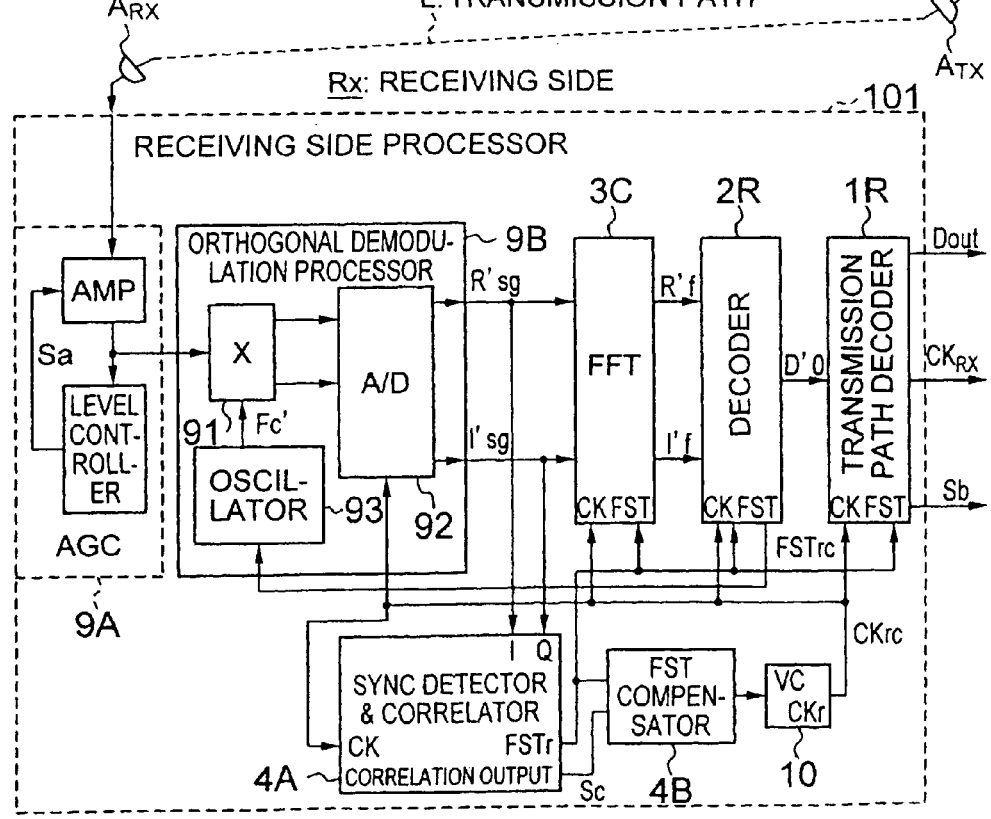

GUARD INTERVAL

GUARD INTERVAL

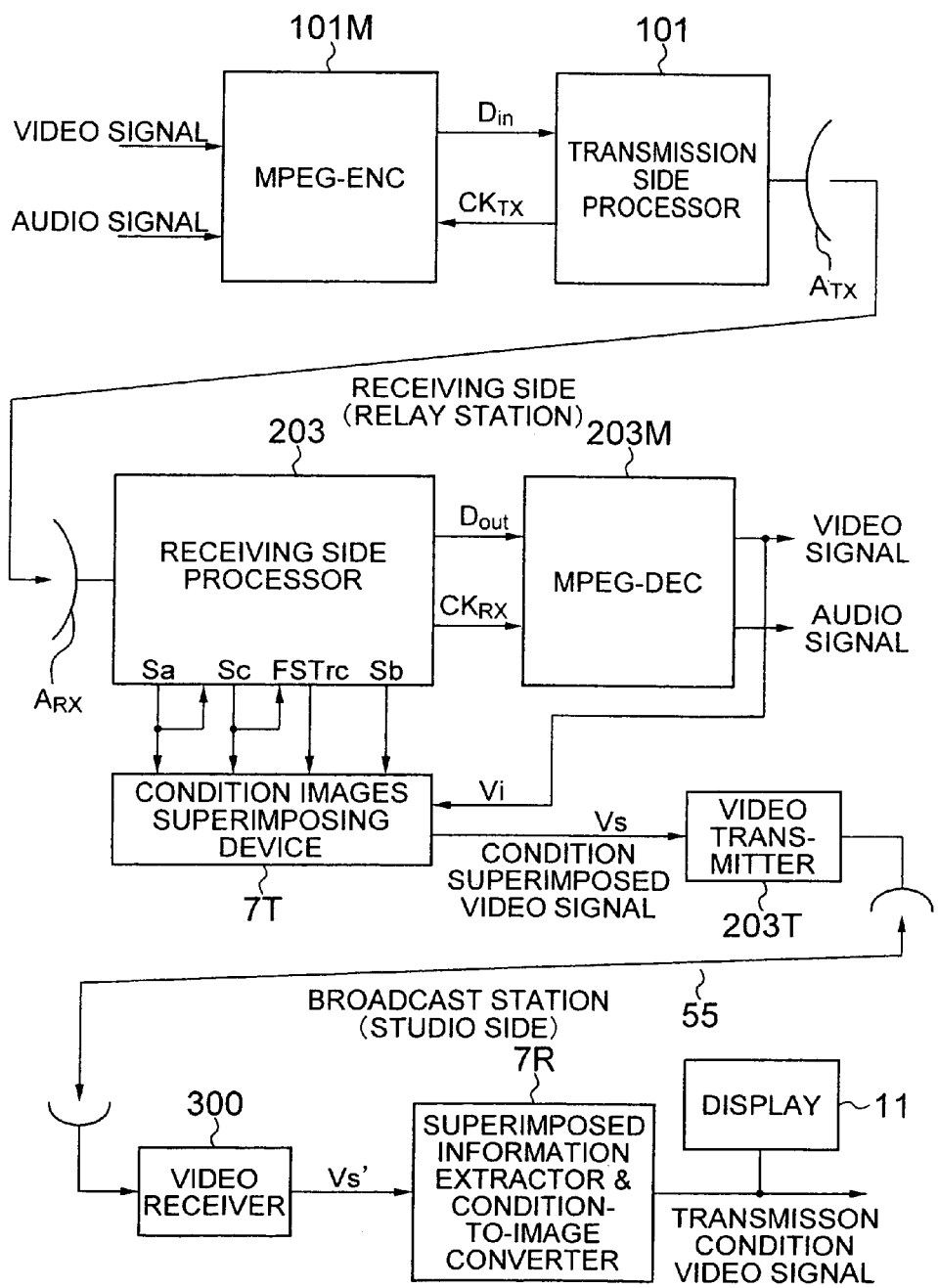

FIG. 56A
EXTERNAL INPUT VIDEO SIGNAL (203M OUTPUT)
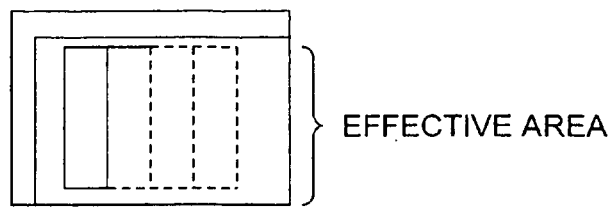
EXTERNAL INPUT
VIDEO SIGNAL
(203M OUTPUT V)
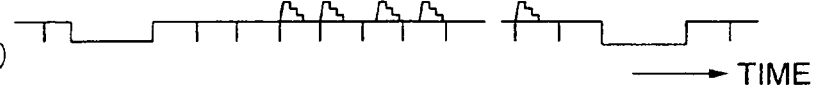
⟶ TIME
FIG. 56B
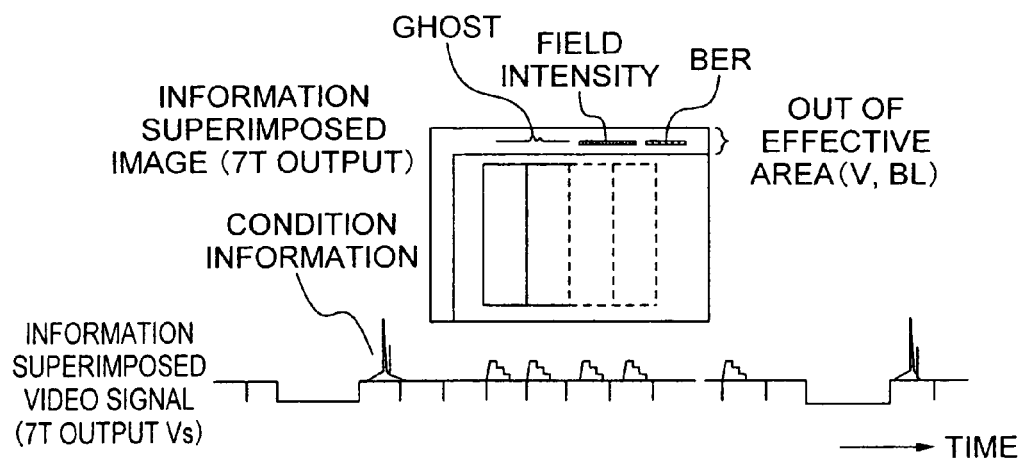
FIG. 56C
EXTRACTED
INFORMATION
IMAGE (7R OUTPUT)
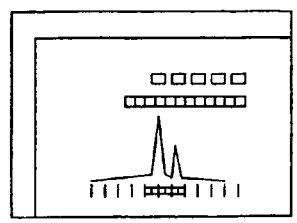
SCREEN OF
TRANSMISSON
CONDITION OF
SUPERIMPOSED
INFORMATION

US 7,170,929 B2

DIGITAL SIGNAL TRANSMISSION SYSTEM AND METHOD OF DISPLAYING TRANSMISSION CONDITION IN DIGITAL SIGNAL TRANSMISSION SYSTEM

The present application is a continuation of application Ser. No. 09/814,133, filed Mar. 22, 2001, now U.S. Pat. No. 6,912,247 the contents of which are incorporated herein by reference.

BACKGROUND OF THE INVENTION

The present invention relates to a digital signal transmission system using a digital modulation system such as orthogonal frequency division multiplex (OFDM) modulation system.

In recent years, European countries, the United States of America, and Japan have already put digital broadcasting into operation or some of them are considering digital broadcasting. The OFDM modulation system is regarded as the most likely prospect for digital broadcasting.

This OFDM modulation system is a kind of multi-carrier modulation system, and is the sum of a large number of digitally modulated carrier waves. In addition, each carrier is modulated by QPSK (Quadrature Phase Shift Keying), and the resultant wave of all the modulated carriers is the OFDM signal.

Here, for the OFDM signal, first the QPSK signal, $\alpha_k(t)$ of each carrier can be expressed by the following equation.

$$\alpha_k(t) = a_k(t) \cdot \cos(2\pi k f t) + b_k(t) \cdot \sin(2\pi k f t) \quad (1)$$

where k is the carrier number, and $a_k(t)$, $b_k(t)$ are data of k-th carrier and take a value of −1 or 1.

If the number of carriers is N, the OFDM signal is the resultant of N carriers. If this OFDM signal is represented by $\beta_k(t)$, it can be expressed by the following equation (2).

$$\beta_k(t) = \Sigma \alpha_k(t) \quad (k=1 \sim N) \quad (2)$$

Incidentally, in the OFDM modulation system, it is common practice to add a guard interval to each signal unit in order to reduce the multi-path effect.

The OFDM signal is formed of those signal units. The symbol of this signal unit is formed of, for example, 1024 effective samples plus 48 samples of guard interval data, or 1072 samples. Also, a stream unit called frame is the sum of 892 symbols and 6 synchronizing symbols, or 900 symbols in total. These stream units are repeated as the OFDM signal.

FIG. 17 is a block diagram of the basic constructions of the modulator and demodulator in a conventional OFDM transmission system. The transmission-side $T_X$ construction has a transmission-side processor 101 that includes a transmission path coder 1T, an encoder 2T, an IFFT (Inverse Fast Fourier Transform) 3A, a guard adder 3B, a synchronizing symbol inserter 5, a clock oscillator 6, and an orthogonal modulation processor 8, and a transmission antenna $A_{TX}$. The receiving-side $R_X$ construction has a receiving antenna $A_{RX}$ and a receiving-side processor 203 that includes an AGC 9A, an orthogonal demodulation processor 9B, a synchronizing detector & correlator 4A, an FST corrector 4B, an FFT (Fast Fourier Transform) 3C, a decoder 2R, a transmission path deencoder 1R, and a voltage controlled clock oscillator 10. These transmission-side $T_X$ and receiving-side $R_X$ are connected by, for example, a wireless transmission path L using radio waves.

The modulation and demodulation processes for OFDM signal will be described with reference to FIG. 17.

Data $D_{in}$ that is continuously supplied to the transmission path coder 1T of the transmission-side processor 101 is, for example, processed for each frame that is formed of 900 symbols. During this frame period, 894 information symbols other than 6 synchronizing symbols, each including 800 samples ranging from the first to 400-th and from the 625-th to 1024-th samples, are processed and produced as intermittent rate-converted data $D_{ii}$.

The transmission path coder 1T also generates a transmission-side frame control pulse FST at each frame of 900 symbols, and supplies it to other elemental blocks as a frame pulse signal that indicates the start of those synchronizing symbol periods.

The encoder 2T codes the input data $D_{ii}$ into data $R_f$ and $I_f$ that are mapped on the two axes of I and Q.

The IFFT 3A regards these data $R_f$ and $I_f$ as frequency components, and converts them to time base signals R (real part) and I (imaginary part) of 1024 samples.

The guard adder 3B adds after the 1024 samples the waves of, for example, the first 48 samples of the waves in the start period of the time base signals R and I of 1024 samples, and produces information symbols $R_g$ and $U_g$ of time base waves of a total of 1072 samples. These 48 samples serve as a protection band when reflected waves are mixed.

The synchronizing symbol inserter 5 inserts, at every 894 in these information symbols $R_g$ and $I_g$, samples synchronizing waves of 6 symbols that are previously stored in a memory to produce data $R_{sg}$ and $I_{sg}$ of frames.

These data $R_{sg}$ and $I_{sg}$ are supplied to the orthogonal modulation processor 8, where they are processed by a D/A converter 81, orthogonal modulator 82 and local oscillator 83 so that an OFDM modulated signal RF with a carrier of high frequency $F_c$ can be produced, amplified and transmitted through the transmission antenna $A_{TX}$ to the transmission path L. The transmission frequency band used is UHF band or microwave band.

The clock CK (of which the frequency is 16 MHz) necessary to process in the transmission side $T_X$ is supplied from the clock oscillator 6 to each block as a transmission side clock $CK_d$.

The OFDM modulated signal RF transmitted as above is supplied to the orthogonal demodulation processor 9B via the receiving antenna $A_{RX}$ and via the AGC 9A that handles high frequencies on the receiving side $R_X$. In the orthogonal demodulation processor 9B, an orthogonal modulator 91 multiplies the OFDM modulated signal RF by a local oscillation signal of frequency $F_c'$ that is fed from a voltage controlled oscillator 93, thus orthogonally demodulated into the base band signal, and then an A/D converter 92 converts it to the digital data $R'_{sg}$ and $I'_{sg}$.

These data $R'_{sg}$ and $I'_{sg}$ are supplied to the FFT (Fast Fourier Transform) 3C, which then responds to a pulse signal $FST_{rc}$ to produce a gate signal that is used for FFT and determines the data period of the 1024 samples. That is, the time base wave signals $R'_{sg}$ and $I'_{sg}$ are converted to frequency component signals $R'_f$ and $I'_f$ by removing the 48 samples for the protection band.

These frequency component signals $R'_f$ and $I'_f$ are supplied to and decoded by the decoder 2R into data $D'_0$, which is then further decoded by the transmission path decoder 1R into continuous signal $D_{out}$.

The data $R'_{sg}$ and $I'_{sg}$ are also supplied to the synchronous detector & correlator 4A, where a synchronizing symbol group is detected from the data. Thus, the pulse FSTr is derived therefrom as a frame pulse. This pulse $FST_r$ is supplied to each block of receiving side $R_X$ as a frame control pulse.

In addition, this synchronous detector & correlator 4A compares the synchronizing components of the data $R'_{sg}$ and $I'_{sg}$ with the clock $CK_{rc}$ generated from the voltage controlled clock oscillator 10, and produces a correlation output $S_c$ according to the comparison result, and supplies it to the FST corrector 4B. The FST corrector 4B generates a control voltage VC, thus controlling the voltage controlled clock oscillator 10 to generate the clock $CK_{rc}$ with a correct period, which is then supplied to each block of the receiving side.

Each block shown in FIG. 17 will be described in detail.

The transmission path coder 1T makes interleave processing, energy dispersion processing and error correction code processing in order to prevent data from being erroneous due to different kinds of error that may be mixed during the transmission.

The encoder 2T converts the signal $D_{ii}$ to information at predetermined points on the I and Q axes by use of the data stored in a mapping ROM, and replaces the signal of the period corresponding to unnecessary carrier by 0 to produce data $R_f$ and $I_f$.

The IFFT converter 3A converts the input signals $R_f$ and $I_f$ to the time base waves R and I of the symbol period determined by the clock $CK_d$ and pulse FST. Specifically, this IFFT converter may be the PDSP16510 made by Pressy corp. or the equivalent.

The guard adder 3B is formed of a delay circuit for delaying the input signals R and I by 1024 samples, and a switch for selecting only the delayed output from 1025-th sample to 1072-nd sample. These timings are determined by the clock CK and pulse FST. The time base waves ranging from the first sample to the 48-th sample are added to the range from 1025-th sample to the 1072-th sample, of the symbol that is formed of all 1072 samples, to form information symbol $R_g$ and $I_g$.

FIG. 18 shows one example of the synchronizing symbol inserter 5. First, ROMs 5-1 and 5-2 are controlled by a controller 5-5 of which the operation timing is determined by the clock CK and pulse FST, so that a synchronizing symbol signal can be generated in accordance with the timing of the pulse FST.

Similarly, SELs 5-3 and 5-4 are controlled by a controller 5-6 of which operation timing is determined by the clock CK and pulse FST, so that the synchronizing symbol signals read from the ROMs 5-1 and 5-2 are selected only during the period from the first symbol to the sixth symbol that is a non-signal period at the present stage, of the time base information symbol signals $R_g$ and $I_g$ with guards.

Here, the synchronizing symbol signals include, for example, null (NULL) symbols for roughly finding the existence of the synchronizing symbol group that is in non-signal state during one symbol period, special symbols (hereinafter, referred to as CW symbol) having only one carrier during one symbol period, sweep (SWEEP) symbols that are waveforms changing from the lower limit to upper limit of the transmission frequency band during one symbol period, and for correctly finding the points of symbol switching, and reference symbols indicative of phase reference necessary to delay, detect and demodulate. When 6 synchronizing symbols are used, two auxiliary symbols are added to the above symbols.

The orthogonal modulation processor 8 will be further described. The D/A converter 81 converts the real part signal $R_{sg}$ and imaginary part signal $I_{sg}$ from digital to analog form.

The orthogonal modulator 82 modulates the real part signal on a carrier of frequency $F_C$ from oscillator 83, and modulates the imaginary part signal on a frequency-$F_C$ carrier of which the phase is shifted 90° out of the carrier $F_C$ fed from the oscillator 83, thereby making orthogonal modulation. These modulated signals are combined to produce the OFDM modulated wave signal.

The operation of the receiving side $R_X$ will be described. In the receiving side $R_X$, the signal of frames transmitted is supplied to the AGC 9A, where the level of the received signal is changed to a correct level by a control signal $S_a$ internally generated. The OFDM frame signal with its level corrected by the AGC 9A is supplied to the orthogonal demodulation processor 9B.

In this processor 9B, contrary to the transmission side $T_X$, the orthogonal demodulator 91 demodulates the input signal by applying the carrier signal of frequency $F_C'$ from the voltage controlled oscillator 93, producing the real part signal, and by applying the carrier signal shifted 90°, thus producing the imaginary part signal. These analog real part and imaginary part resulting from the demodulation are converted to digital signals $R'_{sg}$ and $I'_{sg}$ by the A/D converter 92.

The synchronizing detector & correlator 4A searches for breakpoints of frames from the received signals $R'_{sg}$ and $I'_{sg}$, and produces the frame reference $FST_{rc}$, and correlation output $S_C$.

The FFT 3C partitions the symbols on the basis of this pulse $FST_{rc}$, and performs Fourier transform, thus making OFDM demodulation to produce data $R'_f$ and $I'_f$.

The decoder 2R discriminates the data $R'_f$ and $I'_f$ by, for example, ROM table, and calculates data $D'_O$.

The transmission decoder 1R makes reverse interleave processing, energy reverse dispersion processing and error correction processing, thus producing continuous digital data $D_{out}$, signal $S_b$ indicating BER (Bit Error Rate) status of error corrected situation, and receiving side clock signal $CK_{RX}$.

FIG. 19 shows one example of the specific arrangement of the synchronizing detector & correlator 4A. Referring to FIG. 19, the orthogonally demodulated digital signals, or time base signals $R'_{sg}$ and $I'_{sg}$ are supplied to NULL end detector 4-1 and SWEEP calculator 4-2.

The NULL end detector 4-1 detects the non-signal state or period, NULL in the synchronizing symbols from the group of symbols of frames, rough positions (timing) of the synchronizing symbols, and estimates the SWEEP symbol start points from the NULL end points by use of a timer circuit, thereby producing a SWEEP start command pulse ST.

The SWEEP calculator 4-2, while referring to the SWEEP start command pulse ST, decides the waves existing 2 symbols after the NULL symbol as the SWEEP symbol wave, receives those, and searches for the correct switching timing of each symbol.

Specifically, a memory 4-3 in which patterns of SWEEP symbols are previously stored is used, and the input OFDM signal and the pattern read from the memory 3-4 are processed to undergo, for example, correlation operation, and to thereby produce the correlation output $S_C$, which is then supplied to the FST corrector 4B shown in FIG. 17.

The FST corrector 4B calculates a phase shift from the correct switching timing of each symbol on the basis of the frame pulse $FST_r$, and produces the correct signal VC for the receiving-side reference clock $CK_r$ so that the frame phase on the receiving side can be coincident with the transmitted data.

Turning back to FIG. 19, a frame counter 4-4 starts counting the clock CK on the basis of the SWEEP start command pulse ST, and produces a pulse $FST_r$ each time the count reaches a value (for example, 1072×900) corresponding to the frame period, in which case the count is reset to 0, and counting of pulse CK is started.

Therefore, after that, the pulse $FST_r$ is produced every constant count, or at every frame start point. On the receiving side, this pulse $FST_r$ is used as start timing for fast Fourier transform, decoding and reverse rate conversion.

The specific construction of the NULL end detector 4-1 and SWEEP start position estimating process will be described in detail with reference to FIGS. 20 and 21.

The signals $R'_{sg}$ and $I'_{sg}$ fed to the NULL end detector 4-1 are converted to their absolute values by absolute value circuits 4-1-1 and 4-1-2, and added together by an adder 4-1-3 to produce an added absolute value 4a.

This added absolute value 4a is compared with a threshold $V_{th}$ in a comparator 4-1-4. Thus, the comparator 4-1-4 produces a compared output 4b that corresponds to the period in which the added absolute value does not exceed the threshold $V_{th}$, or the NULL symbol period between $T_1$ and $T_2$.

Then, an edge detector 4-1-5 detects the leading edge of the signal, or the compared output 4b to produce a leading edge detected output 4c. A delay circuit 4-1-6 delays this output 4c by one symbol to produce the SWEEP start command pulse ST.

This SWEEP start command pulse ST is able to specify a correct SWEEP symbol start position ($T_3$). Thus, since the SWEEP calculator 4-2 can receive the SWEEP symbol waves from the start, the phase shift in the SWEEP calculation can be correctly calculated, and the correct switching timing of each symbol can be searched for.

In other words, by detecting the phase shift by the FST corrector 4B on the basis of the correlation output $S_C$ signal produced from the SWEEP calculator 4-2, adjusting the speed of the clock $CK_{rc}$ as the receiving side sample rate, and making synchronizing lock process to the phase of the transmitted synchronizing symbol, it is possible to remove error in the FFT gate timing position. In a case that there is any reflected wave, it is better to place the gate after the symbol period.

Incidentally, if the SWEEP start command pulse is correct in its timing position that is determined on the basis of the detected edge of the synchronizing symbol corresponding to rough adjustment, the FFT gate is reduced in its amount of correction for timing position that is made by the speed adjustment of the clock $CK_{rc}$ corresponding to fine adjustment, and thus the necessary time for the adjustment is also reduced. That is, the gate position can be set with error zero (no error) in a less time, or the best decoding situation can be achieved.

Three examples of the correlation output signal $S_C$ in that case are shown in FIGS. 22A, 22B and 22C. From FIGS. 22A and 22C, it will be understood that the correlation output signal $S_C$ in that case has no reflected wave and only a sharp peak due to the main wave.

The relation of the synchronizing operation and NULL detecting threshold in the case when there is any reflected wave will be described below.

As shown in FIG. 23, when there is any reflected wave, the NULL end point is detected with large error. Thus, since the detected edge position is delayed, the exactness of rough adjustment is reduced, and the amount of correction for fine adjustment increases. Consequently, the necessary time for fine adjustment is increased, and it is delayed to attain the best decoding situation. If the effect of the reflected wave is reduced, selecting the threshold $V_{th}$ to be a lower value will make the NULL end point due to main wave be detected with ease. For example, the lower value of the threshold $V_{th}$ may be 30 percent of the average power level of the received signal. As a result, the amount of shift at the time of rough adjustment decreases, so that the necessary time for fine adjustment can be prevented from being extended.

FIG. 24 shows one example of the correlation output signal $S_C$ in such case. From FIG. 24, it will be obvious that the correlation output signal $S_C$ in this case has a peak due to main wave and another peak due to a reflected wave.

The above descriptions were made under the assumption of high CN (carrier to noise ratio) that means the mixture of small noise component.

However, as shown in FIG. 25, under a low input electric field intensity, the noise component increases, and a false signal is generated due to the noise component in the NULL period and mixed in the compared result output 4b. Therefore, the exactness of the rough adjustment may be greatly reduced. In addition, when the electric field intensity is further decreased, the noise component in the NULL period always exceeds the threshold $V_{th}$, making it impossible at all to detect the NULL period end point. In order to assure the operation at low CN, you should increase the threshold $V_{th}$ to a high value. For example, the high value of the threshold $V_{th}$ may be 80 percent of the average power level of the received signal.

FIG. 26 shows one example of the correlation output signal $S_C$ in such case. From FIG. 26, it will be apparent that the correlation output signal $S_C$ in this case includes a gentle peak due to main wave because much noise is contained in the SWEEP signal received on the basis of the $FST_r$ pulse reproduced on the receiving side and because the degree of coincidence is not increased at higher CN as compared with that at low CN even though it is calculated while the phase in the SWEEP pattern memory 4-3 is being shifted.

While an example of the multi-carrier OFDM modulation has been described so far, a digital transmission system of 64 QAM using a single carrier has the same problem. JP-A-9-247128 discloses a digital signal receiver in which information of multi-path is reproduced from the received signal and displayed together with the received signal level on the display. However, this Japanese document teaches that the display merely displays the number of multi-paths and delay time of the reflected wave as the information about the multi-path (a state of reflected wave). It is difficult to check the actual quality of the digital transmission path of OFDM signal only from such insufficient information. As the result, a good quality of the reproduced image is not always obtained by OFDM modulation.

When such a digital transmission system as described above is used for radio transmission while being carried on a relay mobile, or outside broadcast van 51 (52) for marathon as shown in FIG. 53, a receiving antenna 50 of the receiving station or relay station is required to be always directed toward the transmission antenna of the moving van by direction adjustment so that strong radio waves can be received from the transmission antenna. This direction adjusting operation for the receiving antenna will hereinafter be simply called alignment.

To make the alignment easy, the conventional system shown in FIG. 17 is equipped with means for generating a low frequency signal in response to the electric filed strength ($S_a$ value) that is represented by the control signal $S_a$ in the AGC 9A (for example, means for generating sound of tone interval proportional to the electric field strength though not shown), and with a field strength level meter.

In the conventional analog signal transmission, the transmitted picture quality generally becomes better as the field strength is increased, and thus the operator only adjusts the antenna direction in order that the level meter can indicate the maximum value. In the digital transmission, however, the situation of relatively weak electric field strength, and no reflected wave, or presence of only the main wave will overwhelmingly often provide satisfactory transmission condition as compared with the condition of high electric field intensity and much reflected wave mixed.

FIG. 54 shows one example of the relation among the electric field strength, error rate and reflected wave in the OFDM signal transmission. In this example, it is assumed that the guard interval period of OFDM signal is selected to be 3 µs, and that a constant level reflected wave is mixed in the received signal. The abscissa, delay in FIG. 54 is delay time between main wave and reflected wave. If the error rate as one of the evaluation parameter of signal transmission quality is 1.00E-02 or below, a video signal of moving pictures with allowable quality can be transmitted. As the error rate increases (in the upward direction along the ordinate of the graph of FIG. 54), the signal transmission quality becomes poor. From FIG. 54, it will be understood that the signal transmission quality is, though affected by the electric field level, or the CN or noise of the received signal, most affected by the reflected wave (delayed wave). As illustrated in FIG. 54, when the filed strength is reduced to −70 dBm or below, the noise component is gradually increased, or the error rate is deteriorated so that the error mixture rate in the signal is increased. In addition, when the delay time of reflected wave exceeds the guard interval, or 3 µs, the error rate greatly increases. In FIG. 54, although the reflected wave level is assumed to be constant, the increase of the reflected wave level will increase the error rate. Therefore, even if the filed strength is slightly lowered, the receiving antenna should be adjusted in its orientation so that the reflected wave can be decreased or that the delay time of reflected wave is confined within 3 µs.

Thus, it is difficult to achieve the best receiving condition in digital transmission by adjusting the antenna orientation while monitoring only the field intensity as in the prior art. It is necessary to adjust the antenna by considering the reflected wave in addition to the field strength.

SUMMARY OF THE INVENTION

The present invention is to propose a system and method capable of offering the operator the means to display images by correctly imaging the signal transmission status information that indicates at least the condition of reflected waves in order to achieve the best receiving condition on the receiving side when a digital signal is transmitted.

Since the conventional analog transmission system is greatly affected by reflected waves, it is used only under the condition that the transmitting side and receiving side are placed under an unobstructed view. The recently developed digital transmission system of particularly OFDM modulation system has less effect of reflected waves, and thus can be positively used for beyond-the-horizon transmission as described above.

However, for beyond-the-horizon transmission, the antenna orientation adjustment operator cannot view the transmitting side. Therefore, in order for the operator to make correct alignment relative to the transmitting side that cannot be viewed, the operator needs to detect the field strength and BER (Bit Error Rate), display them on an exclusive level meter or the like, and compare those with the reproduced picture.

Here, in order to image the received signal in the digital transmission system, it is necessary that the digital data $D_{out}$ obtained by OFDM demodulation in the above-mentioned receiving side processor 203 be decoded by use of an MPEG decoder not shown. Thus, in the digital transmission system, since it is not easy to image the received signal on the receiving antenna side on which the antenna adjustment operator engages in the adjustment, the alignment is often performed by use of the aforementioned exclusive field intensity or BER level meter.

However, since such situation as somewhat weak field strength and no reflected wave, or presence of only main wave in the digital transmission overwhelmingly often provides good transmission condition as compared with the situation of strong field and presence of much mixed reflected wave as described above, only comparing the field strength and BER with the reproduced picture for the purpose of alignment without grasping the situation in which the reflected waves are mixed (ghost-status) does not always lead to high quality transmission.

The present invention is to remove these defects, and make it easy to maintain high quality digital transmission by imaging the presence or absence of reflected waves and the mixed state of reflected waves (ghost-status), imaging the field strength and BER value, and observing these situations comprehensively for the alignment because the transmission quality cannot always be perceived by measuring only the field intensity and BER in the digital transmission of OFDM signal or the like.

It is another object of the invention to display the imaged transmission-condition in synchronism with other imaging signals, or in the so-called superimposed state in order that the operator can make antenna alignment with a plurality of outside broadcast vans without watching a large number of monitors.

It is still another object of the invention to superimpose, when an abnormal transmission-condition is detected, the imaged abnormal transmission-condition waveform on the normal transmission-condition waveform, and residually display those images for a predetermined time, thus making it possible to grasp the transmission path characteristics.

Moreover, it is an object of the invention to generate alarm sound when the abnormal state occurs in order to inform the operator of the abnormal state occurrence.

In addition, as shown in FIG. 53, a relay point 53 is provided on a hill or the hights in the general mobile relay, and digital imaging signals are transmitted from the outside broadcast vans 51, 52 to the relay point 53 by use of the aforementioned OFDM transmission system. The imaging signals received by the relay apparatus 53 provided on the hill are transmitted to a broadcast station 54 having studios via a microwave channel 55 of analog transmission system.

A responsible person (a director) in this transmission system generally works on the studio side at the final receiving stage. He commands all the transmission relay operations and orders workers at each place of duty. For example, he orders to select and decide any ones to go on the air, from the images that have been transmitted from a plurality of vans 51, 52.

In this case, although the mobile relay transmission-condition in the digital transmission system changes every second as described above, even seeing only the video images transmitted without grasping the electric field intensity, BER and the mixed state of reflected waves (ghost-status) cannot lead to correct decision of whether the transmission-condition is good. The reason for this is that in the digital transmission system the video images transmitted can be satisfactorily reproduced until the limited poor transmission conditions in which the demodulation can be barely performed occur, and when the demodulation cannot be made, an abnormal phenomenon such as freeze of a reproduced picture on a display is suddenly caused.

Therefore, the director on the studio side cannot select appropriate on-air images from the video images transmitted from a plurality of outside broadcast vans because the transmission-condition of each van, or the field strength, BER and the mixed state of reflected waves (ghost-status) are uncertain. Thus, the selected on-air video images are sometimes suddenly frozen by a poor transmission-condition, leading to a broadcasting accident.

The present invention is to remove these defects, and make it possible for the director to correctly grasp the transmission-conditions by transmitting information of the field strength, BER, and the mixed state of reflected waves (ghost-status) that indicate the transmission-conditions of these mobile relaying bodies from the OFDM transmission system to a remote studio located distant therefrom, and by displaying those images.

According to one aspect of the invention, there is provided a digital signal transmission system using a digital modulation system comprising a digital signal transmitter having a first digital signal processing unit and a digital signal receiver receiving a digital signal from the transmitter. The digital signal receiver comprises a second digital signal processing unit for processing the digital signal from the transmitter and outputting a digital demodulated signal and a correlation value signal, a signal converter coupled with the second digital signal processing unit and supplied the correlation value signal therefrom for generating a waveform indicating a transmission condition including a main wave in response to the correlation value signal, and a display coupled with the signal converter for displaying the waveform indicating a transmission condition in the digital transmission system.

According to another aspect of the invention, there is provided a digital signal receiver to which a digital signal from a digital signal transmitter using a digital modulation system is supplied. The digital receiver comprises a second digital signal processing unit for processing the digital signal and outputting a digital demodulated signal and a correlation value signal, a signal converter coupled with the second digital signal processing unit and supplied said correlation value signal therefrom for generating a waveform indicating a transmission condition including a main wave and a reflected wave in response to the correlation value signal, and a display coupled with the signal converter for digital signal.

According to still another aspect of the invention, there is provided a method of displaying a digital signal transmission condition in a digital signal receiver. A digital signal is transmitted to the receiver from a digital signal transmitter using a digital modulation system. The method comprises the steps of processing the digital signal in a second digital signal processing unit of the digital signal receiver, outputting a digital demodulated signal and a correlation value signal from the second digital signal processing unit, generating a waveform indicating a transmission condition including a main wave in response to the correlation value signal in a signal converter coupled with the second digital signal processing unit, and displaying the waveform indicating a transmission condition of the digital signal on a display.

According to further aspect of the invention, there is provided a digital signal transmission system by which a video signal modulated by a digital modulation system is transmitted via at least one relay apparatus to another receiver. In this digital signal transmission system, the relay apparatus has a transmission condition signal generator for generating a ghost-status signal that indicates the mixed state of reflected waves in the received video signal, a signal converter for converting the ghost-status signal into a ghost-status imaging signal so that the ghost-status signal can be imaged on a display, and a transmitter for transmitting the ghost-status imaging signal and the video signal to the receiver. The receiver has circuit means for extracting the ghost-status imaging signal from the received signal.

According to the invention, when at least ghost-status imaging signal or additionally the BER imaging signal and field intensity imaging signal are displayed together on a video monitor, the transmission-conditions based on those imaging signals can be comprehensively viewed in association with each other, and thus be correctly grasped. Therefore, the antenna alignment operator can work for alignment effectively by viewing these images.

Moreover, according to the invention, the information of field strength, BER, and mixed state of reflected waves (ghost-status) that indicate the conditions of the signal transmission from the mobile relaying stations is transmitted from the OFDM transmission system to a remote place, or a studio as the final receiving stage, where the transmission-conditions can be displayed, and thus the director or other persons can correctly grasp the transmission-conditions.

BRIEF DESCRIPTION OF THE DRAWINGS

FIG. 11 is a block diagram showing the construction of one embodiment of a transmission-condition image superimposing device 7b according to the invention.

FIG. 17 is a block diagram showing the whole construction of the general OFDM transmission system.

FIG. 55 is a block diagram of the whole construction of another embodiment of a transmission system according to the invention.

FIGS. 56A, 56B and 56C are schematic diagrams showing the relations between transmission signal waveforms and displayed screens according to the invention.

DESCRIPTION OF THE EMBODIMENTS

Figure 1:
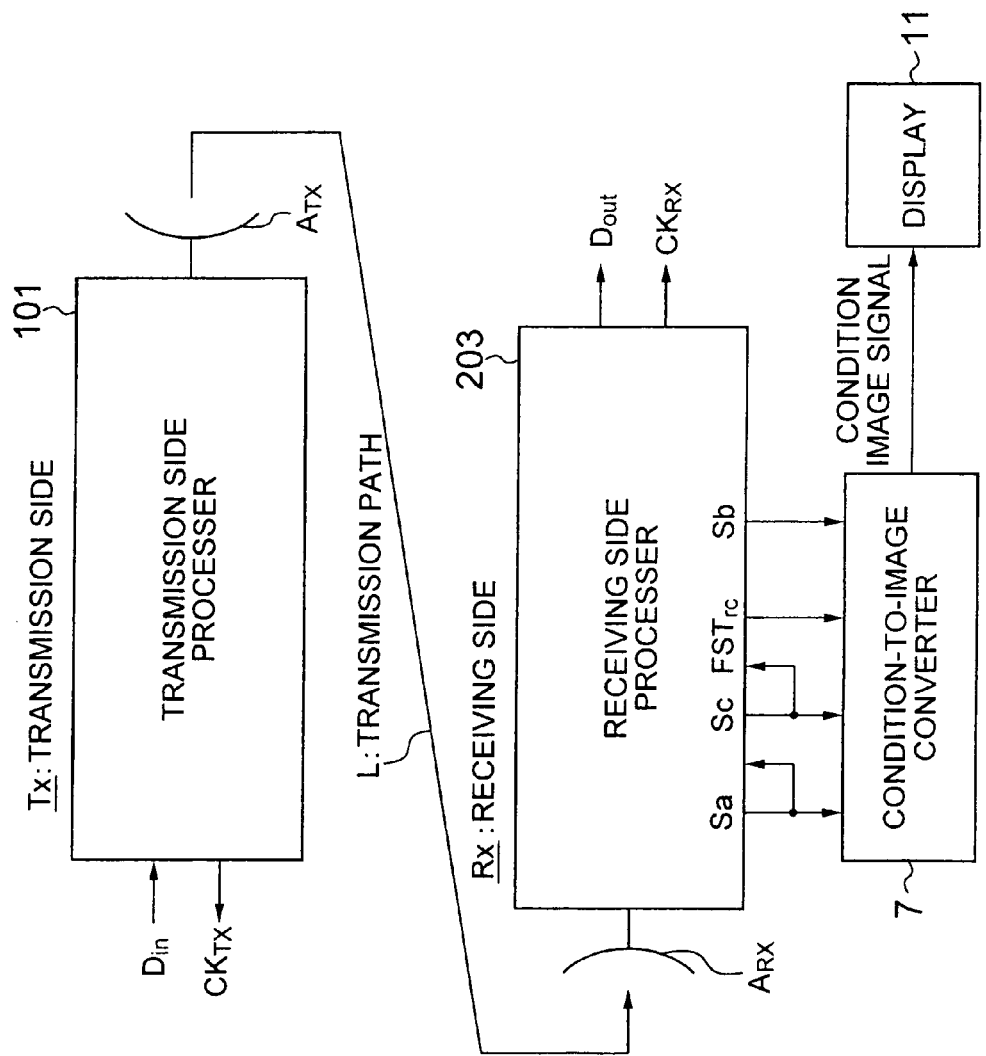
FIG. 1 is a block diagram showing the whole construction of one embodiment of a digital transmission system according to the invention.

FIG. 1 shows the whole construction of an OFDM modulation type transmission system according to the invention. The construction and operation of chiefly the receiving side will be described.

This transmission system has the transmission-side processor 101 on the transmitting side $T_X$ as shown in detail in FIG. 17, the receiving-side processor 203 on the receiving side $R_X$ as shown in detail in FIG. 17, a transmission-condition-to-image converter 7, and a video display 11 as shown in FIG. 1.

Referring to FIG. 1, on the receiving side Rx, the AGC control signal Sa indicating an electric field intensity that is produced from the receiving-side processor 203, the correlation output Sc such as a correlation value signal and the signal Sb indicating BER are supplied to the transmission-condition-to-image converter 7. Also, the pulse FSTrc as the operation timing reference from the receiving-side processor 203 is supplied to the transmission-condition-to-image converter 7. The transmission-condition imaging signal thus generated from the converter 7 is displayed on the video display 11.

Figure 2A:
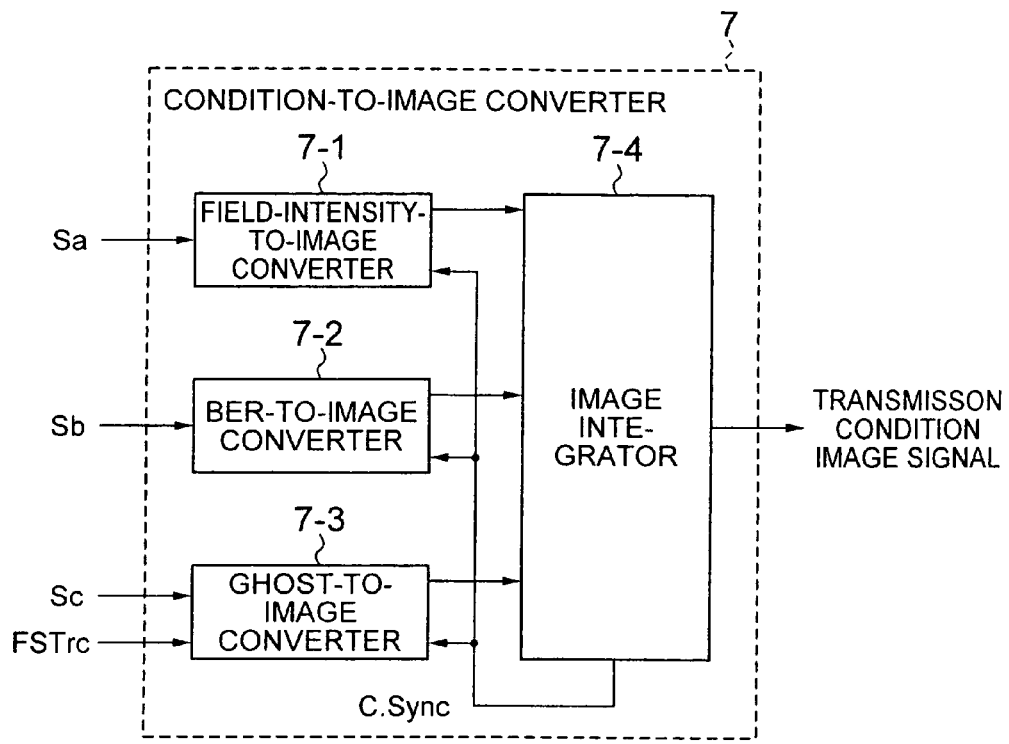
FIG. 2A is a block diagram of one example of the transmission-condition-to-image converter 7 according to the invention.

FIG. 2A is a block diagram of one embodiment of the transmission-condition-to-image converter 7. With reference to FIG. 2A, this converter will be described.

The control signal Sa is supplied to the input end of the field-intensity-to-image converter 7-1. The output from the field-intensity-to-image converter 7-1 is fed to the input end of the image integrator 7-4.

The signal Sb is supplied to the input end of the BER-to-image converter 7-2. The output from the BER-to-image converter 7-2 is fed to the image integrator 7-4.

The signal Sc and signal FSTrc are supplied to the input ends of the ghost-status-to-image converter 7-3. The output from the ghost-status-to-image converter 7-3 is fed to the image integrator 7-4.

The synchronizing signal C.Sync from the image integrator 7-4 is supplied to the synchronizing input ends of the field-intensity-to-image converter 7-1, BER-to-image converter 7-2 and ghost-status-to-image converter 7-3. The image integrator 7-4 produces a transmission-condition imaging signal which will be described later.

The field-intensity-to-image converter 7-1, BER-to-image converter 7-2 and ghost-status-to-image converter 7-3 are responsive to the synchronizing signal C.Sync to convert their input condition, or status signals to imaging signals. The image integrator 7-4 combines these imaging signals to form a transmission-condition imaging signal with a video synchronizing signal added.

Figure 2B:
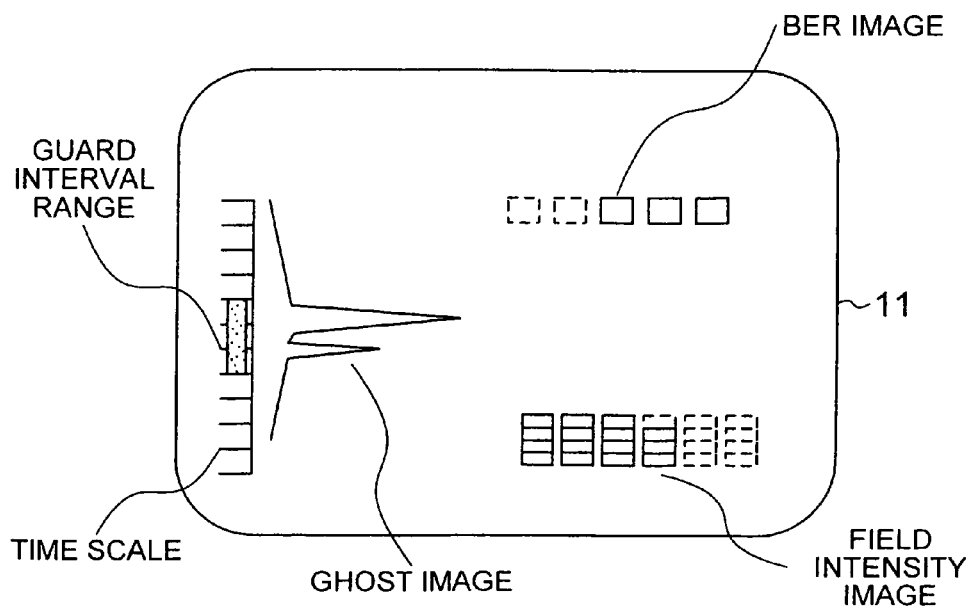
FIG. 2B is a schematic diagram showing one example of the displayed state of each transmission condition imaging signal on a display screen.

FIG. 2B shows one example of the displayed picture, or screen of each transmission-condition imaging signal. This example will be described below.

The ghost-status image is displayed as a correlation output waveform of a bar graph or sequential line graph with a time scale and guard interval range added on the left side of the screen. Here, a high peak due to main wave and a low peak due to reflected wave are shown. The BER image is displayed as dot blocks of intermediate size on the upper right side of the screen. The field strength image is displayed as a few columns of stacked small blocks arranged on the lower right side of the screen. These waveforms and block number are changed in accordance with the transmission conditions. These transmission condition images are updated depending on the renewal period of the imaging signals received and decoded.

Figure 3A:
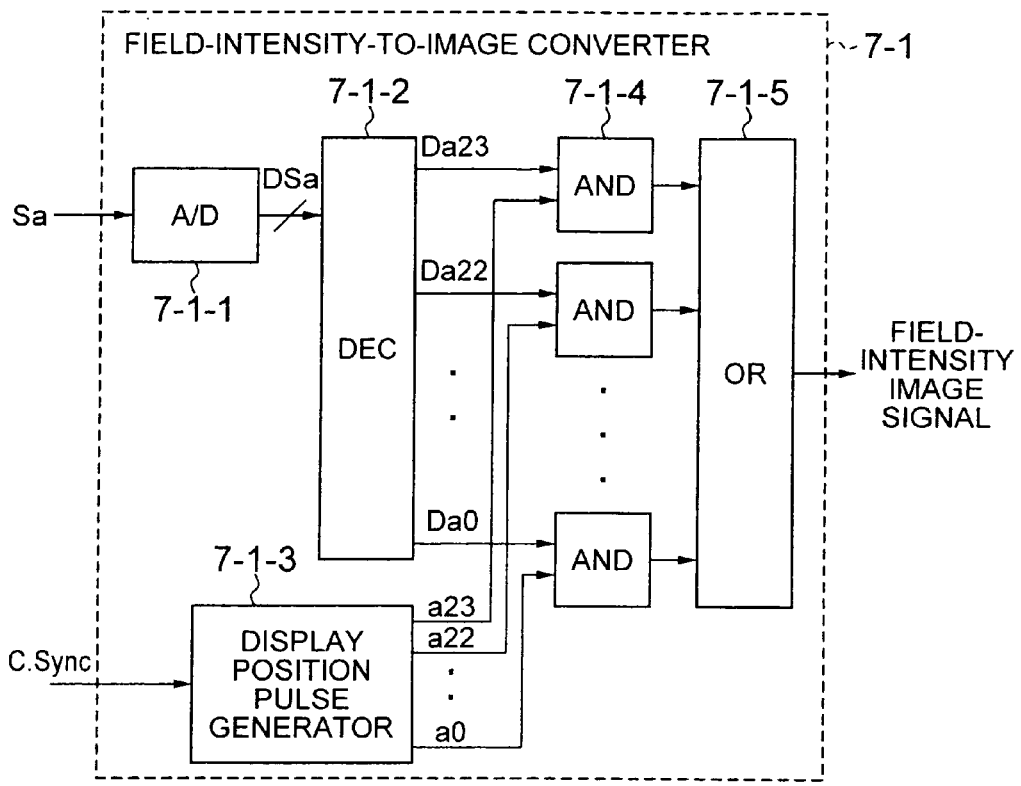
FIG. 3A is a block diagram of one example of the field-intensity-to-image converter 7-1 according to the invention.
Figure 3B:
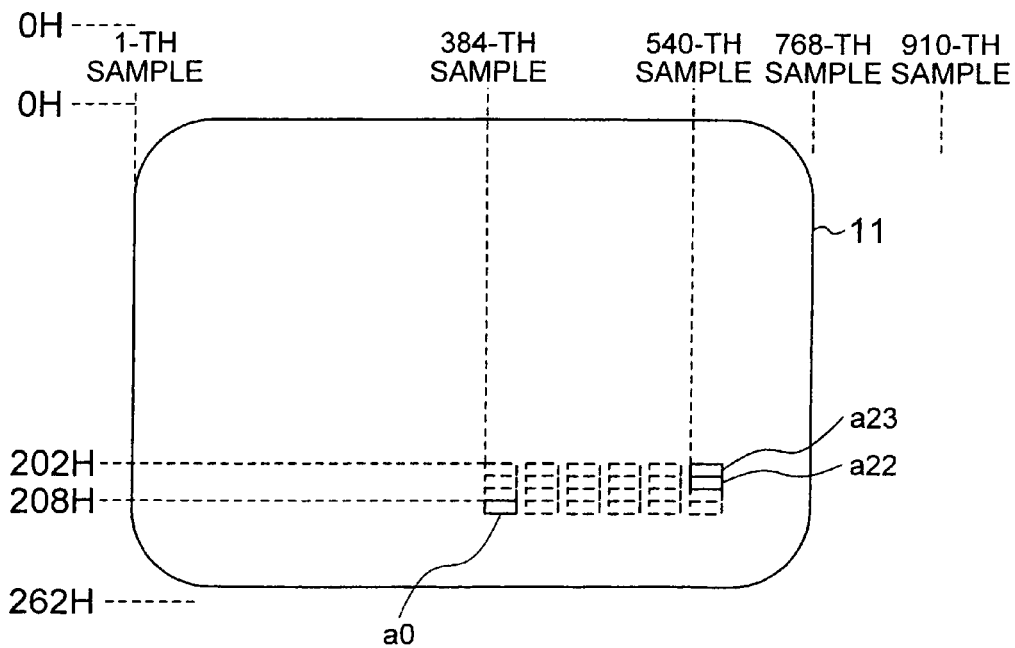
FIG. 3B is a schematic diagram showing one example of the displayed state of the field strength imaging signal on a display screen.

FIG. 3A is a block diagram of one embodiment of the field-intensity-to-image converter 7-1. FIG. 3B is a schematic diagram showing the displayed state of the field-strength image. This converter will be described with reference to those figures.

The control signal Sa indicative of a field strength is supplied to and converted by an A/D converter 7-1-1 into a digital signal DSa of, for example, 6 bits. The signal DSa indicative of a field strength is changed to, for example, a 24-bit binary signal of Da0~Da23 by a decoder (DEC) 7-1-2. Here, if signal DSa is 01 h, or 1 in decimal notation, only Da0 and Da1 become level "High". If signal DSa is 15 h, or 21 in decimal notation, Da0 through Da21 become level "High".

These bits Da0 through Da23 are respectively supplied to 24 AND gates (AND) 7-1-4. The 24 outputs from the AND 7-1-4 are supplied to an OR gate (OR) 7-1-5. The synchronizing signal C.Sync is supplied to a display position pulse generator 7-1-3, which then generates display position pulses a0 through a23 in synchronism with the synchronizing signal C.Sync. These pulses a0 through a23 are supplied to the other input ends of the AND 7-1-4, which then computes the logical products of these pulses and signals Da0 through Da23, respectively.

Here, if the signal DSa indicative of a field strength is 00 h, or zero in decimal notation, only the signal Da0 becomes level "High". Thus, only the logical product of pulse a0 and signal Da0 is "High", only the block at the position corresponding to pulse a0 is displayed. If signal DSa is 16 h, or 22 in decimal notation, the products of signals Da0 through Da22 and pulses a0 through a22 are "High". Thus, all the blocks at the positions corresponding to pulses a0 through a22 are displayed.

Here, if it is assumed that the pulse a0 becomes level "High" at the position of scanning lines 208-th H (Horizontal line) through 210-th H, and sample numbers 384-th through 414-th sample, the pulse a22 is level "High" at the position of scanning lines 202-th H through 204-th H, and sample numbers 540-th through 570-th sample, and pulse a23 is level "High" at the position of scanning lines 199-th H through 201-st H, and sample numbers 540-th through 570-th sample, then the field strength image will be displayed as shown in FIG. 3B.

In other words, the number of blocks corresponding to the field strength image is changed in accordance with the value of the control signal Sa indicative of a field strength.

Figure 4A:
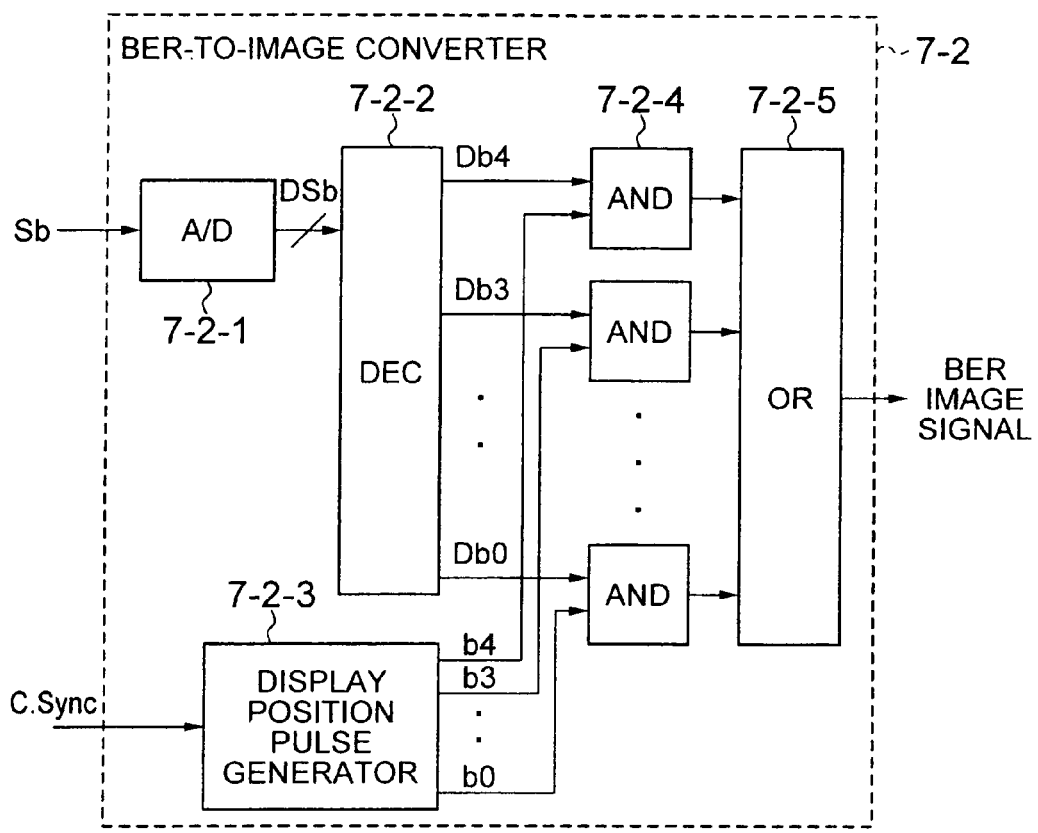
FIG. 4A is a block diagram of one example of the BER-to-image converter 7-2.
Figure 4B:
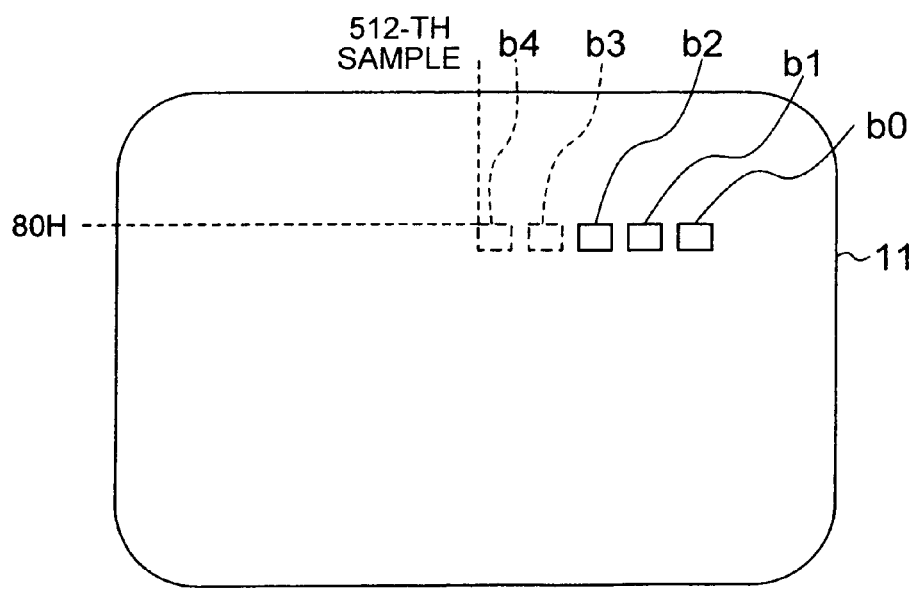
FIG. 4B is a schematic diagram showing one example of the displayed state of the BER imaging signal on a display screen.

FIG. 4A is a block diagram of one embodiment of the BER-to-image converter 7-2. FIG. 4B is a schematic diagram showing the displayed state of the BER condition imaging signal on the display. This converter will be described.

The signal Sb indicative of a BER condition is supplied to and converted by an A/D converter 7-2-1 into a digital signal DSb of about 3 bits. The signal DSb indicative of the BER condition is converted by a decoder (DEC) 7-2-2 to, for example, all five signals of Db0 through Db4.

Here, if the signal DSb is 01 h, or one in decimal notation, only signals Db1 and Db0 become level "High". The outputs of Db0 through Db4 are supplied to five AND gates (AND) 7-2-4. The five outputs from the AND 7-2-4 are supplied to an OR gate (OR) 7-2-5.

The synchronizing signal C.Sync is supplied to a display position pulse generator 7-2-3, which then produces pulses b0 through b4 for the BER condition in synchronism with the synchronizing signal C.Sync. The pulses b0 through b4 for the BER condition are displayed on the display as shown in FIG. 4B.

The pulses b0 through b4 are supplied to the other input terminals of the AND 7-2-4, which compute the logical products of those pulses and the signals Db0 through Db4, respectively. Here, if the signal DSb indicative of BER is 00 h, or 0 in decimal notation, only the signal Db0 is level "High". Thus, the product of the pulse b0 and signal Db0 becomes level "High", and only the block at the position corresponding to pulse b0 is displayed. If the signal DSb is 03 h, or 3 in decimal notation, the logical products of signals Db0 through Db3 and pulses b0 through b3 are level "High". Thus, all blocks at the positions corresponding to pulses b0 through b3 are displayed.

In other words, the block number of the BER image is changed depending on the value of the control signal Sb indicative of the BER condition.

A description will be made of the logical processing for displaying the BER condition displaying pulses b0 through b4 on the display as shown in FIG. 4B.

The display position pulse generator 7-2-3, if it is used for NTSC, makes logical operation using a 1/910 frequency dividing counter that counts at a clock of 14.3 MHz and is reset with a horizontal scanning period and a 1/525 frequency dividing counter that counts at a clock of a half horizontal scanning period and is reset with a vertical scanning period.

Thus, as shown in FIG. 4B, the b4 pulse, for instance, is displayed at the position of scanning lines of 80-th H through 96-th H, and sample number of 512-nd through 526-th sample, and the b3 pulse at the position of scanning lines of 80-th H through 96-th H, and sample number of 528-th through 542-nd sample. The b2 pulse is displayed at the position of scanning lines of 80-th H through 96-th H, and sample number of 544-th through 558-th sample. The b1 pulse is displayed at the position of scanning lines of 80-th H through 96-th H, and sample number of 560-th through 574-th sample. The b0 pulse is displayed at the position of scanning lines of 80-th H through 96-th H, and sample number of 576-th through 590-th sample.

Figure 5:
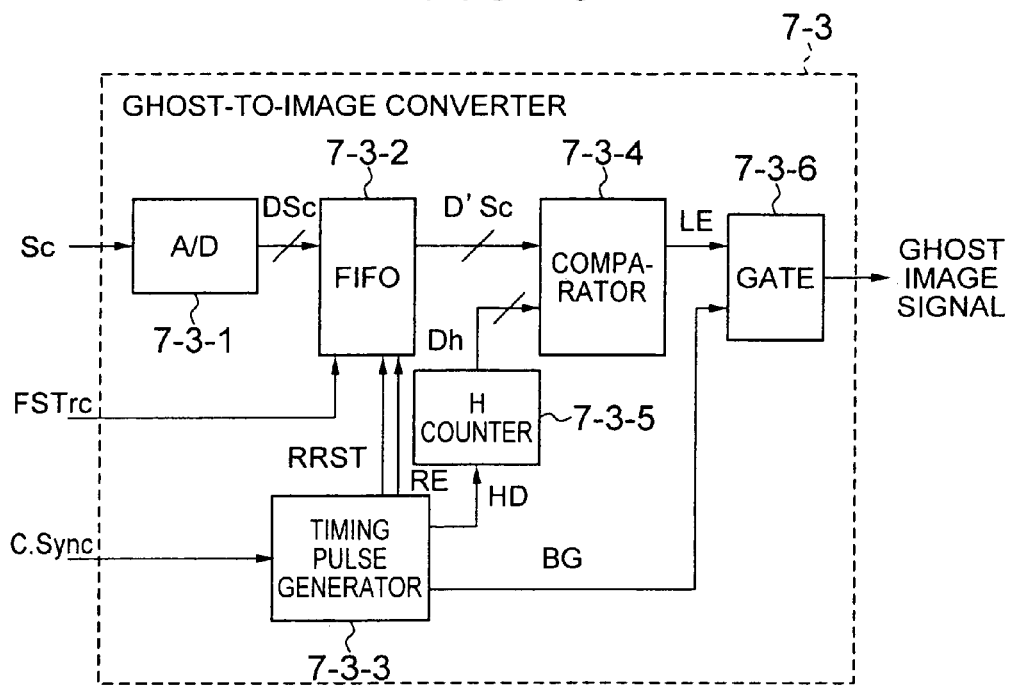
FIG. 5 is a block diagram showing the construction of one embodiment of the ghost-status-to-image converter 7-3 according to the invention.

FIG. 5 is a block diagram of one embodiment of the ghost-status-to-image converter 7-3. This example will be described.

The correlation output signal Sc indicative of the ghost-status is supplied to and converted by an A/D converter 7-3-1 to a digital correlation output signal DSc of 8 bits. This signal DSc is supplied to an input of a FIFO 7-3-2. The pulse FSTrc with frame period is supplied to the write-in reset terminal of the FIFO 7-3-2. The digital correlation output signal D'Sc from the FIFO 7-3-2 is supplied to a comparator 7-3-4. The output from the comparator 7-3-4, or a ghost level signal LE is supplied to a gate 7-3-6. The synchronizing signal C.Sync is supplied to a timing pulse generator 7-3-3. The generator 7-3-3 is responsive to the synchronizing signal C.Sync to supply a read reset signal RRST and read enable signal RE to the FIFO 7-3-2, a synchronizing signal HD to an H-counter 7-3-5, and a blanking gate signal BG to the gate 7-3-6. The H-counter 7-3-5 generates a triangular-wave signal Dh of H (Horizontal scanning) period in response to the signal HD, and supplies it to the comparator 7-3-4.

Figure 6:
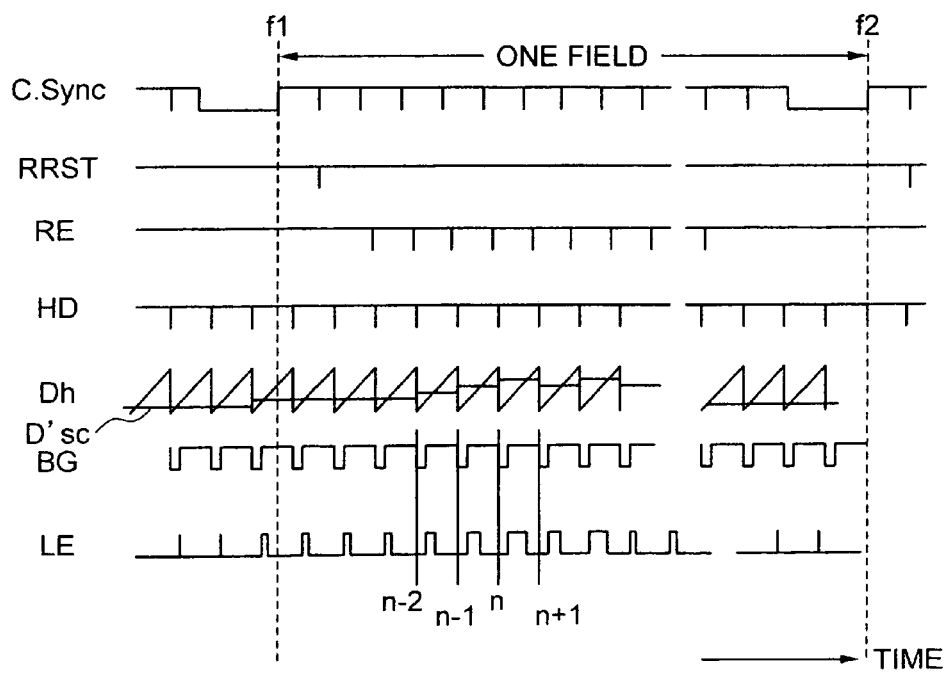
FIG. 6 is a timing chart showing waveforms in the ghost-status-to-image converter 7-3 according to the invention.

FIG. 6 is a timing chart showing the relation among the signals C.Sync, RRST, RE, HD, Dh, BG and LE. The operation of this converter will be described with reference to FIGS. 5 and 6.

The timing pulse generator 7-3-3 generates the reset signal RRST at the start of each video field period, and forces the FIFO (first-in first-out memory) 7-3-2 to make it ready to read from the first written-in content. In addition, it generates the RE signal at each H period, and orders the FIFO 7-3-2 to sequentially read the written-in contents (DSc) one by one. The signal D'Sc read at each video H-period is supplied to the comparator 7-3-4 where it is compared with the value Dh of each H-period. Thus, the comparator produces the ghost level signal LE that becomes level "High" when D'Sc is larger than Dh, or D'Sc>Dh. Here, in order to prevent the signal LE from being generated in the blanking periods, the signal BG that becomes level "Low" in the blanking periods is generated, making the ghost level signal LE forcibly level "Low".

Therefore, if the correlation output signal Sc has high level, the gate 7-3-6 produces the signal LE of a long High-level period as the ghost-status imaging signal, or ghost imaging signal.

Figure 7:
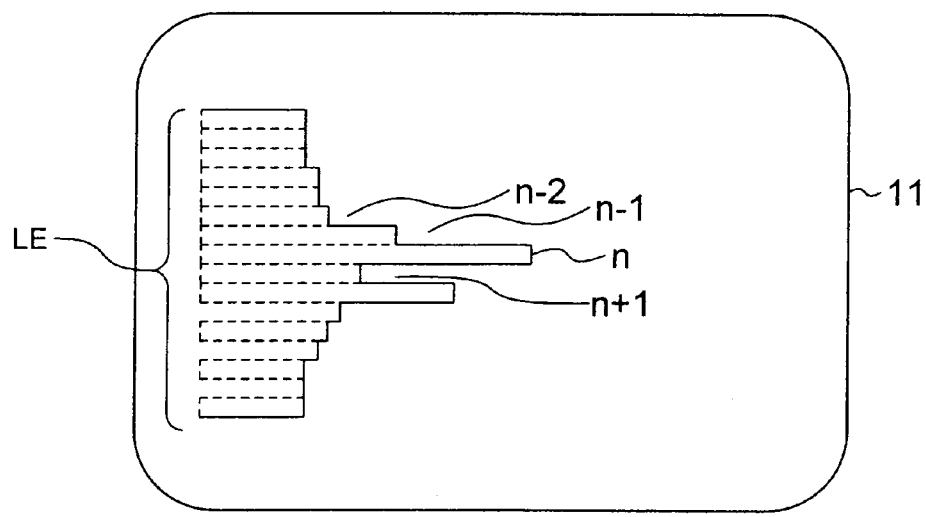
FIG. 7 is a schematic diagram showing one example of the displayed state of the ghost-status imaging signal according to the invention.

A description will be made of the case in which the ghost imaging signal is displayed by a bar graph on the left side of the display screen in the vertical direction along the time base as shown in FIG. 7. Here, it is assumed that the ghost level signal LE corresponding to the n-th scanning line is the main wave, and takes the maximum. It is also assumed thaat the signal Dh is incremented by one at each two samples, and finally reaches about 450.

If the signal D'Sc corresponding to the n-th scanning line is a value of 241, the time at which the value of Dh from the H-counter 7-3-5 exceeds 241 is at the 482-nd sample, and thus the ghost level signal LE will be level "High" during the time interval of the first sample through 482-nd sample. However, since the signal BG is L level during the interval from the first sample to 90-th sample, the signal LE gated is level "Low" when the signal BG is level "Low". Thus, the ghost imaging signal corresponding to the n-th scanning line become level "High" during the interval from 91-st sample to 482-nd sample, with the result that the LE of the n-th scanning line can be displayed as shown in FIG. 7.

If the signal D'Sc corresponding to the (n+1)-th scanning line is a value of 123, the time at which the value of Dh exceeds 123 is at the 246-th sample. The LE will be level "High" during the interval from the first sample to the 246-th sample. However, since the signal BG of L level is supplied to the gate as mentioned above, the ghost imaging signal corresponding to the (n+1)-th scanning line becomes level "High" during the interval from the 91-st to the 246-th sample, so that the LE of the (n+1)-th scanning line is displayed as shown in FIG. 7.

Similarly, if the signal D'Sc corresponding to the (n−2)-th scanning line is a value of 89, the time at which the value of Dh exceeds 89 is at the 178-th sample, and thus the ghost level signal LE will be level "High" during the interval from the first sample to the 178-th sample. However, since the signal BG of L level is supplied to the gate as above, the ghost imaging signal of the (n−2)-th scanning line becomes level "High" during the interval from the 91-st to 178-th sample, and thus displayed as shown in FIG. 7.

Figure 8:
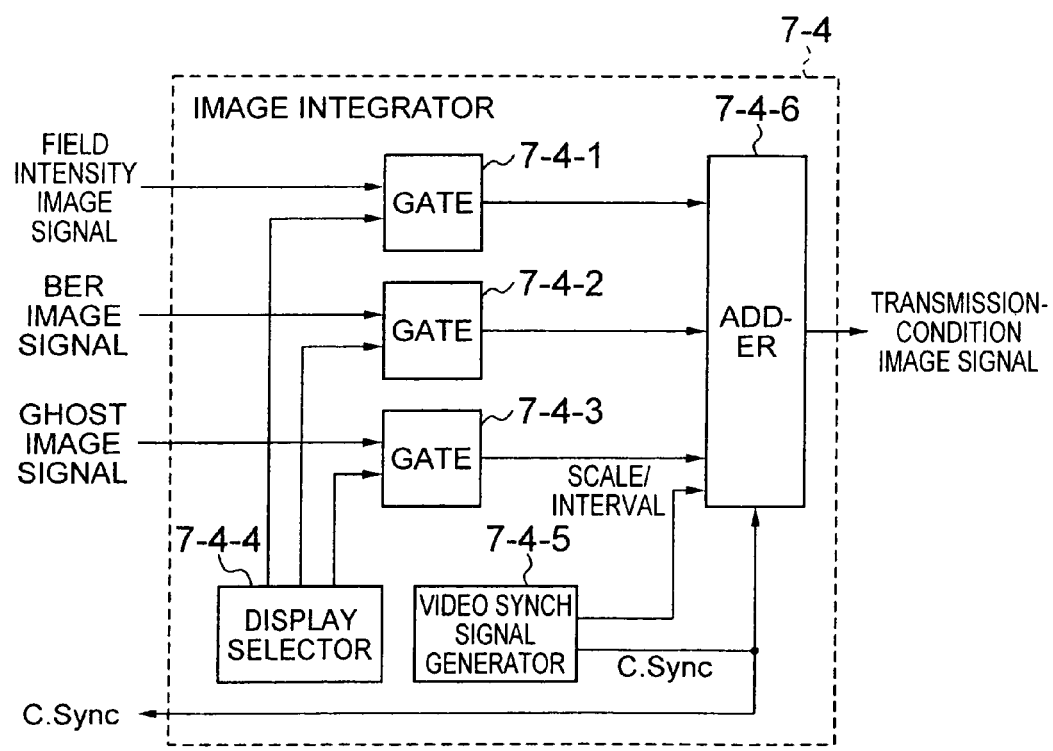
FIG. 8 is a block diagram showing the construction of one embodiment of the image integrator 7-4 according to the invention.

FIG. 8 is a block diagram of one embodiment of the image integrator 7-4. This integrator will be described.

The field-intensity imaging signal, BER imaging signal and ghost imaging signal are supplied to an adder 7-4-6 via gates 7-4-1, 7-4-2, 7-4-3, respectively.

A display selector 7-4-4 generates signals for individually selecting (ON/OFF) one being displayed, of the field-intensity imaging signal, BER imaging signal and ghost imaging signal. A video synchronizing signal generator 7-4-5 supplies the synchronizing signal C.Sync to the adder 7-4-6 and the outside, and a pulse indicative of the time base scale and guard interval for the ghost imaging signal to the adder 7-4-6. If the video synchronizing signal generator 7-4-5 is used for NTSC, it makes logic processing by use of a $\frac{1}{910}$ frequency dividing counter that counts at a clock of 14.3 MHz and is reset with H-period, and by a $\frac{1}{525}$ frequency dividing counter that counts at a clock of ½ H (Horizontal period) and is reset with V (Vertical)-period. The gates 7-4-1, 7-4-2, 7-4-3 respectively respond to the signals from the display selector 7-4-4 to allow the field-intensity imaging signal, BER imaging signal and ghost imaging signal to pass therethrough or not. The adder 7-4-6 adds each imaging signal that has passed through the gate 7-4-1, 7-4-2, 7-4-3, and the signal indicative of the scale and interval in synchronism with the synchronizing signal C.Sync to produce a transmission-condition imaging signal in order that each imaging signal can be displayed as blocks, dots or bar graph of a certain size on the display screen at a predetermined position.

One example of the rates of the imaging signals to be added in the adder 7-4-6 will be given below. If all signals fed to the adder 7-4-6 have +5 V in digital level, the rates of the field-intensity imaging signal, BER imaging signal and ghost imaging signal are 0.2, the rates of the scale signal and interval signal are 0.05, and the rate of the synchronizing signal C.Sync is 0.1. Thus, the transmission-condition imaging signal generated has about 1 $\text{Volt}_{p-p}$ including the synchronizing signal.

Figure 9A:
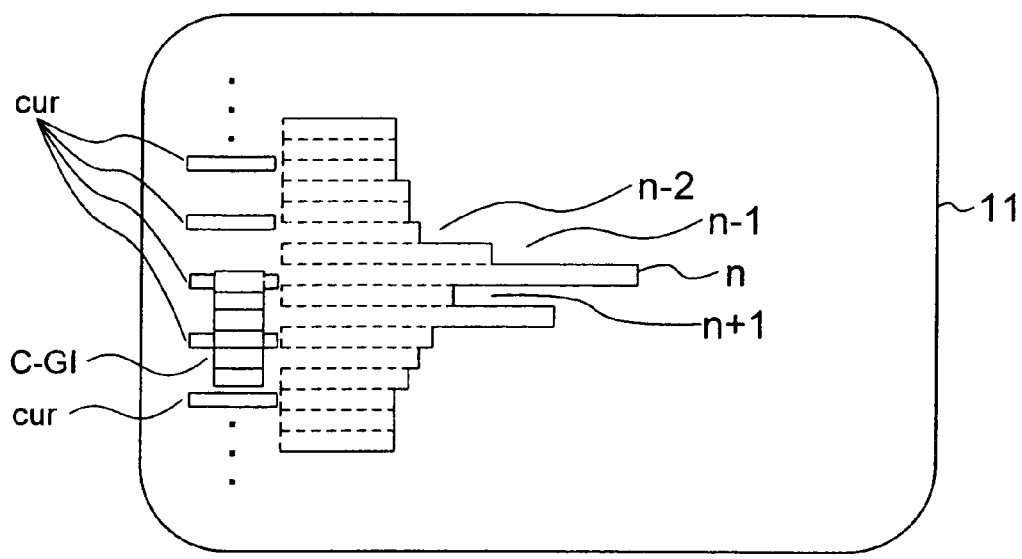
FIG. 9A is a schematic diagram showing one example of the displayed state of the time scale and guard interval of the ghost-status imaging signal.
Figure 9B:
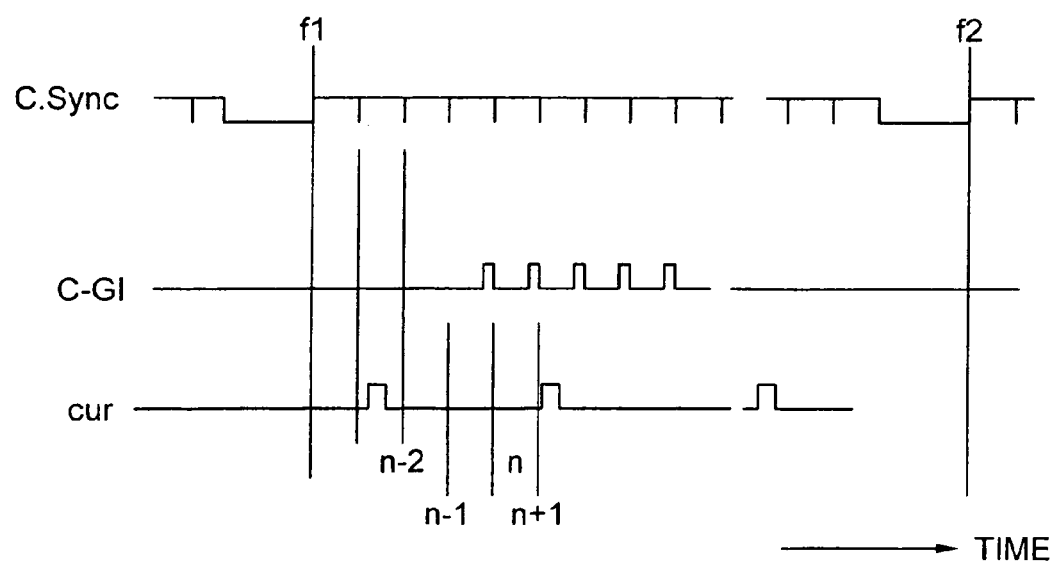
FIG. 9B is a timing chart of the signal occurrence of synchronizing signal, scale signal and interval signal.

FIG. 9A is a schematic diagram showing a signal cur of time base scale and a signal C-GI of guard interval for the ghost imaging signal on the monitor screen. FIG. 9B is a timing chart showing the generation of the scale signal cur and interval signal C-GI with respect to the synchronizing signal C.Sync.

It is assumed that the time scale signal cur becomes level "High" at intervals of 16 Hs in the range from the 32-nd H to the 240-th H and at lateral positions from the 108-th to 144-th sample within the effective range of the monitor. It is also assumed that the interval signal C-GI becomes level "High" at scanning lines from the 112-nd H to 160-th H, and in the sample range from the 112-nd to 128-th sample.

The signal C-GI indicative of the guard interval, when the transmission condition is normal, is set to start being displayed from the n-th scanning line at which the main wave should exist, and to end 48 Hs after when the guard interval is 3 μsec and the sampling clock frequency for OFDM is 16 MHz. Thus, it becomes a band shape image indicating 3 μsec. The signal cur indicative of the time scale, if the sample clock frequency for OFDM is 16 MHz, provides a scale at intervals of 1 μsec by setting it to be level "High" at intervals of 16 Hs.

FIGS. 10A to 10E are schematic diagrams showing different transmission-condition displaying screens. With reference to these figures, a description will be made of the situation in which the operator can correctly grasp the present transmission-condition by displaying the ghost imaging signal, BER imaging signal and field intensity imaging signal on the monitor.

Figure 10A:
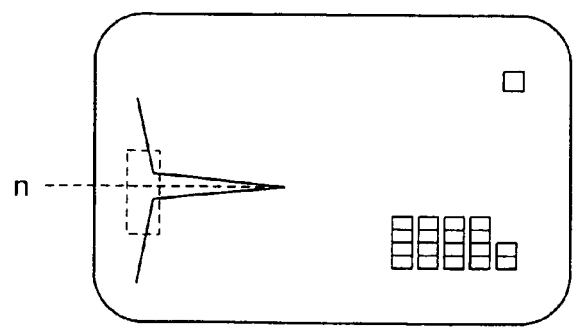
FIGS. 10A through 10E are schematic diagrams showing examples of the transmission-conditions displayed according to the invention.

FIG. 10A shows one example of the ghost image displayed when the main wave of high level with no reflected wave is received. In this case, a high-level peak indicating the main wave is present at around the n-th scanning line within a guard interval of 2 μsec indicated by a dotted line. In addition, the BER condition displayed on the upper right side and the field intensity displayed on the lower right side are satisfactory values. Thus, it will be seen that this screen shows a very good transmission-condition.

Figure 10B:
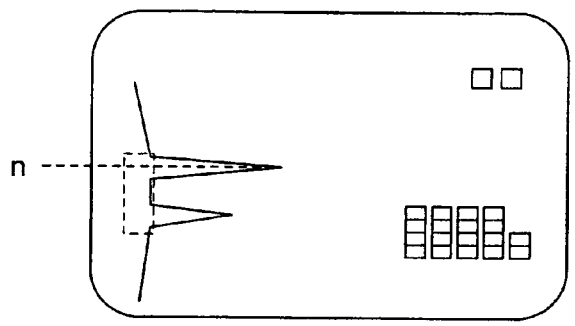

FIG. 10B shows one example of the ghost image displayed when the main wave of high level is received and a reflected wave of intermediate level is received within the guard interval (2 μsec) after the reception of the main wave. In this case, the high-level main wave exists at around the n-th scanning line within the guard interval, and the second peak of intermediate level is displayed at about ⅔ of the guard interval. From this screen, it will be understood that the reflected wave of intermediate level exists as the second peak and is within a delay time of about 2 μsec, or within the guard interval so as to be neglected. In addition, the BER condition and field strength are relatively good. Consequently, this screen shows a satisfactory transmission-condition.

Figure 10C:
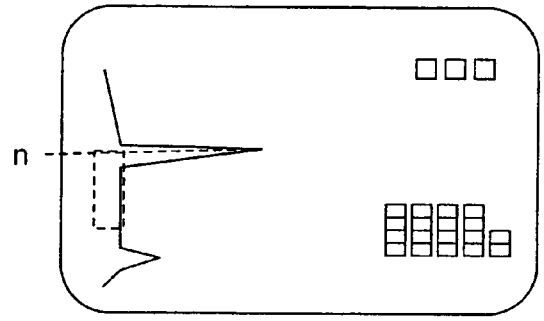

FIG. 10C shows one example of the ghost image displayed when the main wave of high level is received and a reflected wave of low level is received 5 μsec after the reception of the main wave, or beyond the guard interval. In this case, a high peak of the high-level main wave exists at around the n-th scanning line within the guard interval, and a second low peak appears beyond the guard interval. From this figure, it will be understood that, since a reflected wave of a low level peak occurs about 5 μsec after the main wave, or beyond the guard interval, the effect of the reflected wave cannot be compensated by the guard interval. In addition, the field intensity is good, but the BER is somewhat poor. Thus, this screen shows a slightly unsatisfactory transmission condition. In this case, the operator might adjust the antenna orientation so that the delay time of the reflected wave can be confined within the guard interval.

Figure 10D:
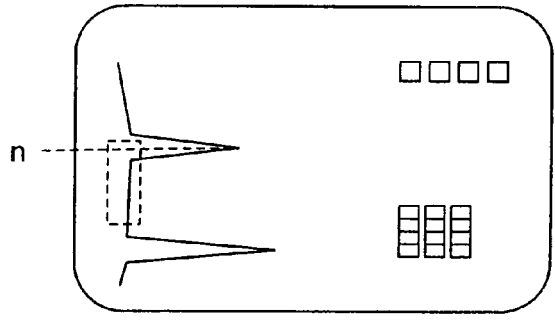

FIG. 10D shows one example of the ghost image displayed when the main wave of intermediate level is received, and when a reflected wave of high level occurs 5 μsec after the reception of the main wave, or beyond the guard interval. In this case, a peak of the main wave exists at around the n-th scanning line within the guard interval, and the second peak of high level appears out of the guard interval. From this figure, it will be understood that since the reflected wave of larger level than the main wave occurs about 5 μsec after the main wave, or beyond the guard interval, the reflected wave of high level cannot be neglected. In addition, the BER, and field intensity are both poor. Thus, this screen shows an unsatisfactory transmission-condition. In this case, the operator would need to adjust the antenna orientation so that the level of the main wave in the received siganl can be increased.

Figure 10E:
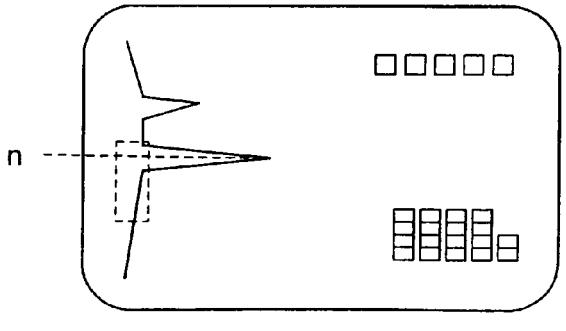

FIG. 10E shows one example of the ghost image displayed when the main wave of low level is received, and when a reflected wave of high level arrives as short as 2 μsec after the reception of the main wave.

In this case, a low peak of the main wave exists before the n-th scanning line, and a second high peak appears at around the n-th scanning line within the guard interval. From the figure, it will be seen that not the main wave of the first low peak but the reflected wave of the second high peak is about to be received and synchronized with. In addition, the field intensity is satisfactory, but the BER is poor. Thus, this screen shows a considerably unsatisfactory transmission-condition.

Since this reflected wave of high level is normally not kept high level, but will disappear before long, it is highly likely that phase shifting of clock occurs to switch the synchronized reception back to the main wave when the reflected wave level is reduced. In this case, there is the possibility that the BER value becomes very poor, and it can be predicted that a very poor transmission-condition occurs in a short time. Therefore, this received signal might not be used for video broadcasting. A signal received from other outside broadcast vans might be used.

Thus, by displaying the ghost imaging signal, BER imaging signal and field intensity imaging signal on the monitor display, it is possible to correctly grasp the transmission-condition because the conditions of these imaging signals can be comprehensively observed in association with each other.

Therefore, the operator to adjust the antenna orientation is able to effectively make alignment operation while viewing these displayed images.

FIG. 11 is a block diagram of one embodiment of the transmission-condition image superimposing device 7b for superimposing the transmission-condition imaging signals and the received and decoded video signal. This superimposing device 7b can replace the transmission-condition-to-image converter 7 shown in FIG. 1. This superimposing device 7b will be described below.

The digital data $D_{out}$ produced from the receiving-side processor 203 of FIG. 1 by OFDM demodulation is decoded by an MPEG decoder not shown into the video signal, which is then supplied to the image integrator 7b-4. The control signal Sa indicative of a field intensity, the signal Sb indicative of BER, and the correlation output signal Sc are supplied to a field-intensity-to-image converter 7b-1, a BER-to-image converter 7b-2 and a ghost-to-image converter 7b-3, respectively. The imaging signals from those converters are supplied to the image integrator 7b-4.

Figure 12:
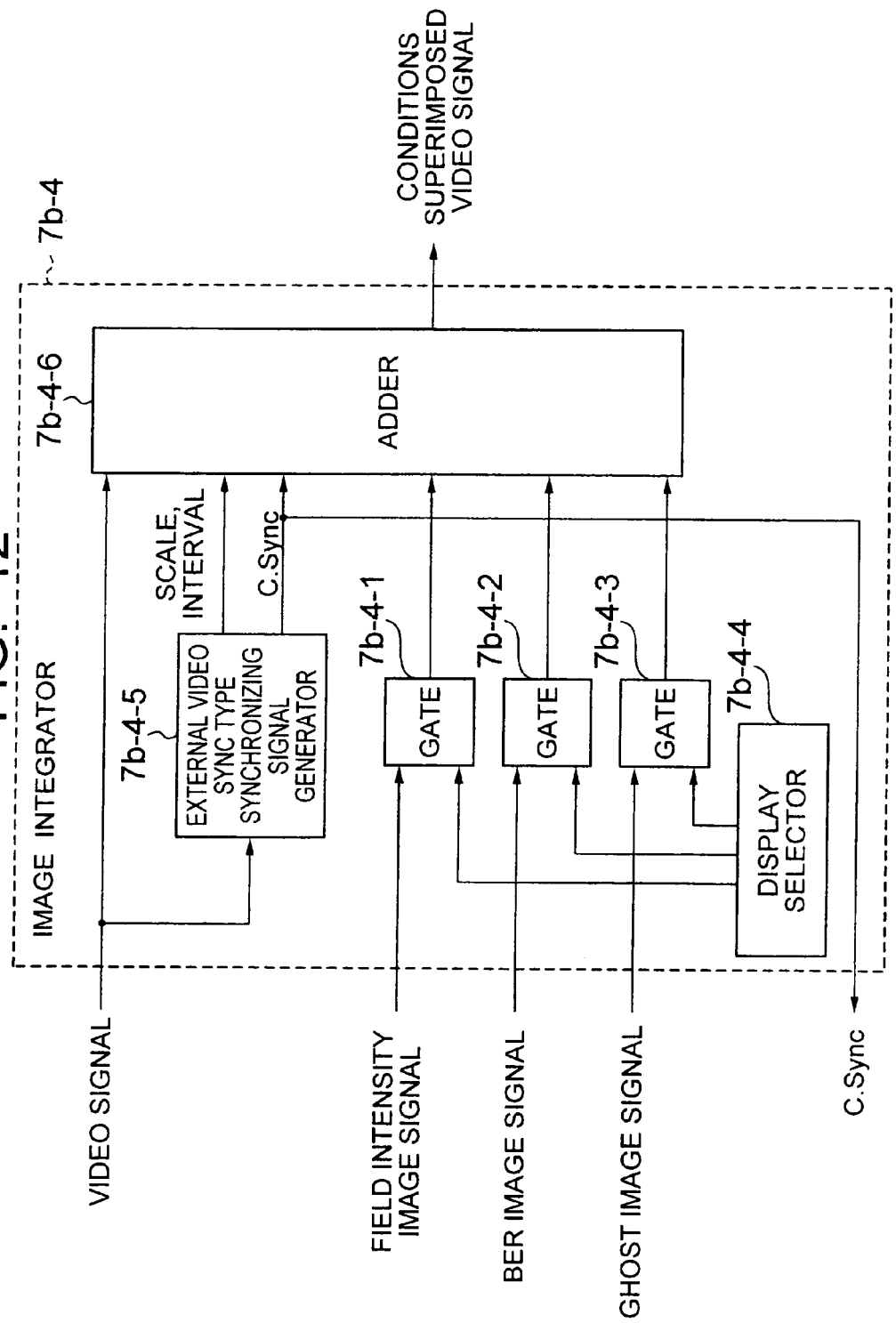
FIG. 12 is a block diagram showing the construction of one embodiment of the image integrator 7b-4 according to the invention.

FIG. 12 is a block diagram of this image integrator 7b-4. This integrator will be described.

The video signal resulting from the reception and decoding is supplied to an external video synch type synchronizing signal generator 7b-4-5 and to an adder 7b-4-6. The field intensity imaging signal, BER imaging signal and ghost imaging signal are supplied via gates 7b-4-1, 7b-4-2, 7b-4-3 to the adder 7b-4-6.

A display selector 7b-4-4 generates signals for individually selecting (ON/OFF) ones being displayed, of the field intensity imaging signal, BER imaging signal and ghost imaging signal. The external video synch type synchronizing signal generator 7b-4-5 supplies the synchronizing signal C.Sync resulting from extracting from the input video signal to the adder 7b-4-6 and to the outside, and also a pulse of the time base scale and guard interval for the ghost imaging signal to the adder 7b-4-6. The gates 7b-4-1, 7b-4-2, 7b-4-3 respond to the selection signals from the display selector 7b-4-4 to allow the field intensity imaging signal, BER imaging signal and ghost imaging signal to be passed therethrough or not. The adder 7b-4-6 responds to the C.Sync to add the imaging signals passed through the gates 7b-4-1, 7b-4-2, 7b-4-3, the pulse signal of the scale and interval, and the video signal produced by the reception and decoding to produce a transmission-conditions superimposed imaging signal so that each imaging signal can be displayed in a certain size at a position.

This transmission-conditions superimposed imaging signal is displayed on a monitor. Thus, since the operator can comprehensively view the reproduced images of those imaging signals in association with each other, the transmission-conditions can be correctly grasped as compared with the case shown in FIG. 10.

One example of the addition rates of those signals in the adder 7b-4-6 will be given below.

If all the signals fed to the adder 7b-4-6 are +5 V in digital level, the rates of the field intensity imaging signal, BER imaging signal and ghost imaging signal are 0.2, the rates of the time scale signal and interval signal are 0.05, and the rate of the analog video signal of which the video portion is about 0.7 V is one.

Figure 13:
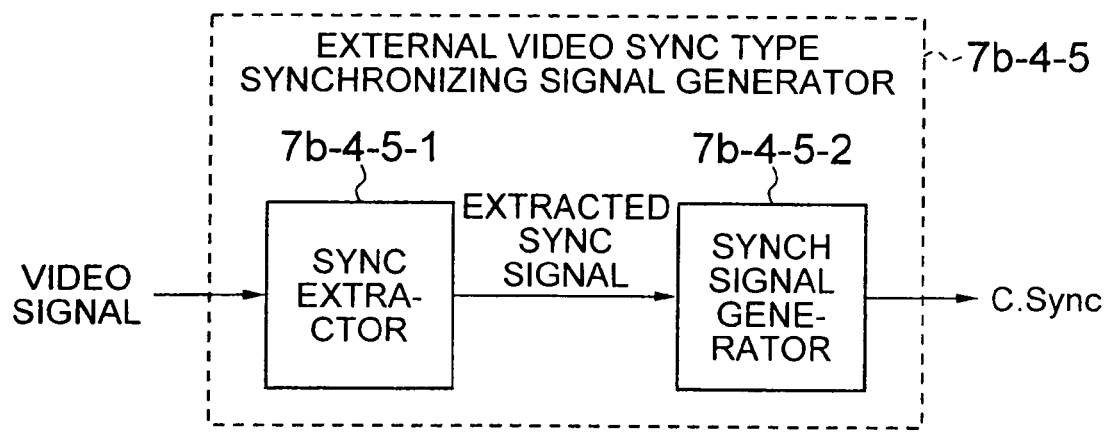
FIG. 13 is a block diagram showing the construction of one embodiment of the synchronizing signal generator 7b-4-5 according to the invention.

FIG. 13 is a block diagram of one embodiment of the external video synch type synchronizing signal generator 7b-4-5. This generator will be described.

In the external video synch type synchronizing signal generator 7b-4-5, a synchronizing signal extractor 7b-4-5-1 extracts the external synch signal from the input video signal. In addition, a synch signal generator 7b-4-5-2 produces the internal synch signal C.Sync in synchronism with the external synch signal.

The pulse of the above time base scale and guard interval is similarly produced as in the above image integrator 7-4.

Figure 14:
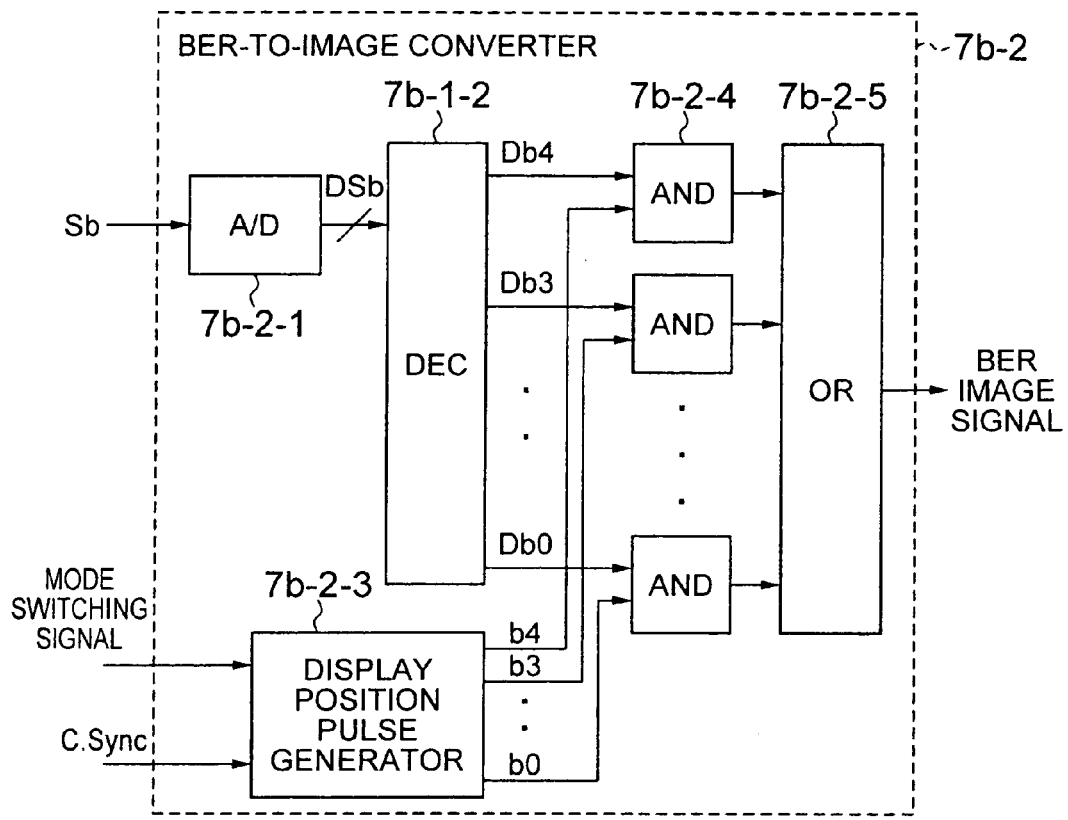
FIG. 14 is a block diagram showing the construction of one embodiment of the BER-to-image converter 7b-2 according to the invention.

FIG. 14 is a block diagram of one embodiment of the BER-to-image converter 7b-2 of the display position switching type. The portions different from the BER-to-image converter 7-2 will be described.

Figure 15:
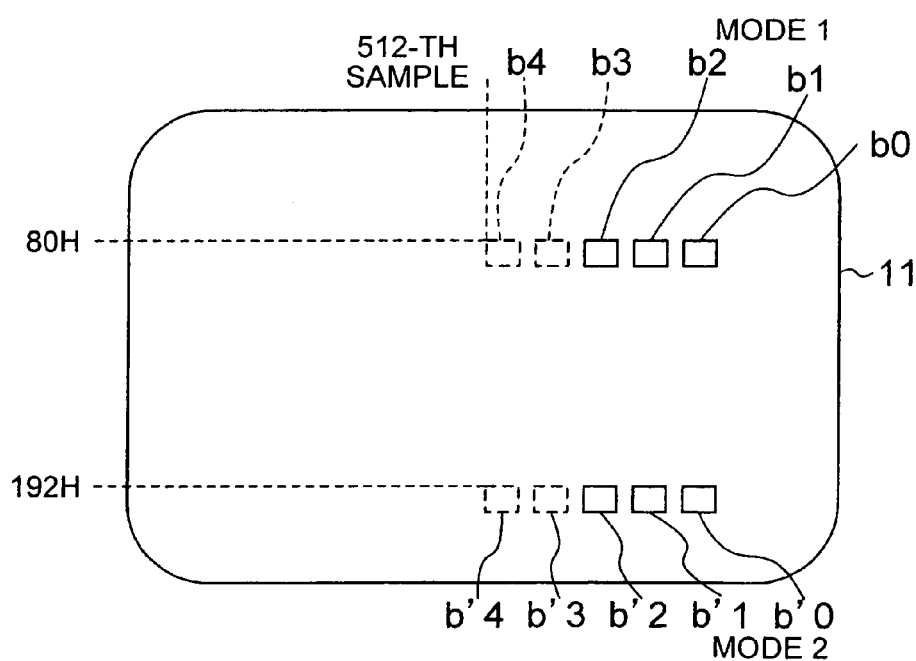
FIG. 15 is a schematic diagram showing one example of the displayed state of the BER imaging signal according to the invention.

A display position pulse generator 7b-2-3 generates pulses b0 through b4 for the indication of BER in synchronism with the sync signal C.Sync like the BER-to-image converter 7-2, but it also generates, by a mode switching signal, pulses b'0 through b'4 corresponding to another position. FIG. 15 schematically shows the situation in which the images can be displayed by switching at different positions corresponding to these pulses b0 through b4, b'0 through b'4.

If the generator 7b-2-3 is used for NTSC, it makes logical processing by use of a 1/10 frequency dividing counter that counts at a clock of 14.3 MHz and is reset at each H-period, and a 1/525 frequency dividing counter that counts at a clock of 1/2 H and is reset at each V-period.

Thus, in the case of using the mode switching signal=High (mode 1), the blocks are displayed at a position corresponding to the pulse b0 through b4 on the upper right side. In the case of using the mode switching signal=Low (mode 2), the blocks are displayed at a position corresponding to the pulse b'0 through b'4 on the lower right side.

For example, as shown in FIG. 15, the b4 signal is displayed at a position of scanning lines 80-th H through 96-th H, and of sample number 512-nd through 526-th sample. The b3 signal is displayed at a position of scanning lines 80-th H through 96-th H, and of sample number 528-th through 542-nd sample. The b2 signal is displayed at a position of scanning lines 80-th H through 96-th H, and of sample number 544-th through 558-th sample. The b1 signal is displayed at a position of scanning lines 80-th H through 96-th H, and of sample number 560-th through 574-th sample. The b0 signal is displayed at a position of scanning lines 80-th H through 96-th H, and of sample number 576-th through 590-th sample.

In addition, the b'4 signal is displayed at a position of scanning lines 192-nd H through 208-th H, and of sample number 520-th through 534-th sample. The following signals b'3, b'2 and b'1 are displayed at positions in the same way. The signal b'0 is displayed at a position of scanning lines 192-nd H through 208-th H, and of sample number 584-th through 598-th sample.

Figure 16:
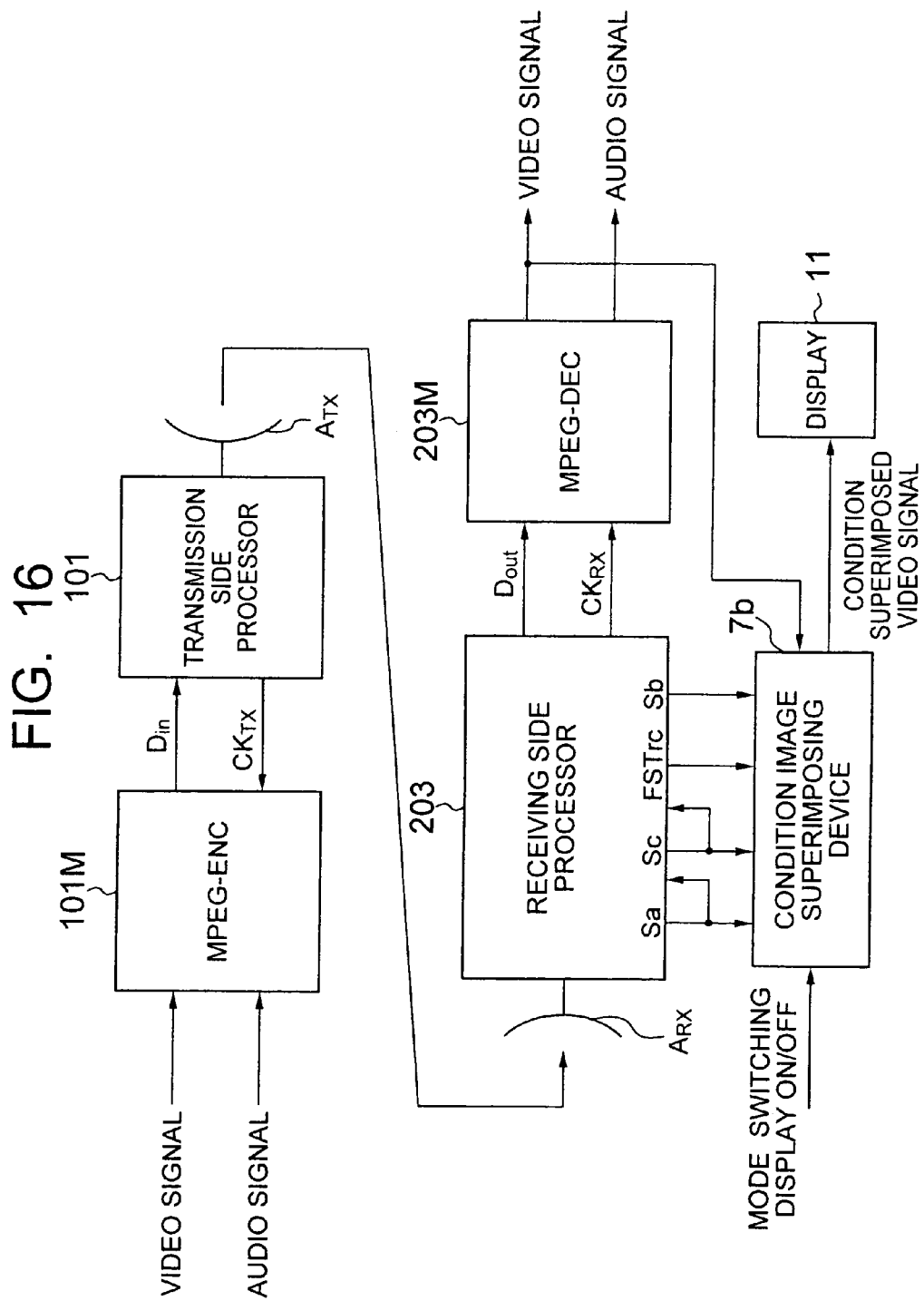
FIG. 16 is a block diagram showing the whole construction of another embodiment of a video/audio transmission system according to the invention.
Figure 18:
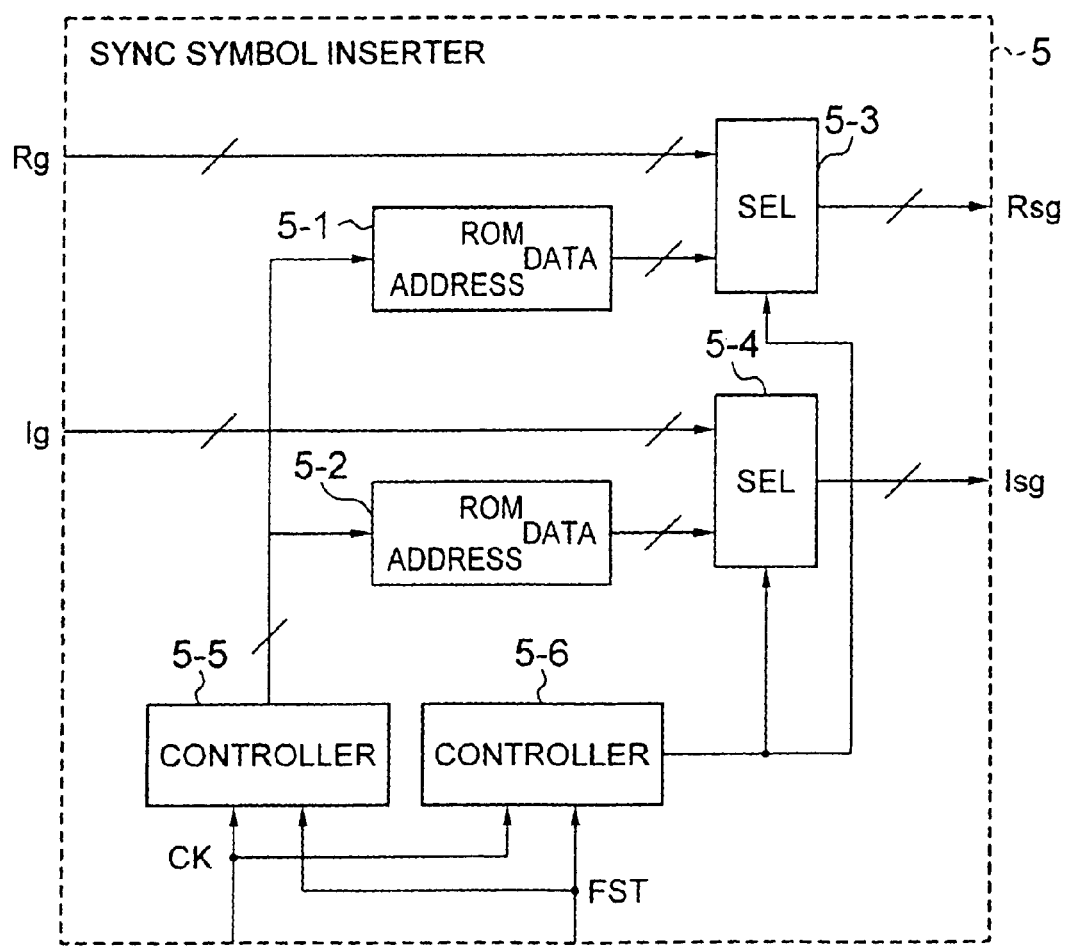
FIG. 18 is a block diagram showing the construction of the synchronizing symbol inserter 5 of the transmission system of FIG. 17.
Figure 19:
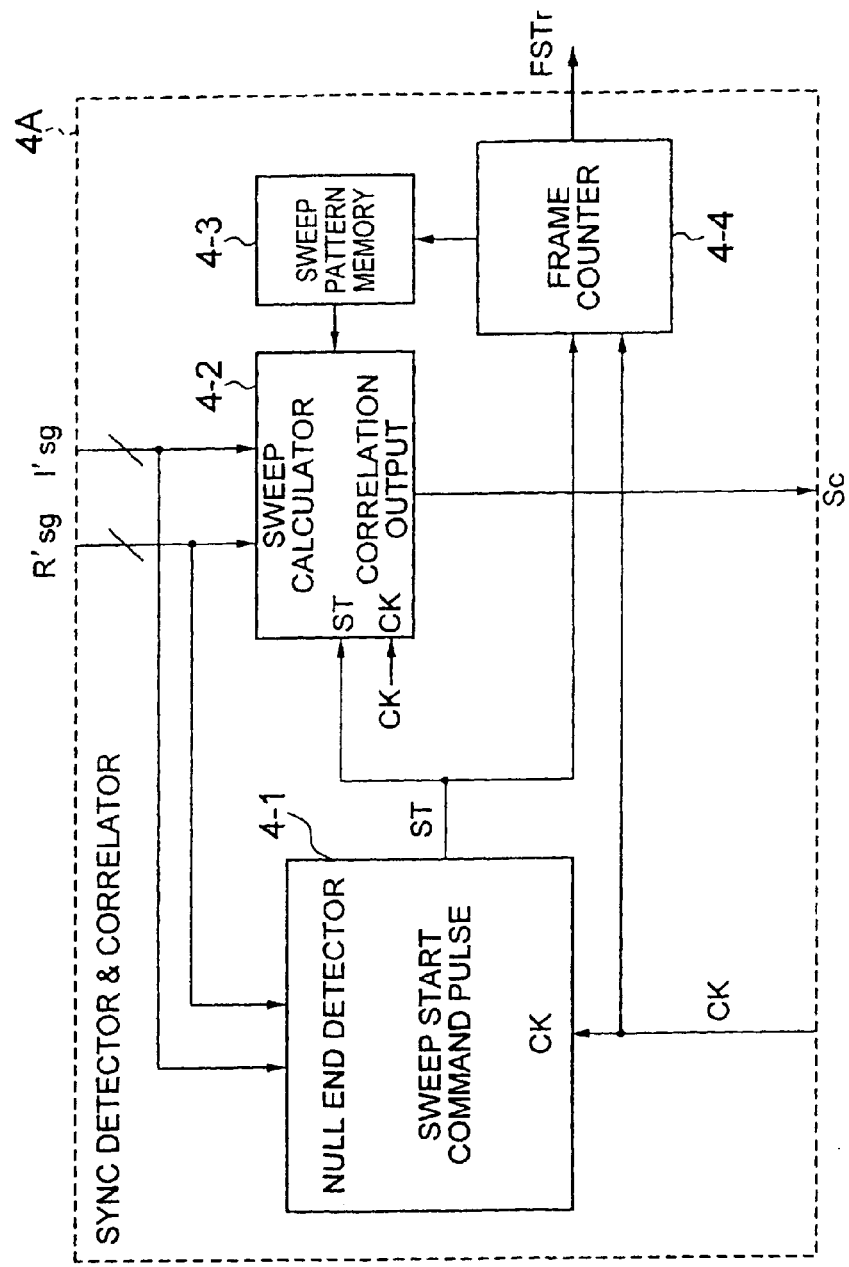
FIG. 19 is a block diagram showing the construction of the synchronizing detector & correlator 4A of the transmission system of FIG. 17.
Figure 20:
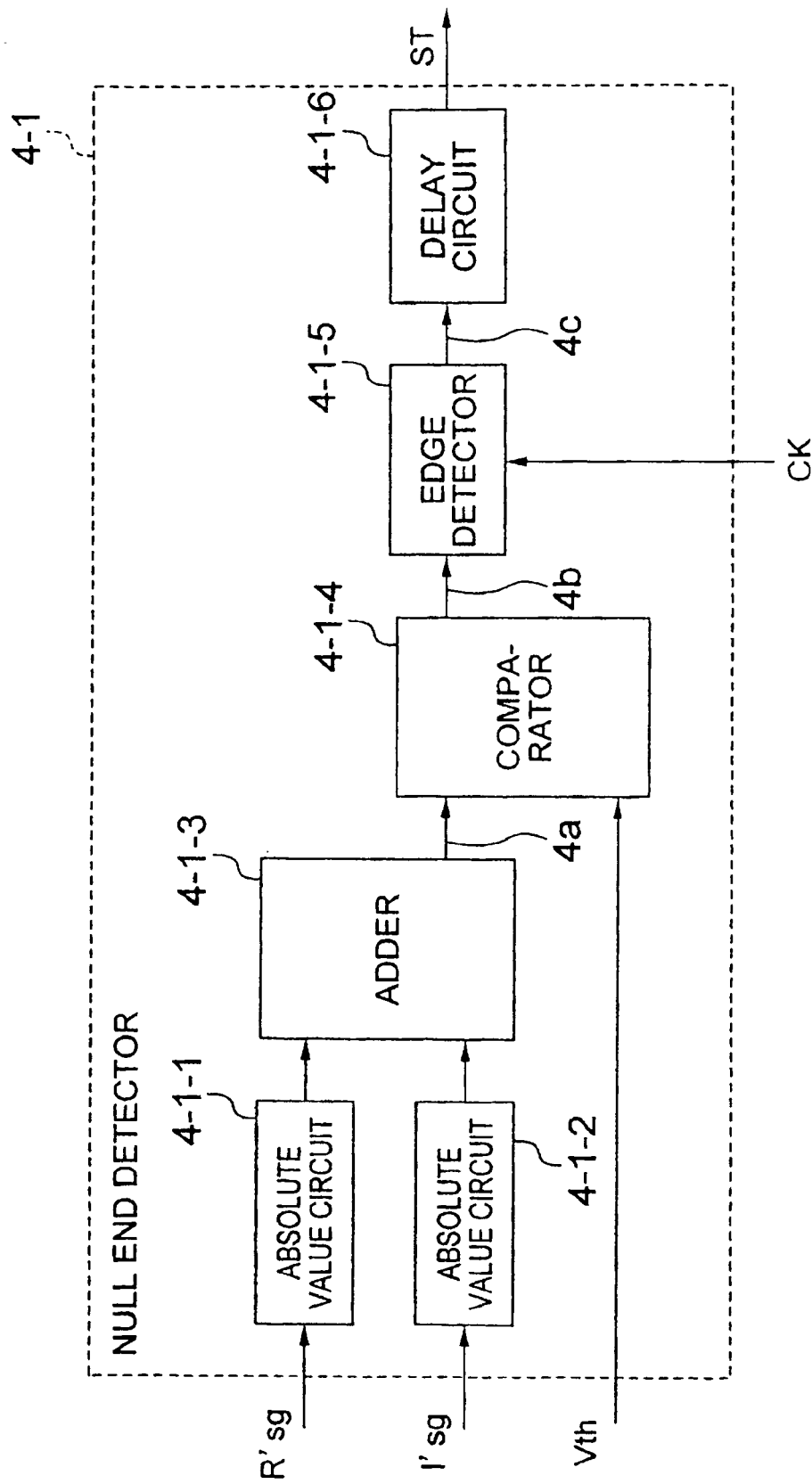
FIG. 20 is a block diagram showing the construction of the NULL end detector 4-1 of the synchronizing detector & correlator 4A of FIG. 19.
Figure 21:
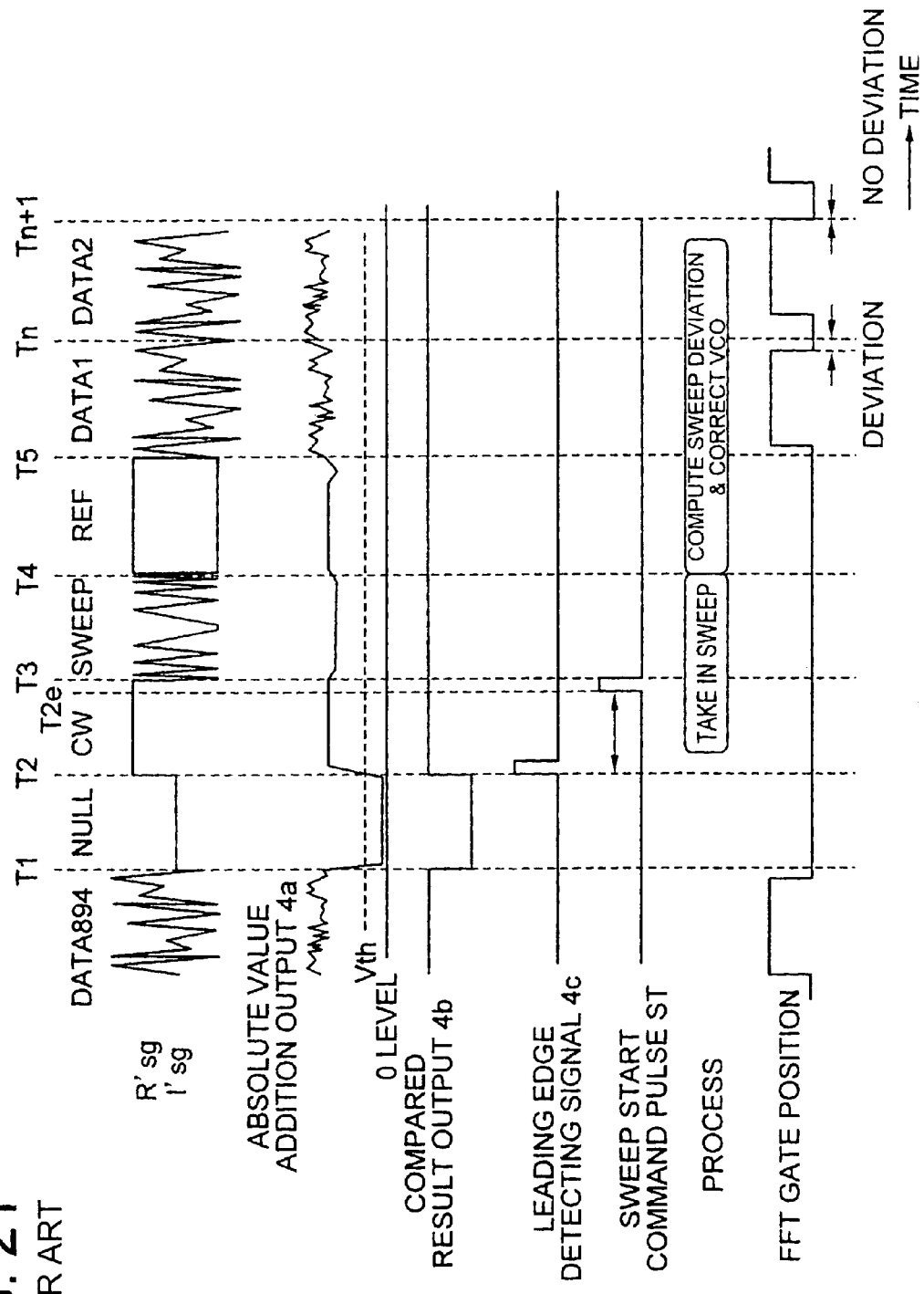
FIG. 21 is a timing chart to which reference is made in explaining the operation for the NULL detection and SWEEP start position estimation.
Figure 22A:
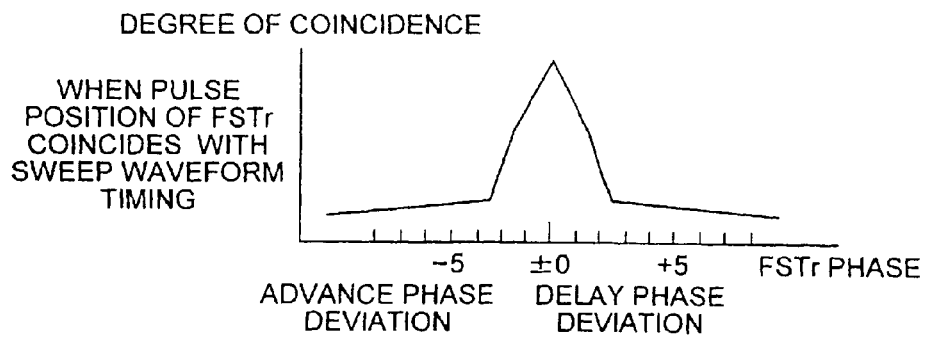
FIGS. 22A, 22B and 22C are graphs showing examples of the correlation output signal $S_C$ with no reflected wave.
Figure 22B:
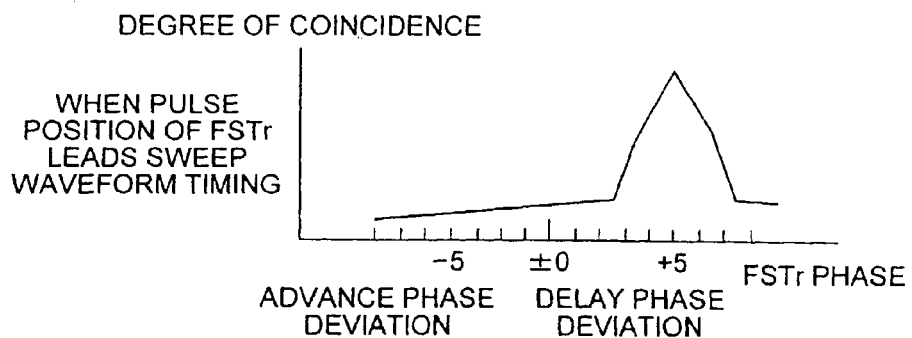
Figure 22C:
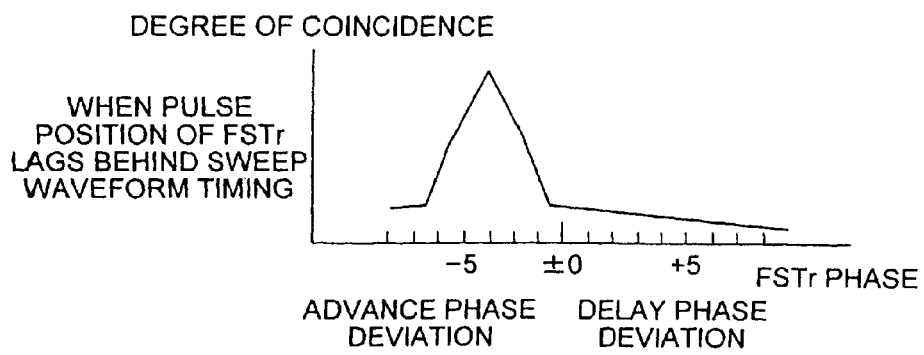
Figure 23:
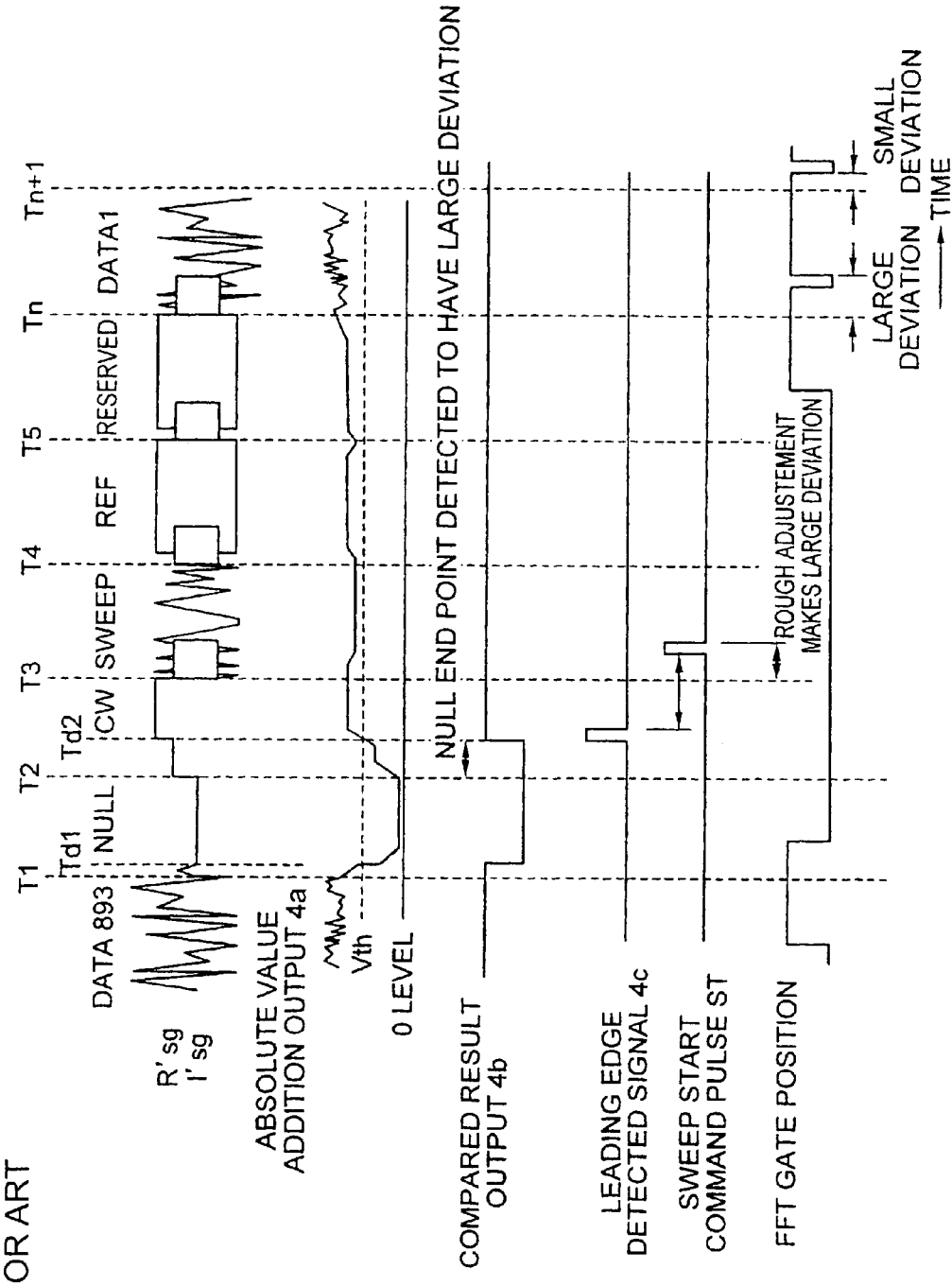
FIG. 23 is a timing chart to which reference is made in explaining the operation for the NULL detection and SWEEP start position estimation.
Figure 24:
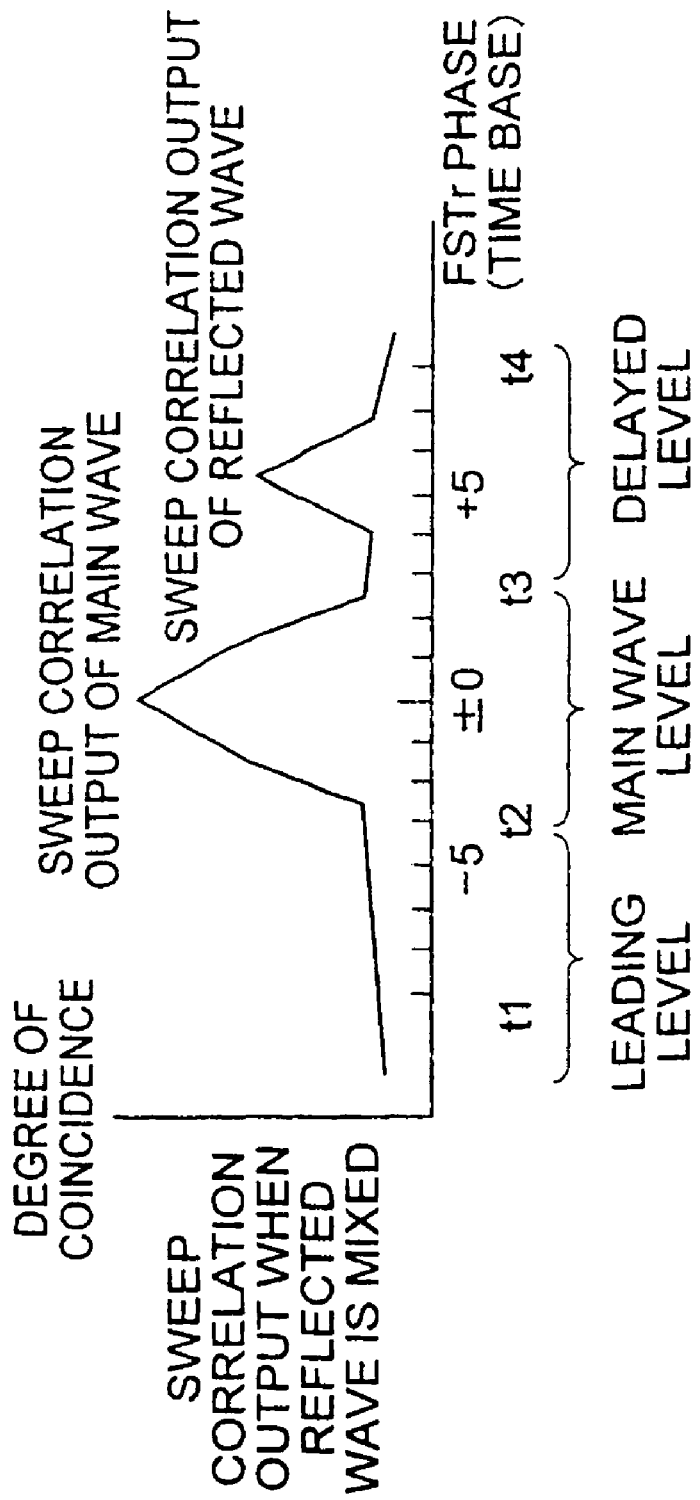
FIG. 24 is a graph showing one example of the correlation output signal $S_C$ with reflected waves mixed.
Figure 25:
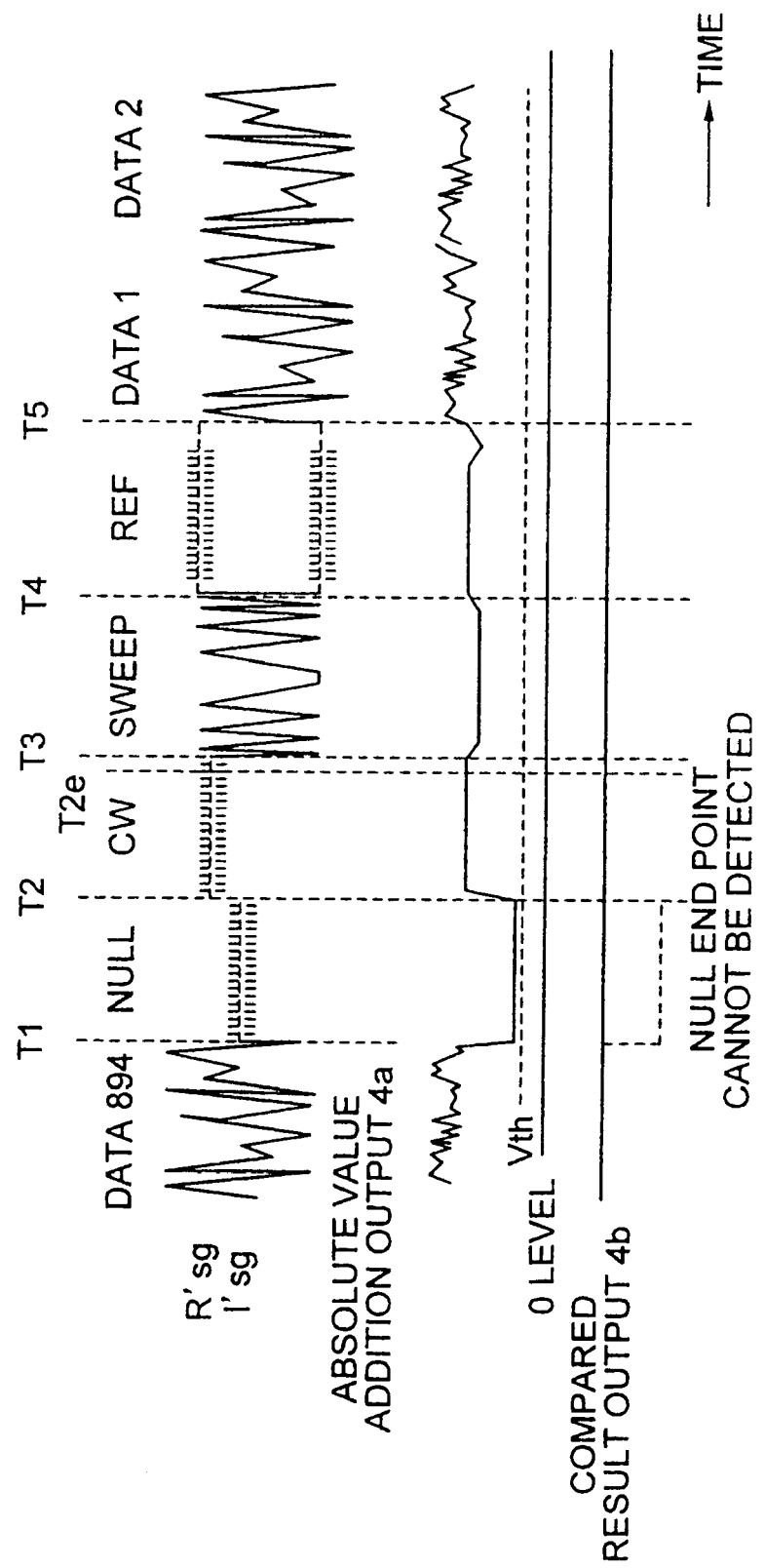
FIG. 25 is a timing chart to which reference is made in explaining the operation for the NULL detection and SWEEP start position estimation.
Figure 26:
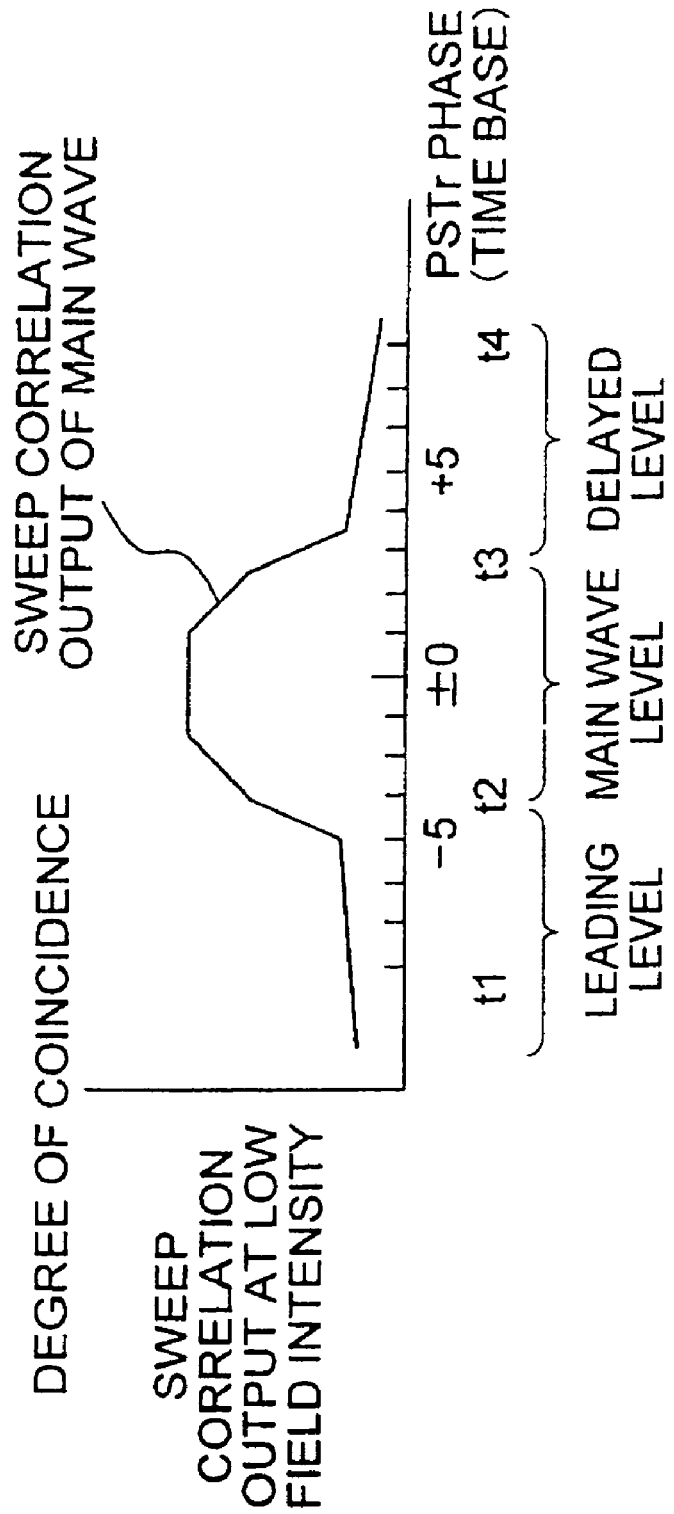
FIG. 26 is a graph showing one example of the correlation output signal $S_C$ at a low field strength.

FIG. 16 is a block diagram of one embodiment of a video/audio transmission system, having a combination of the transmission system according to the invention and a video codec, by which the aforementioned transmission-condition images are superimposed on an MPEG decoded image before being displayed. Portions different from the transmission system using OFDM modulation system shown in FIG. 1 will be described.

On the transmission side, a video signal and an audio signal are fed to an MPEG-ENC (encoder) 101 M, where they are converted to compressed digital data $D_{in}$ in synchronism with the reference clock $CK_{TX}$ fed from the transmission-side processor 101. On the receiving side, the transmitted and received signal is demodulated by the receiving-side processor 203. The demodulated output $D_{out}$ is supplied to an MPEG-DEC (decoder) 203 M for expansion. The video signal expanded by the MPEG-DEC 203 M is supplied to the transmission-condition video superimposing device 7b that is the same as shown in FIG. 11, where it is superimposed on each condition imaging signal, and the time scale and guard interval signal as shown in FIG. 2B to produce a transmission-condition superimposed video signal.

This transmission-condition superimposed video signal is displayed on the video display 11. Thus, since each condition imaging signal and the received and decoded video signal can be comprehensively observed in association with each other, the operator is able to correctly grasp the transmission conditions.

According to the invention, since the field intensity, BER and ghost are converted to imaging signals, they can be displayed on a common type of video display, and hence they can be displayed in optimum sizes according to situations, if necessary.

Moreover, if the ghost imaging signal within a certain level range is displayed in a different way (with a different luminance level or hue) from signals occurring within other level ranges, the operator is able to quickly find the transmission condition that is to be noted.

In addition, if the guard interval of the ghost imaging signal is displayed in a different way (with a different luminance level or hue) to distinguish from other condition imaging signals, the operator can promptly find the transmission condition that is to be looked out or considered.

Also, since the transmission-condition measured data are converted to imaging signals, they can be recorded on video cassette recorders or other recording media, and thus a large amount of transmission-condition data measured and collected can be recorded easily and at low cost.

Therefore, since the ghost imaging signal, BER imaging signal and field intensity imaging signal can be displayed on a video monitor, the various condition images can be comprehensively seen in association with each other, and hence the operator can correctly understand the transmission conditions.

Accordingly, the antenna alignment operator can effectively perform the alignment operation while viewing the imaged information on the screen.

Another embodiment of the ghost-to-image converter different from the ghost-to-image converters 7-3, 7b-3 (FIGS. 5 and 11) in the transmission-condition-to-image converter 7 and transmission-condition image superimposing device 7b (FIGS. 2A and 11) will be described with reference to FIGS. 27, 28 and 29.

Since the ghost-status imaging signal produced from the ghost-to-image converter 7-3 shown in FIG. 5 is vertically displayed as an image like a bar graph on the left side of the screen as shown in FIG. 7, the resolution is limited by the number of scanning lines. Moreover, since the time base is displayed in the vertical direction, it is inconsistent with the human sixth sense, so that in the alignment operation in which the operator needs swift decision, he additionally makes the mental operation to change the direction of time base in his mind though it is unconnected with the original operation.

Thus, in this embodiment, the ghost imaging signal indicative of a ghost status is displayed in the lateral direction with respect to the screen with the display resolution or display range magnified, and the time base is provided in the lateral direction. Consequently, the alignment operator can view the ghost status with the same feeling as he watches the oscilloscope screen.

Figure 27:
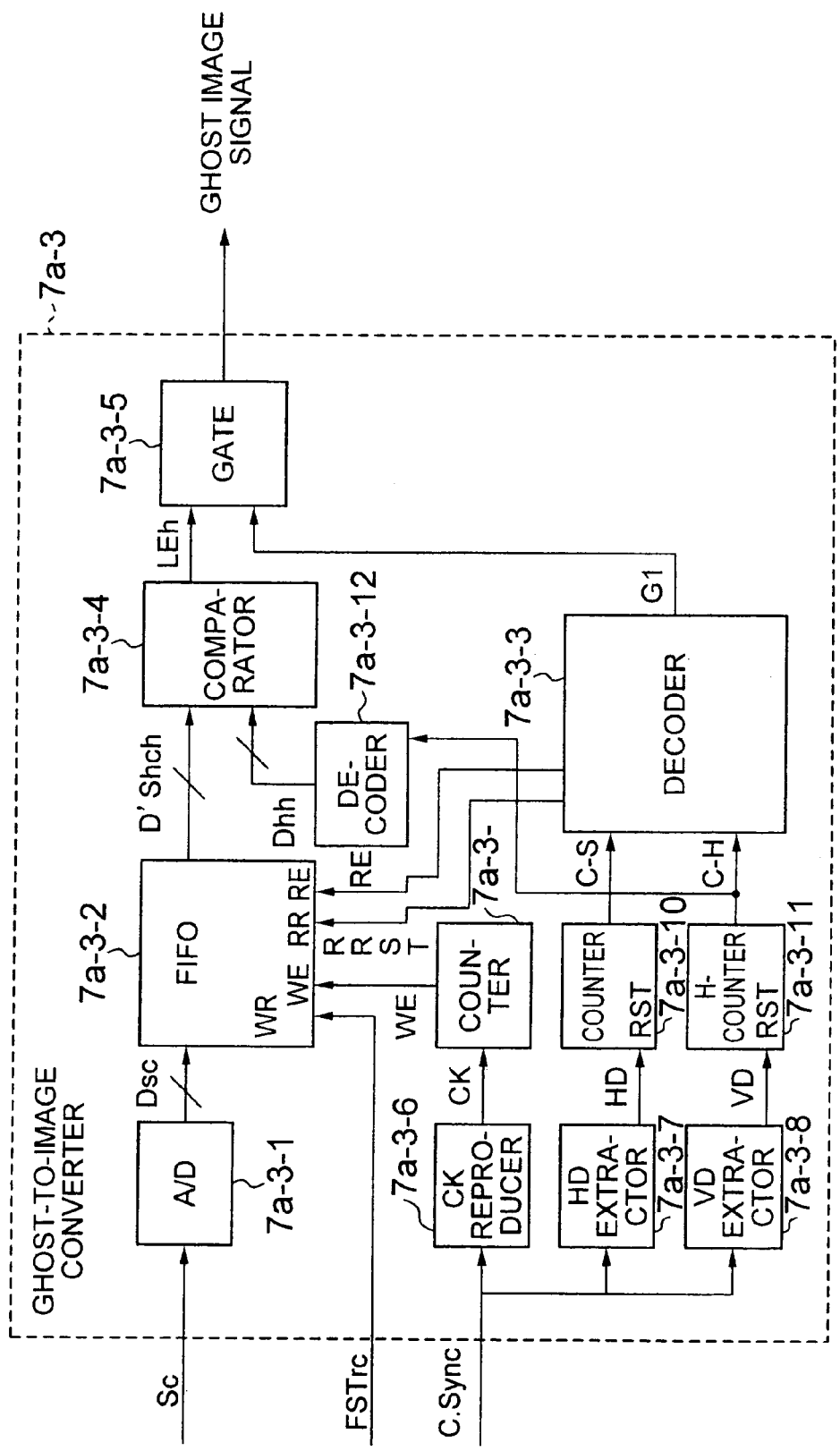
FIG. 27 is a block diagram showing one embodiment of a ghost-status-to-image converter 7a-3 according to the invention.

FIG. 27 is a block diagram showing the construction of the ghost-to-image converter 7a-3 for lateral display according to the invention. FIG. 28 is a schematic diagram showing the image-displayed screen. FIG. 29 is a diagram showing the waveforms of signals.

The constructions of the other portions than the ghost-to-image converters 7-3, 7b-3 of the transmission-condition-to-image converter 7 and transmission-condition image superimposing device 7b will not be described because they are the same as in FIGS. 2, 5 and 11.

Referring to FIG. 27, the correlation output signal Sc indicative of the ghost status is supplied to and converted by an A/D converter 7a-3-1 into the digital correlation output signal DSc of, for example, 8 bits. This signal DSc is supplied to an FIFO 7a-3-2.

The pulse FSTrc of frame period is supplied to an input terminal of the write-in reset terminal of the FIFO 7a-3-2. The digital correlation output signal D'Sch from the FIFO 7a-3-2 is supplied to a comparator 7a-3-4. The output, or ghost level signal LEh from the comparator 7a-3-4 is supplied to a gate 7a-3-5.

Moreover, the synchronizing signal C.Sync is supplied to a clock (CK) reproducer 7a-3-6, an HD extractor 7a-3-7 and a VD extractor 7a-3-8. The clock produced from the CK reproducer 7a-3-6 is supplied to a counter 7a-3-9. The output WE from the counter 7a-3-9 is supplied to the WE terminal of the FIFO 7a-3-2.

The output HD from the HD extractor 7a-3-7 is supplied to a counter 7a-3-10. The output C-S from the counter 7a-3-10 is supplied to a first decoder 7a-3-3.

The output VD from the VD extractor 7a-3-8 is supplied to an H-counter 7a-3-11. The output C-H from the H-counter 7a-3-11 is supplied to the first decoder 7a-3-3 and a second decoder 7a-3-12.

The first decoder 7a-3-3 supplies a read reset signal RRST to the RR terminal of the FIFO 7a-3-2, and a read enable signal RE to the RE terminal of the FIFO 7a-3-2.

The output (D'Sch) from the FIFO 7a-3-2 is supplied to an input of the comparator 7a-3-4. The output Dhh from the second decoder 7a-3-12 is supplied to the other terminal of the comparator 7a-3-4. The output LEh from the comparator 7a-3-4 is supplied to the gate 7a-3-5.

The CK reproducer 7a-3-6 reproduces a clock (CK) of, for example, 14.3 MHz from the synchronizing signal C.Sync. The counter 7a-3-9 divides the frequency of the CK, and generates the WE signal with the period depending on that of the correlation output signal Sc. The HD extractor 7a-3-7 extracts the H-period component from the synchronizing signal C.Sync, and produces the HD signal with H-period. The counter 7a-3-10 is reset by the HD signal, and produces the counter signal C-S that increases at each CK period. The VD extractor 7a-3-8 extracts the V-period component from the synchronizing signal C.Sync, and produces the VD signal with V-period. The H-counter 7a-3-11 is reset by the VD signal, and produces the counter signal C-H that increases at each H-period.

Figure 29:
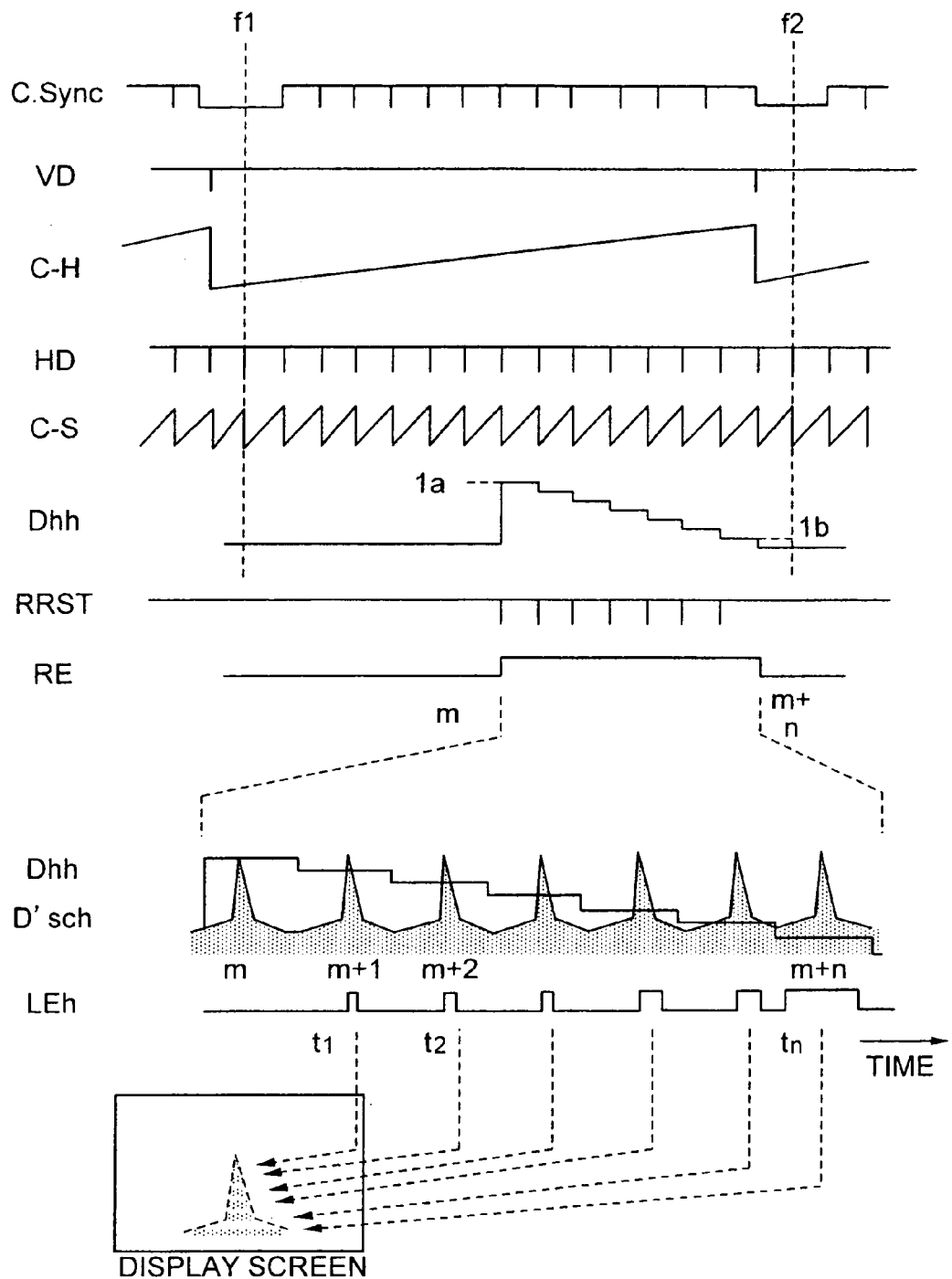
FIG. 29 is a timing chart showing waveforms in the ghost-status-to-image converter 7a-3 of FIG. 27.

The decoder 7a-3-3 receives the counter signals C-S, C-H and produces the read reset signal RRST that takes level "Low" in 1 H period at each CK period within the interval from the m-th scanning line to the (m+n)-th scanning line in each V-period as shown in FIG. 29. Thus, the read address to the FIFO 7a-3-2 is initialized into address 0.

In addition, the read enable signal RE that takes level "High" during each interval from the m-th scanning line to the (m+n)-th scanning line forces the read address to the FIFO 7a-3-2 to proceed, with the result that the output D'Sch as the correlation output signal Sc is read from the FIFO 7a-3-2.

The decoder 7a-3-12 receives the counter signal C-H, and produces level 1a at the m-th scanning line as output Dhh, and then reduces the level by i at each H. At the (m+n)-th scanning line, the decoder produces output Dhh of 1a minus ni.

At this time, the comparator 7a-3-4 compares the D'Sch as the correlation output Sc and the decoder output Dhh, and produces the signal LEh that becomes level "High" when the condition of D'Sch>Dhh is satisfied.

In other words, as illustrated in FIG. 29, since the D'Sch is lower than or equal to Dhh during all the m-th H, the signal LEh remains level "Low". During the (m+1)-th H, the condition of D'Sch>Dhh is satisfied only in a short period, $t_1$ at the center of that H, and at this time the signal LEh becomes level "High". During the (m+2)-th H, since the condition of D'Sch>Dhh is satisfied in a wider period, $t_2$ than the previous short period $t_1$, the signal LEh takes level "High" for more time. Thereafter, after these operations are repeated, the waveform of the correlation output signal Sc is expressed by such a scanning line structure as shown in FIG. 29 at LEh.

Figure 28:
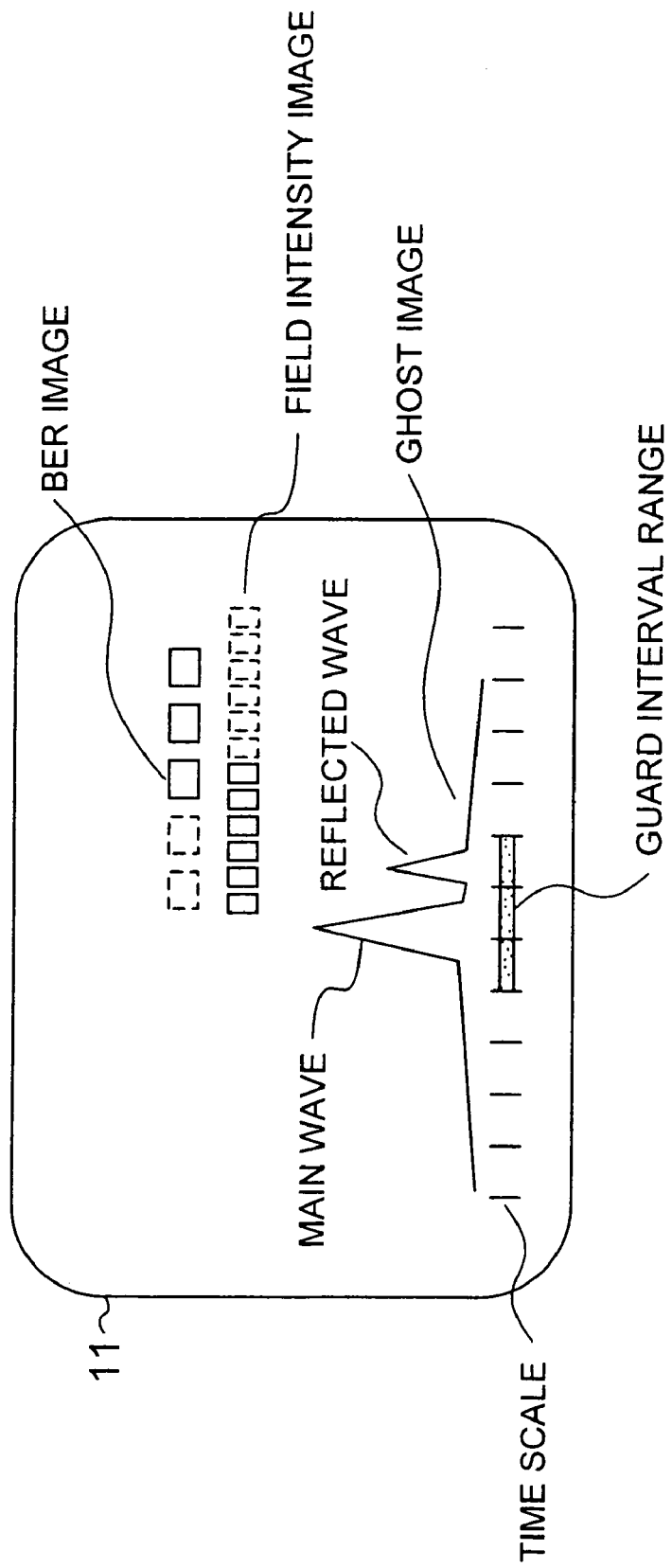
FIG. 28 is a schematic diagram showing one example of the displayed state of each transmission-condition imaging signal according to the invention.

Thus, the correlation output signal Sc indicative of the ghost status can be converted to an image, and as shown in FIG. 28, the ghost image can be laterally displayed with respect to the time base on the screen.

In FIG. 29, for simple explanation, only the main wave of the correlation output signal Sc indicative of the ghost status is expressed as the signal LEh in the form of scanning line structure.

Another embodiment of the converter than the transmission-condition-to-image converter 7, and transmission-condition image superimposing device 7b (FIGS. 2A and 11) will be described with reference to FIGS. 30 through 40.

When we try to grasp the transmission path conditions from the ghost imaging signal, BER imaging signal and field intensity imaging signal, the operator needs to always fix his eyes on the monitor screen against abnormal state occurrence. This becomes a considerable burden on the operator.

In addition, when an abnormal thing occurs suddenly for a very short time, the human cannot perceive it as an abnormal state through the eyes, or the operator cannot grasp correct transmission path conditions.

Thus, in this embodiment, when the apparatus detects that the information indicative of a ghost imaging signal or others has reached a predetermined unsatisfactory level because of poor transmission condition, it superimposes this abnormal transmission-condition waveform on the current normal transmission-condition waveform and keeps it residually displayed as it is for a certain time so that the operator can understand the transmission path characteristics.

In addition, warning sound is emanated at the time of this abnormal state, notifying the operator of the abnormal thing.

Figure 30:
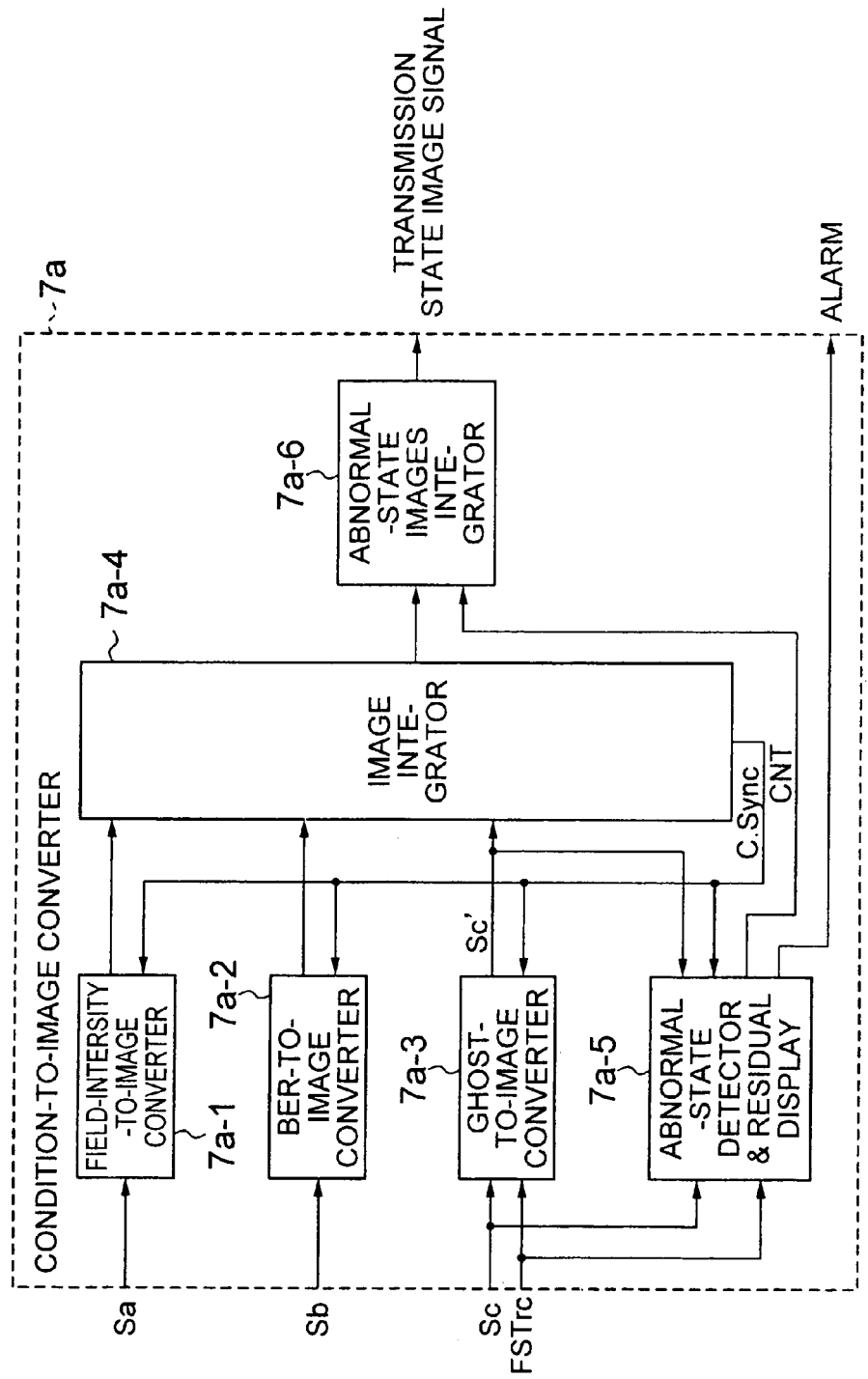
FIG. 30 is a block diagram showing one example of the transmission-condition-to-image converter 7a according to the invention.

FIG. 30 is a block diagram of the construction of the transmission-condition-to-image converter 7a having the abnormality detection and residual displaying functions according to the invention. The transmission-condition-to-image converter 7a is different from the transmission-condition-to-image converter 7 and transmission-condition image superimposing device 7b in that an abnormal state detector & residual image display 7a-5 and abnormal state image integrator 7a-6 are further added.

In this converter, it is not always necessary to simultaneously display the ghost imaging signal, or abnormal state image together with the field intensity and BER imaging signals. This converter can be implemented by hardware, DSP (Digital Signal Processor) or one-chip microcomputer.

Referring to FIG. 30, the correlation output signal Sc indicative of the ghost status, and the pulse FSTrc with frame period are supplied to the abnormal state detector & residual image display 7a-5.

The output S'c of the ghost-to-image converter 7a-3 is connected to the abnormal state detector & residual image display 7a-5. The output from the image integrator 7a-4 and the output CNT from the abnormal state detector & residual image display 7a-5 are supplied to the abnormal state image integrator 7a-6.

The abnormal state detector & residual image display 7a-5 detects the abnormal transmission-condition on the basis of the ghost condition imaging signal Sc' produced from the ghost-to-image converter 7a-3. When detecting the abnormal state, it produces an abnormal state imaging signal. When detecting no signal, it produces a level "Low".

The abnormal state image integrator 7a-6 adds the transmission-condition imaging signal produced from the image integrator 7a-4, and the abnormal state imaging signal produced from the abnormal state detector & residual image display 7a-5, and produces a transmission-condition imaging signal including the abnormal state imaging signal.

Figure 32:
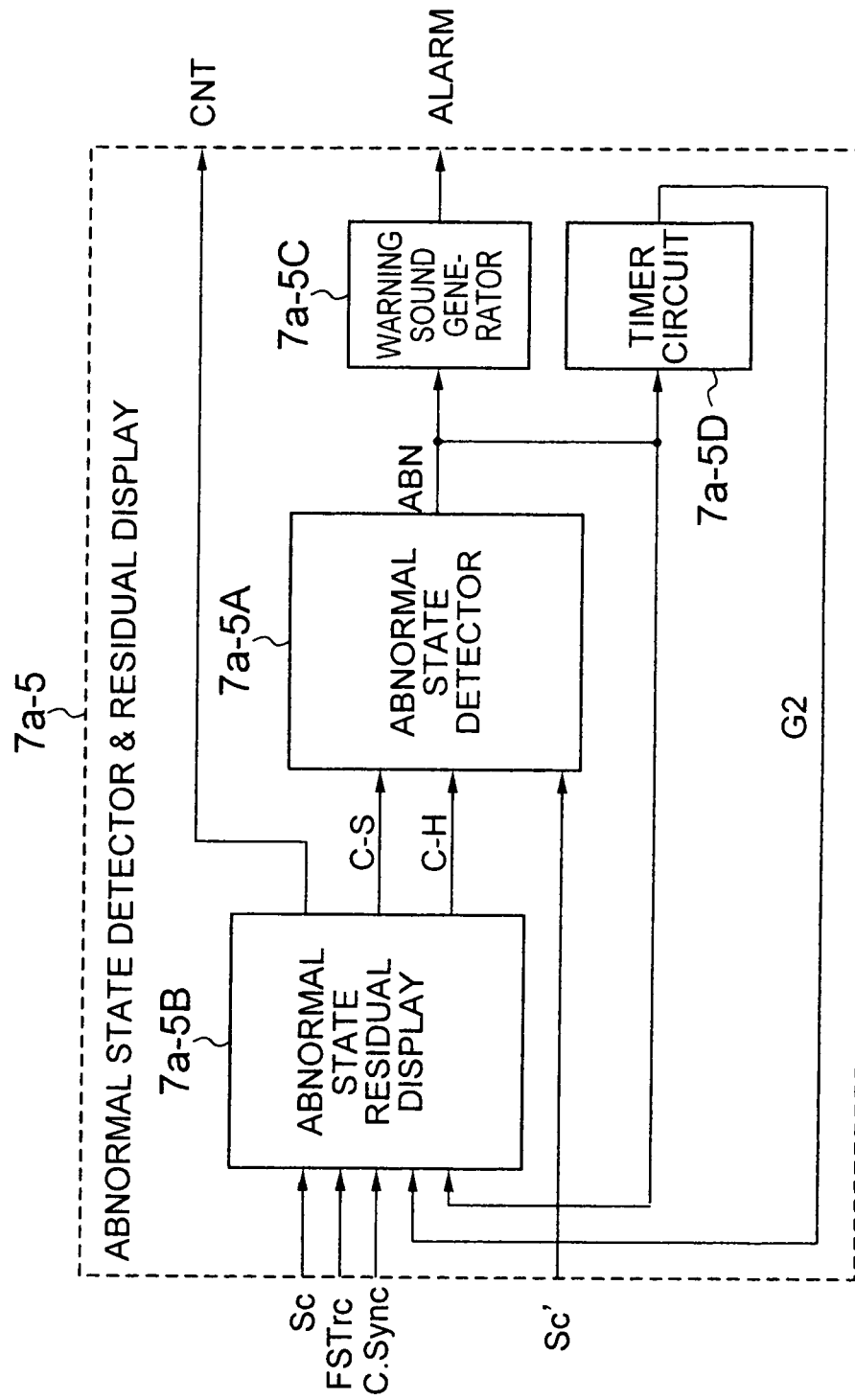
FIG. 32 is a block diagram showing one example of the abnormal-state detector & residual display 7a-5 according to the invention.

FIG. 32 is a block diagram of the construction of the abnormal state detector & residual image display 7a-5. This construction will be described.

The correlation output signal Sc, pulse FSTrc with frame period, and synchronizing signal C.Sync are supplied to an abnormal state residual display 7a-5B.

The ghost imaging signal Sc' is supplied to an abnormal state detector 7a-5A. The outputs C-S and C-H, which will be described later, from the abnormal state residual display 7a-5B are supplied to the abnormal state detector 7a-5. The output ABN from the abnormal state detector 7a-5A is supplied to the abnormal state residual display 7a-5B, warning sound generator 7a-5C and timer circuit 7a-5D. The output G2 from the timer circuit 7a-5D is supplied to the abnormal state residual display 7a-5B.

The abnormal state detector 7a-5A detects the position of ghost condition imaging signal Sc' displayed on the screen on the basis of the outputs C-S and C-H which will be described later.

Figure 31:
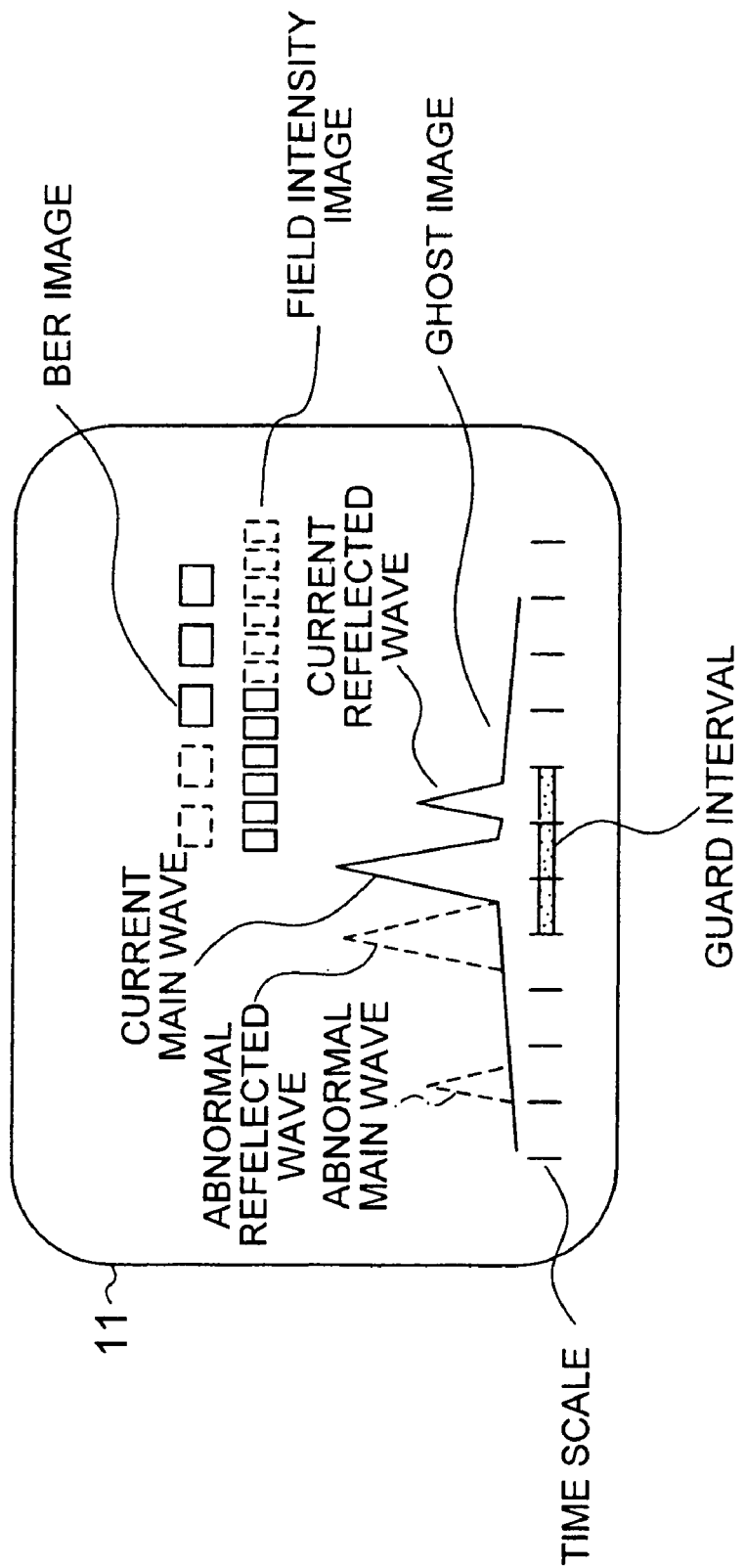
FIG. 31 is a schematic diagram showing one example of the displayed state of each transmission-condition imaging signal according to the invention.

The abnormal state detector 7a-5A, when the ghost imaging signal Sc' is displayed at an abnormal position (for example, outside the guard interval on the screen shown in FIG. 31), detects this situation as abnormal state, and produces ABN of level "High". When it is displayed at a normal position, for example, within the guard interval, the abnormal state detector 7a-5A detects this situation as normal state, producing signal ABN of level "Low".

The abnormal state imaging signal CNT from the abnormal state residual display 7a-5B is level "Low" when the signal ABN is level "Low" (normal state). When the signal ABN is level "High" (when abnormal state is detected), the abnormal state residual display 7a-5B generates the CNT of level "High" as described later.

The warning sound generator 7a-5C generates warning sound ALARM when the signal ABN is High level. The timer circuit 7a-5D controls the way that the abnormal state imaging signal CNT is displayed. For example, it controls this signal to be continuously displayed for a predetermined time or to be intermittently displayed in a blinking manner for a certain time just before the displaying ends.

Figure 33:
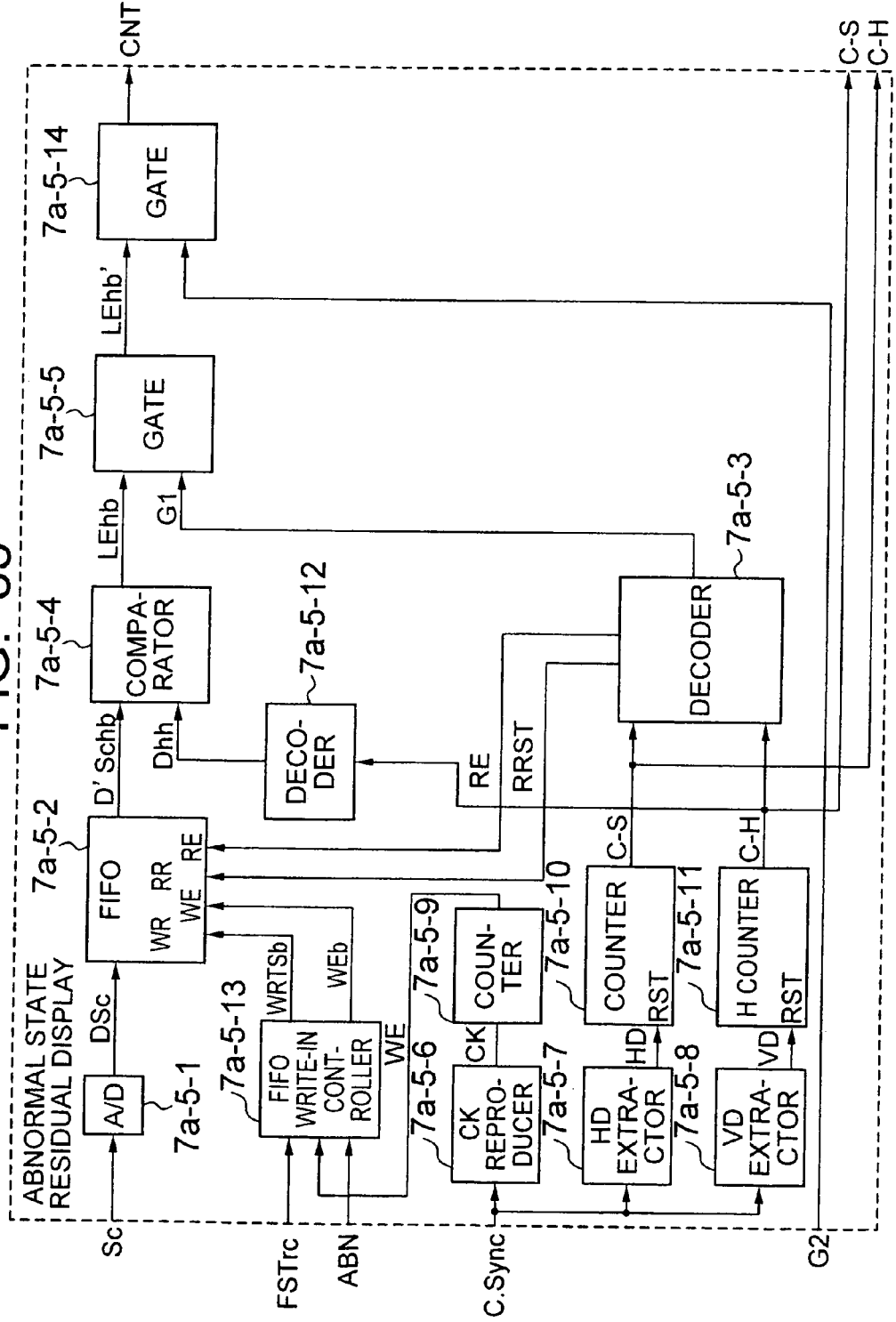
FIG. 33 is a block diagram showing one example of the abnormal ghost-status residual display 7a-5B according to the invention.

FIG. 33 is a block diagram of one example of the construction of the abnormal state residual display 7a-5B according to the invention. This example will be described.

This construction corresponds to the addition of the FIFO write-in controller 7a-5-13 and gate 7a-5-14 to the ghost-to-image converter 7a-3 shown in FIG. 27.

The correlation output signal Sc is supplied to, and converted by the A/D converter 7a-5-1 into a digital correlation output signal DSc of, for example, 8 bits. The signal DSc is supplied to an FIFO 7a-5-2.

The digital correlation output signal D'Schb from the FIFO 7a-5-2 is supplied to a comparator 7a-5-4. The ghost level signal LEhb from the comparator 7a-5-4 is supplied to a gate 7a-5-5. The output Lehb' from the gate 7a-5-5 is supplied to the gate 7a-5-14.

The pulse FSTrc with frame period is supplied to the FIFO write-in controller 7a-5-13. The outputs WRSTb and WEb from the FIFO write-in controller 7a-5-13 are supplied to the write-in reset terminal WR and write-in enable terminal WE of the FIFO 7a-5-2, respectively.

The synchronizing signal C.Sync is supplied to a clock (CK) reproducer 7a-5-6, an HD extractor 7a-5-7 and a VD extractor 7a-5-8. The clock produced from the CK reproducer 7a-5-6 is supplied to a counter 7a-5-9. The output WE from the counter 7a-5-9 is supplied to the FIFO write-in controller 7a-5-13.

The output HD from the HD extractor 7a-5-7 is fed to a counter 7a-5-10. The output C-S from the counter 7a-5-10 is supplied to a first decoder 7a-5-3.

The output VD from the VD extractor 7a-5-8 is fed to a H-counter 7a-5-11. The output C-H from the H-counter 7a-5-11 is supplied to the first decoder 7a-5-3 and a second decoder 7a-5-12.

The first decoder 7a-5-3 supplies the read reset signal RRST to the RR terminal of the FIFO 7a-5-2, and the read enable signal RE to the RE terminal of the FIFO 7a-5-2. The output GI from the first decoder 7a-5-3 is fed to the gate 7a-5-5. The output Dhh from the second decoder 7a-5-12 is supplied to the comparator 7a-5-4.

The operation of the abnormal state residual display 7a-5B will be described. The same portions as those of the ghost-to-image converter 7a-3 shown in FIG. 27 will not be described because they operate in the same way as those of the converter 7a-3.

The FIFO 7a-5-2 is an FIFO memory for storing the abnormal ghost imaging signal for a predetermined time.

The FIFO 7a-5-2 makes normal writing-in operation when the transmission condition is normal, and updates the received digital correlation output signal DSc indicative of ghost status. When the transmission condition is abnormal, the FIFO 7a-5-2 stops write-in operation for a certain time, and holds the abnormal ghost imaging signal waveform for a certain time. The reading operation of the FIFO 7a-5-2 is the same as in FIG. 27. That is, it receives the signals RE and RRST for read control from the first decoder 7a-5-3, and makes reading operation on a steady basis.

The FIFO write-in controller 7a-5-13 controls the writing-in operation of the FIFO 7a-5-2 for storing the abnormal ghost imaging signal. The write-in control signals WRSTb and WEb from the FIFO write-in controller 7a-5-13 switch between the writing operation and writing-stop operation as above in response to the output ABN from the abnormal state detector 7a-5A which will be described later.

The comparator 7a-5-4 makes the same operation on the output D'Schb from the FIFO 7a-5-2 as in FIG. 27. The gate 7a-5-5 receives output LEhb from the comparator 7a-5-4 and forcibly makes it level "Low" in the blanking period.

The gate 7a-5-14 forcibly makes its output CNT level "Low" when the transmission condition is normal, but processes the output Lehb' from the gate 7a-5-5 to produce abnormal imaging signal CNT only when the transmission condition is abnormal.

The generation of the output Lehb' as the abnormal imaging signal CNT will be described with reference to the timing chart of FIG. 39.

Figure 39:
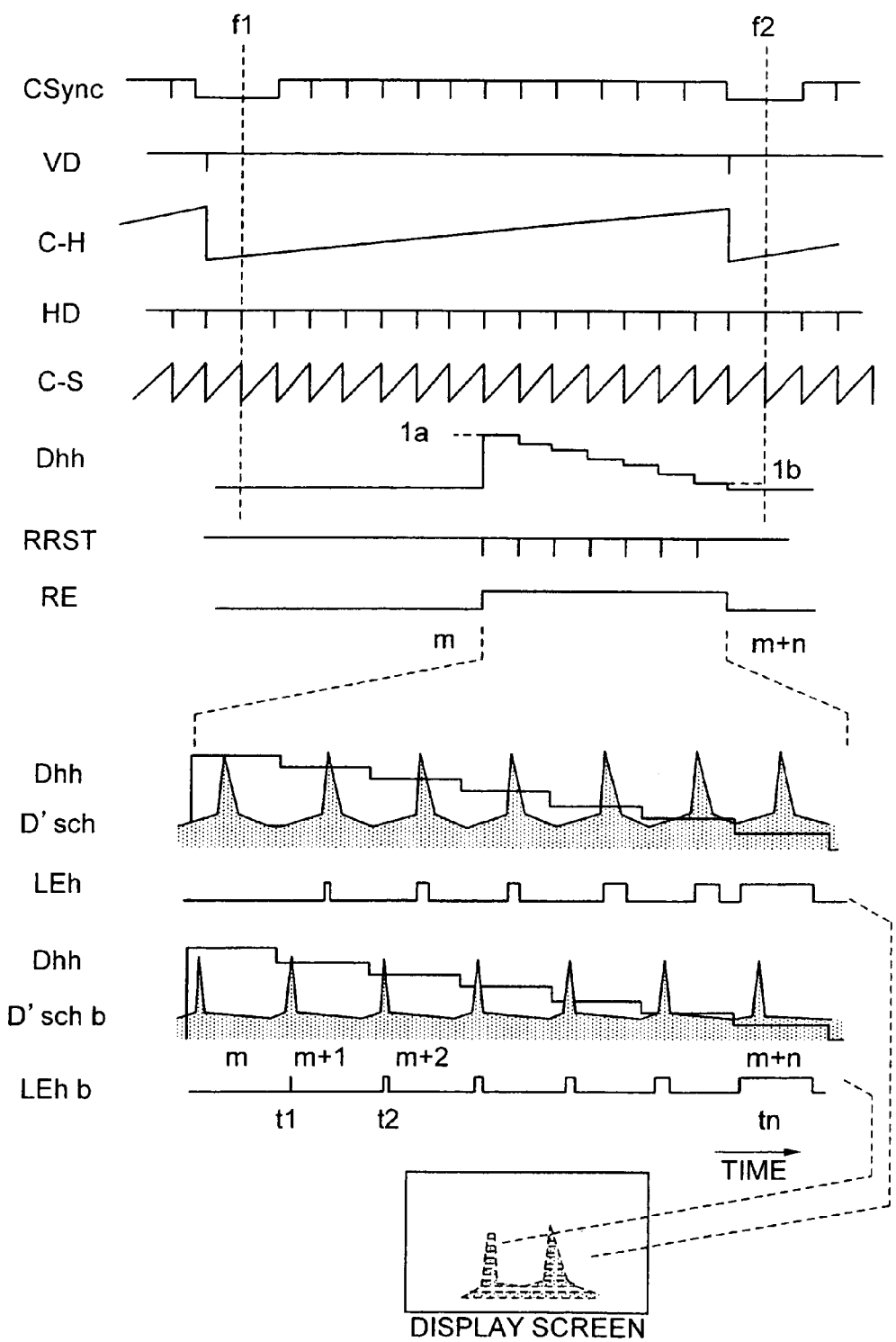
FIG. 39 is a timing chart showing waveforms in the abnormal state detector & residual display 7a-5 of FIG. 32.

FIG. 39 shows the waveforms of signals Dhh, D'Sch and LEh in the ghost-to-image converter 7a-3 shown in FIG. 27 in addition to other waveforms.

As described in FIG. 29, the decoder 7a-5-3 responds to the input counter signals C-S and C-H to generate the read reset signal RRST that takes level "Low" for one CK period of time at every Horizontal scanning of the interval from the m-th scanning line to the (m+n)-th scanning line. This signal initializes the read address to the FIFO 7a-5-2 into 0. In addition, the read enable signal RE that takes level "High" during the period from the m-th scanning line to the (m+n)-th scanning line is also supplied to the FIFO 7a-5-2, causing the read address to the FIFO 7a-5-2 to progress. Consequently, the signal D'Schb is read from the FIFO 7a-5-2 as the abnormal imaging signal.

The decoder 7a-5-12 responds to the input counter signal C-H to generate level 1a at the m-th scanning line, and then reduces its output Dhh by i at every Horizontal scanning until level 1a minus ni at the (m+n)-th H.

The comparator 7a-5-4 compares the output D'Schb from the FIFO 7a-5-2 and the output Dhh from the decoder 7a-5-12, and produces the signal LEhb that takes level "High" when the condition of D'Schb>Dhh is satisfied.

In other words, as shown in FIG. 39, since the D'Schb is smaller than Dhh for all H period of the m-th scanning period, the signal LEhb remains level "Low". Then, only during a short time t1 of 1 H period of the (m+1)-th scanning line, the D'Schb is larger than Dhh, and thus the LEhb becomes level "High". During a relatively long time t2 of 1 H of the (m+2)-th scanning line, the condition of D'Schb>Dhh is satisfied, and thus the signal LEhb takes level "High". Thereafter, after these operations are repeated, the abnormal state imaging signal waveform as the signal LEhb can be expressed in a form of scanning-line structure as illustrated.

When the transmission condition is normal, the renewal data is written in the FIFO 7a-5-2, and thus the output D'Schb remains the current ghost-status waveform. Therefore, the abnormal state imaging signal LEhb is produced as the same signal as the ghost condition imaging signal LEh. At this time, however, the gate 7a-5-14 forcibly makes the signal Lehb' level "Low", and thus the abnormal state imaging signal is not displayed when the state is normal.

Figure 35:
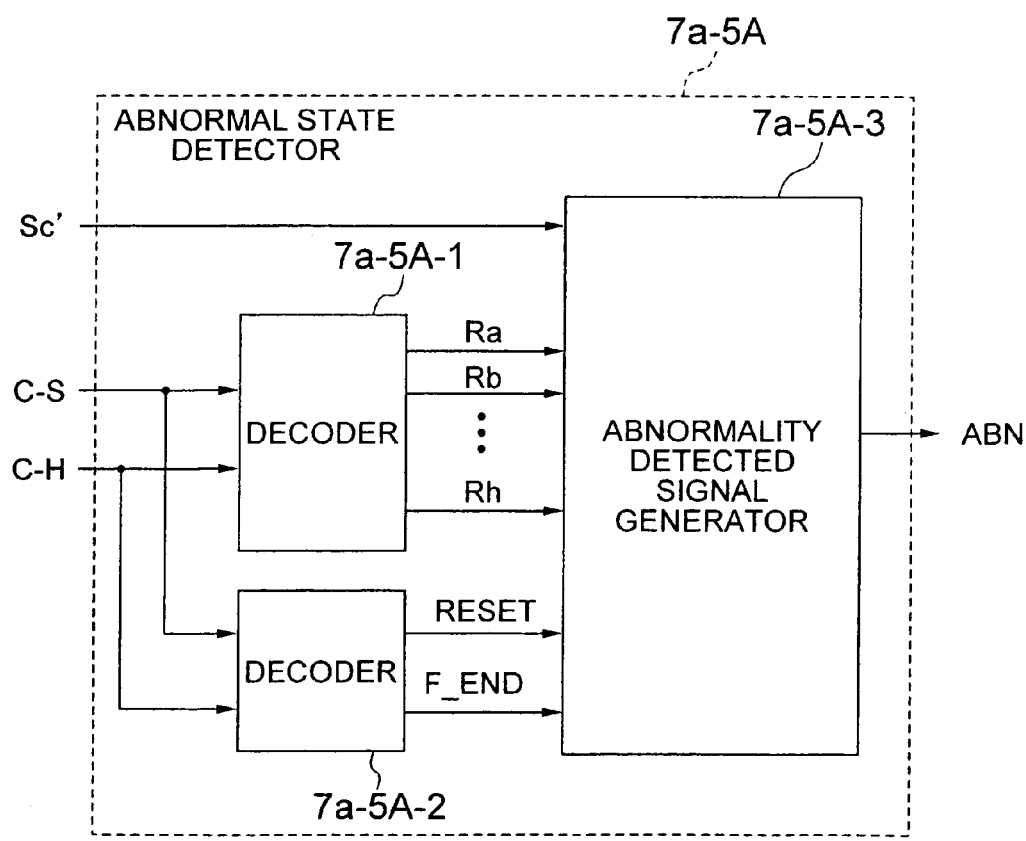
FIG. 35 is a block diagram showing one example of the abnormal state detector 7a-5A of the abnormal state detector & residual display 7a-5 FIG. 32.

FIG. 35 is a block diagram of one example of the specific construction of the abnormal state detector 7a-5A. This detector will be described.

Figure 34:
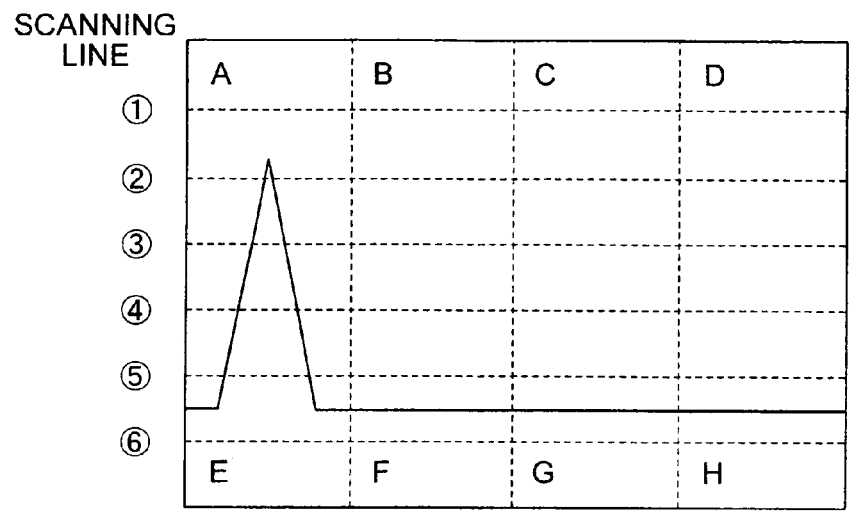
FIG. 34 is a schematic diagram to which reference is made in explaining the divisional processing of the abnormal state detected screen according to the invention.

This detector is constructed to divide the display screen into 8 regions, A through H, as shown in FIG. 34, and detect a region in which the abnormal state imaging signal is displayed so that whether the transmission condition is normal or abnormal can be known.

The ghost imaging signal Sc' is supplied to the abnormality detection signal generator 7a-5A-3. The signals C-S and C-H are fed together to decoders 7a-5A-1, 7a-5A-2. The eight output signals Ra, Rb, ..., Rh from the decoder 7a-5A-1, and the output signals RESET and F-END from the decoder 7a-5A-2 are supplied to the abnormality detection generator 7a-5A-3. Here, the number of the output signals from the decoder 7a-5A-1 corresponds to that of the regions into which the display screen is divided.

The decoder 7a-5A-1 responds to the signals C-S and C-H to produce the eight signals Ra, Rb, ..., Rh that indicate the currently scanned regions of the display screen. If the region A of the eight regions in FIG. 34 is currently scanned, only signal Ra of the eight output signals is level "High", and the other signals Rb, Rc, ..., Rh are level "Low".

The decoder 7a-5A-2 generates the signals RESET and F-END that are level "High" when the video signal is within the V-blanking period at around the end of frame, and supplies them to the abnormality detection signal generator 7a-5A-3, thereby updating its output signal ABN at every frame unit.

Figure 36:
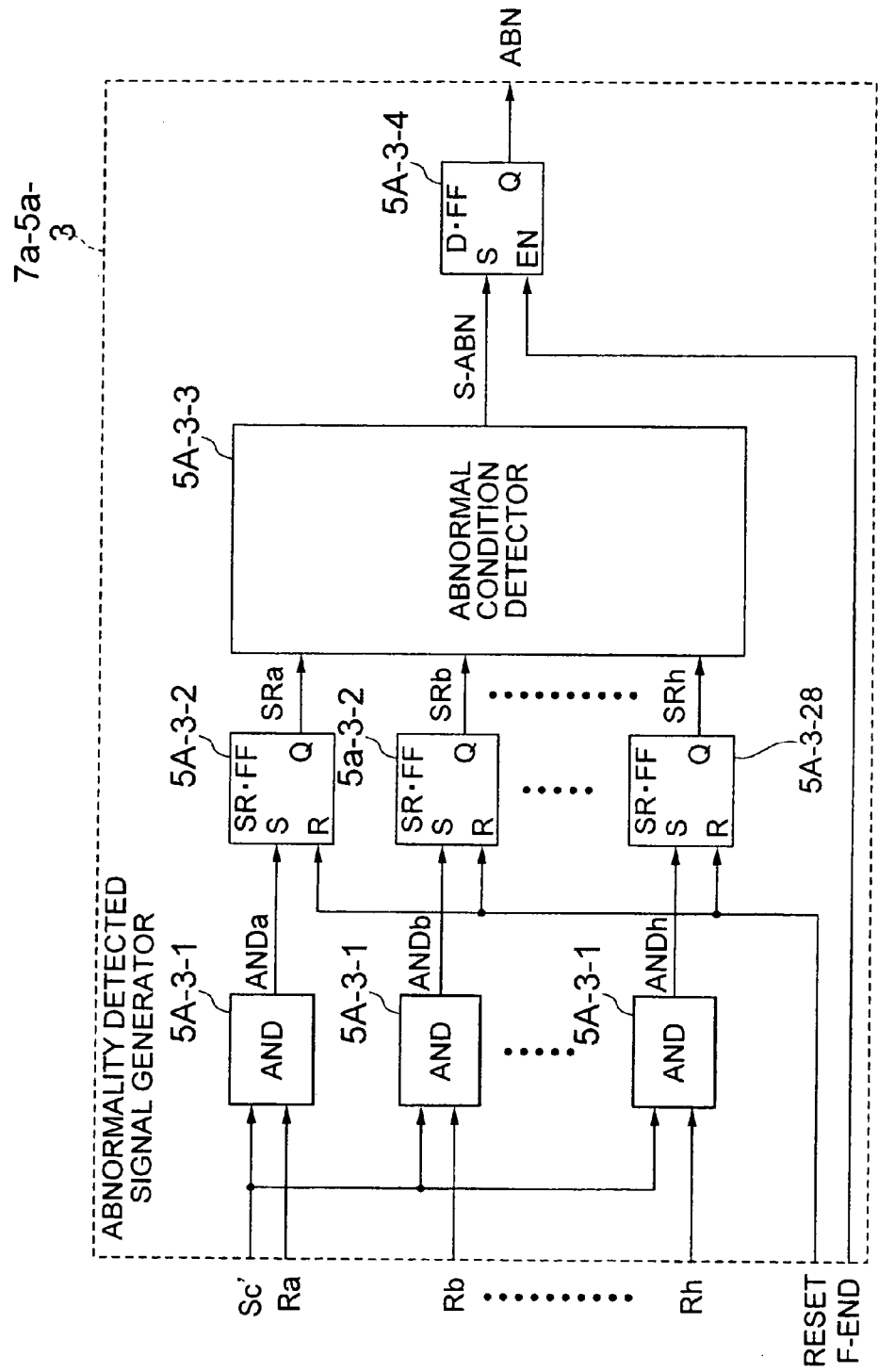
FIG. 36 is a block diagram showing one example of the abnormality detection signal generator 7a-5A-3 of the detector of the abnormal state detector 7a-5A of FIG. 35.

FIG. 36 is a block diagram of one example of the specific construction of the abnormality detection signal generator 7a-5A-3. The ghost imaging signal Sc' is fed to eight AND gates 5A-3-1.

The eight output signals Ra, Rb, ..., Rh from the decoder 7a-5A-1 are supplied to the eight AND gates 5A-3-1, respectively.

The signal RESET is fed to eight SR flip-flop (SR/FF) 5A-3-2. The signal F-END is supplied to a D-flip-flop (D-FF) 5A-3-4.

The output signals from the eight AND gates 5A-3-1 are supplied to the eight SR/FF 5A-3-2, and the outputs from the SR/FF 5A-3-2 are supplied to an abnormality condition detector 5A-3-3. The output S-ABN from the abnormality condition detector 5A-3-3 is fed to the D-FF 5A-3-4.

The eight AND gates 5A-3-1 take the logical products of the signal Sc' and signals Ra, Rb, ..., Rh to produce logical product outputs ANDa, ANDb, ..., ANDh, respectively.

When these output signals are supplied to the set terminals of the corresponding SR/FF 5A-3-2, the SR/FF 5A-3-2 generate signals SRa, SRb, ..., SRh that indicate the presence or absence of ghost condition waveform in each region. Each of these signals indicates that the ghost waveform is displayed or not in the corresponding region when it is level "High" or level "Low", respectively.

The abnormality condition detector 5A-3-3 detects whether the abnormality condition has occurred in the ghost imaging signal Sc', on the basis of these signals SRa through SRh. Thus, the detector 5A-3-3 generates the signal S-ABN that becomes level "High" when the abnormal condition is detected, and level "Low" when it is not detected.

This signal S-ABN is supplied to the D-FF 5A-3-4, and the F-END signal is also applied thereto as an enable signal, so that the D-FF 5A-3-4 generates the signal ABN that contains the abnormality detected result updated at every frame.

After the ABN signal is updated in response to the F-END signal, the SR/FF 5A-3-2 are reset by the RESET signal.

Figure 37:
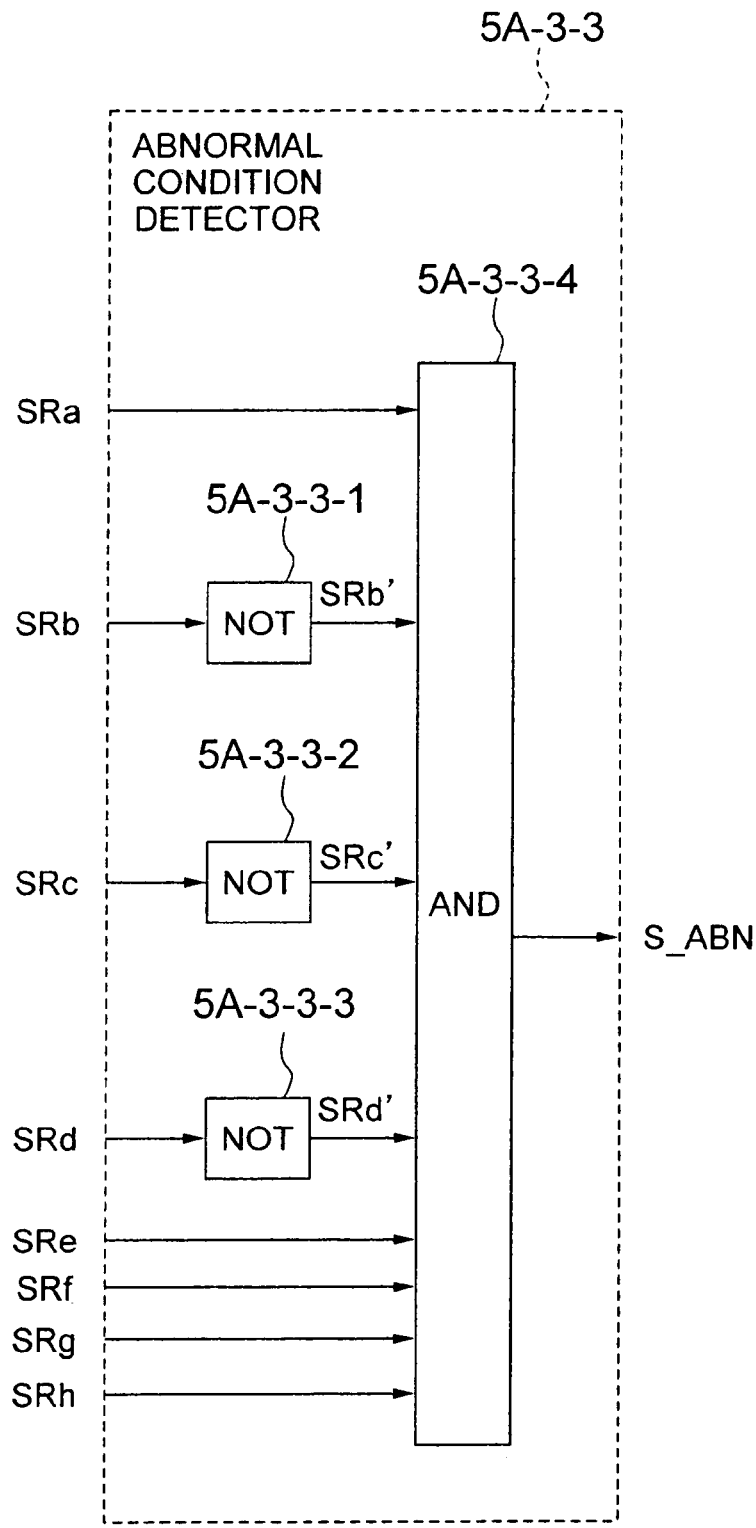
FIG. 37 is a block diagram showing one example of the abnormal condition detector 5A-3-3 according to the invention.

FIG. 37 is a block diagram of one example of the specific construction of this abnormality condition detector 5A-3-3. This detector will be described. The signal SRb is fed to a NOT gate 5A-3-3-1, the signal SRc to a NOT gate 5A-3-3-2, and the signal SRd to a NOT gate 5A-3-3-3. The five signals SRa, SRe, SRf, SRg, SRh are supplied to an AND gate 5A-3-3-4.

The outputs SRb', SRc' and SRd' from the NOT gates 5A-3-3-1, 5A-3-3-2, and 5A-3-3-3 are fed to the AND gate 5A-3-3-4.

This abnormality condition detector 5A-3-3 is designed so that for example, the state in which the ghost waveform is displayed in the regions A and E through H of the eight regions A through H shown in FIG. 34, but is not displayed in the regions B, C and D can be detected as abnormality.

Here, the range from region B to region D in FIG. 34 corresponds to the guard interval range in FIG. 31. Thus, when the peak of the correlation output waveform indicative of ghost status is displayed shifted more to the left end (region A) of the display screen, or when it is displayed far away out of the guard interval, the detector can detect that the transmission condition is more seriously abnormal.

Thus, the abnormality condition detector 5A-3-3 makes NOT operation on the signals SRb, SRc, SRd by the NOT gates 5A-3-3-1 through 5A-3-3-3, and takes the logical product of signals SRa, SRb', SRc', SRd', SRe through SRh by the AND gate 5A-3-3-4, to thereby detect whether the abnormality occurs in the ghost imaging signal, thus producing the signal S-ABN.

This signal S-ABN becomes level "High" when an abnormality is detected, and level "Low" when no abnormality is detected.

Figure 40:
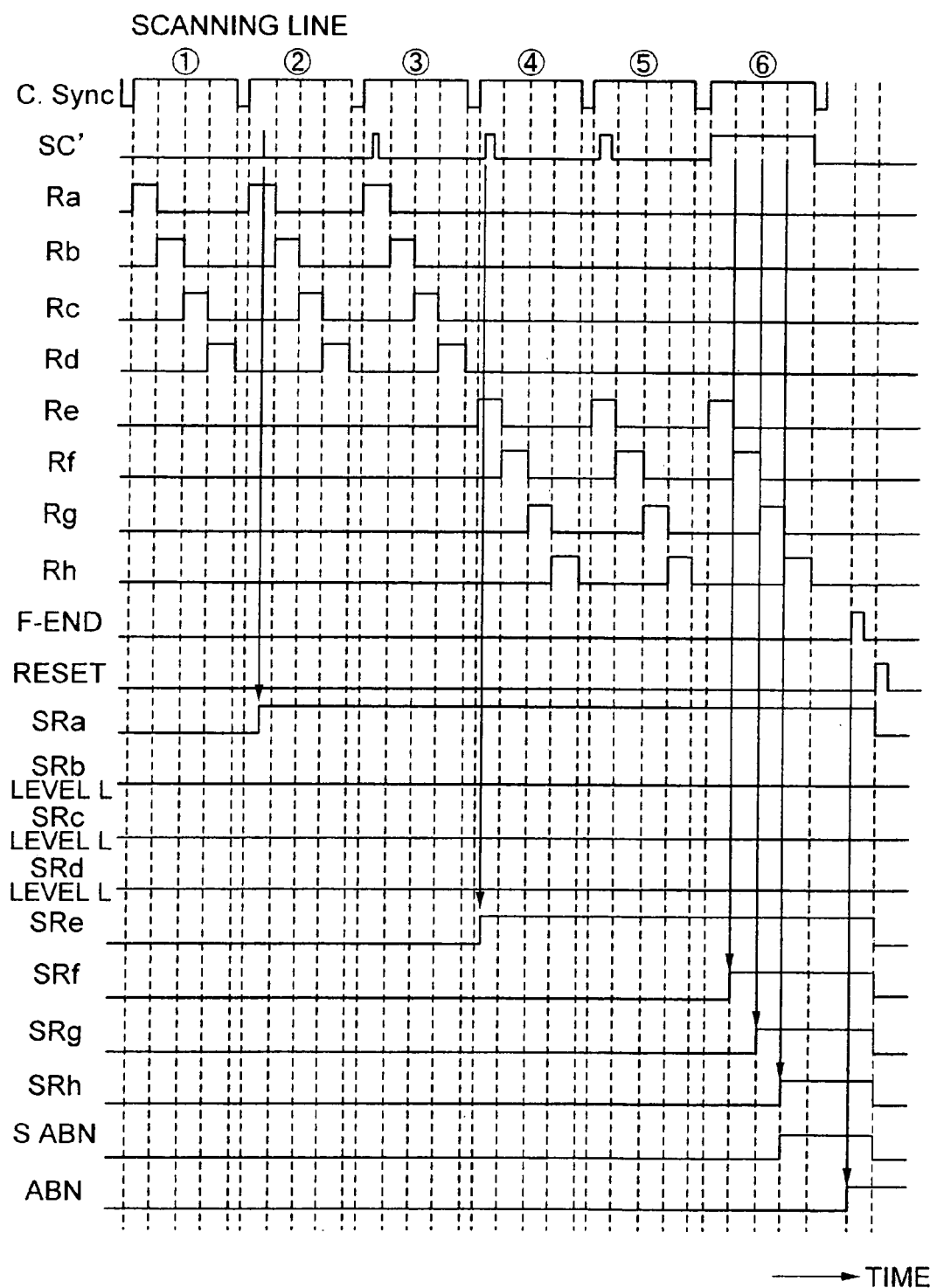
FIG. 40 is a timing chart showing the operation of the abnormal state detector 7a-5A of FIG. 35.

The operation of the abnormality condition detector 5A-3-3 will be described in more detail with reference to FIGS. 34 and 40.

Let us consider that as an example, the display screen is divided into eight regions of A through H, and a ghost waveform is displayed as shown in FIG. 34. For the sake of simple explanation, the full screen is assumed to be displayed by six scanning lines without interlaced scanning. FIG. 40 is a timing chart of signals produced at this time.

The signals Ra through Rh are level "High" when the regions A through H are scanned, respectively. The signal F-END becomes level "High" for a predetermined time in the V blanking period after the end of full-screen scanning. The signal RESET becomes level "High" for a certain time in the V-blanking period after the signal F-END.

The signals SRa through SRh are level "High" when the signal Sc' becomes level "High" and when each of the signals Ra through Rh is level "High", respectively. The signal S-ABN becomes level "High" when the signals SRa through SRh satisfy the above condition.

The signal ABN is the state of the signal S-ABN held (updated) by the leading edge of the signal F-END. The signals SRa through SRh are reset by the leading edge of the signal RESET, and thus the signal S-ABN is reset to be level "Low".

Figure 38:
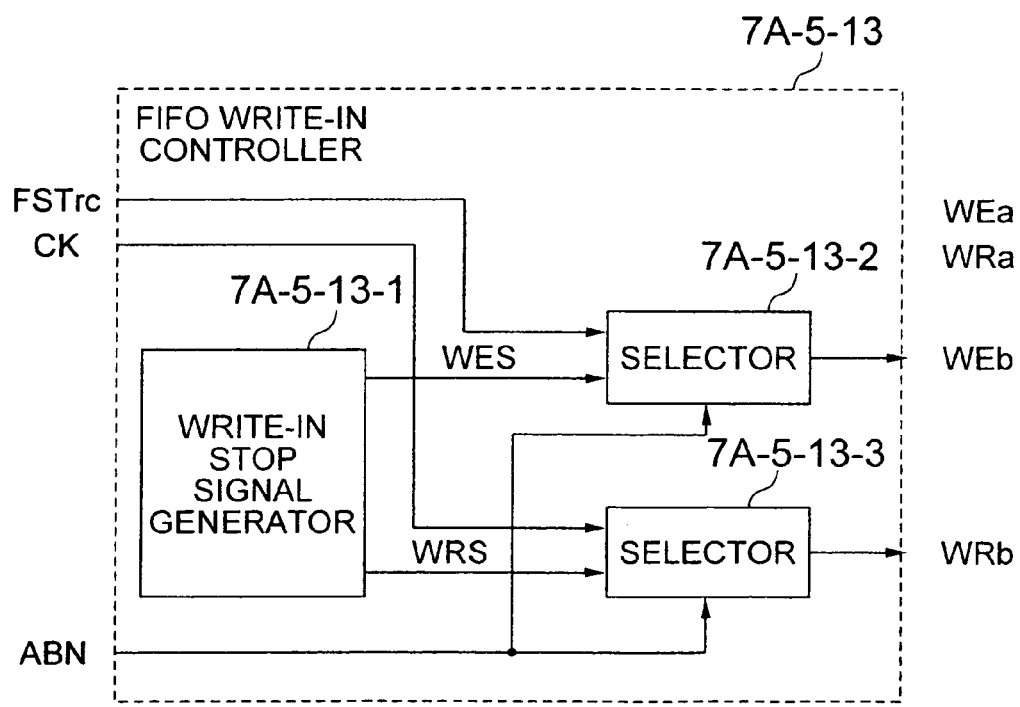
FIG. 38 is a block diagram showing one example of the FIFO write controller 7a-5-13 of the abnormal ghost-status residual display 7a-5B of FIG. 33.

FIG. 38 is a block diagram of one example of the construction of the FIFO write-in controller 7a-5-13. This controller will be described. The signal FSTrc is supplied to a selector 7a-5-13-2. The clock CK is supplied to a selector 7a-5-13-3.

The signal ABN is supplied to the selectors 7a-5-13-2, 7a-5-13-3. The outputs WES and WRS from a write-in stop signal generator 7a-5-13-1 are fed to the selectors 7a-5-13-2, 7a-5-13-3.

The ABN signal indicative of abnormality controls the selectors 7a-5-13-2, 7a-5-13-3 to select ones of the input signals.

When the ABN is level "Low", or when the transmission condition is normal, the outputs WEb and WRb from the selectors 7a-5-13-2, 7a-5-13-3 are signals FSTrc and CK, respectively. Thus, the FIFO 7a-5-2 shown in FIG. 33 is controlled to be normally written in.

When the ABN signal is level "High", or when the transmission condition is abnormal, the outputs WEb and WRb from the selectors 7a-5-13-10 2, 7a-5-13-3 are the signals WES and WRS of level "High" from the write-in stop signal generator 7a-5-13-1. Thus, the FIFO 7a-5-2 shown in FIG. 33 is stopped from being written in.

A modification of the transmission-condition-to-image converter 7a will be described with reference to FIGS. 41 and 42.

Figure 41:
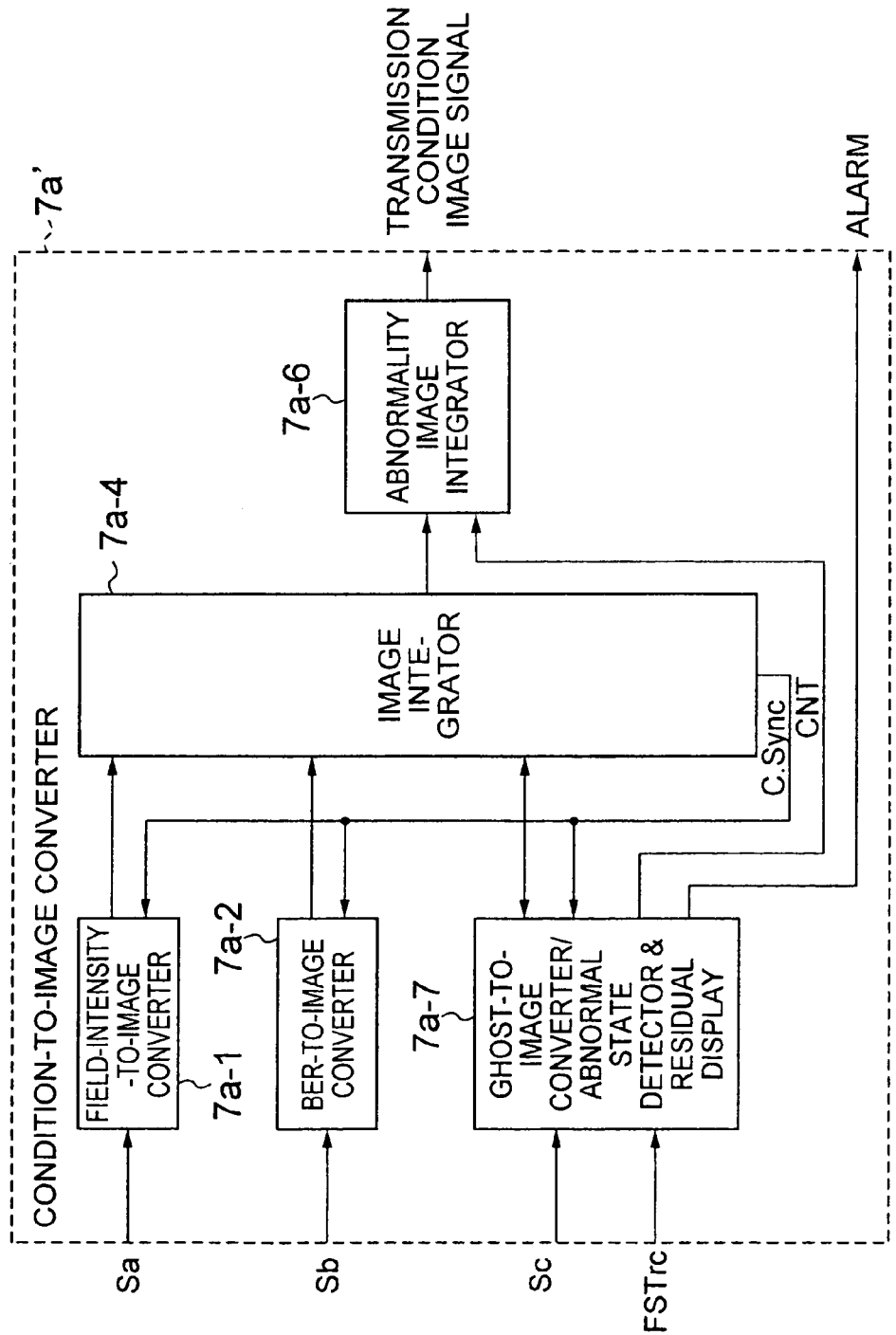
FIG. 41 is a block diagram showing one example of a transmission-condition-to-image converter 7a' according to the invention.

A transmission-condition-to-image converter 7a' shown in FIG. 41 has a ghost-to-image converter/ abnormality detector & residual image display 7a-7 provided to include the operation blocks common to the ghost-to-image converter 7a-3 and abnormality detector & residual image display 7a-5. FIG. 42 shows a specific construction of this ghost-to-image converter/ abnormality detector & residual image display 7a-7.

Figure 42:
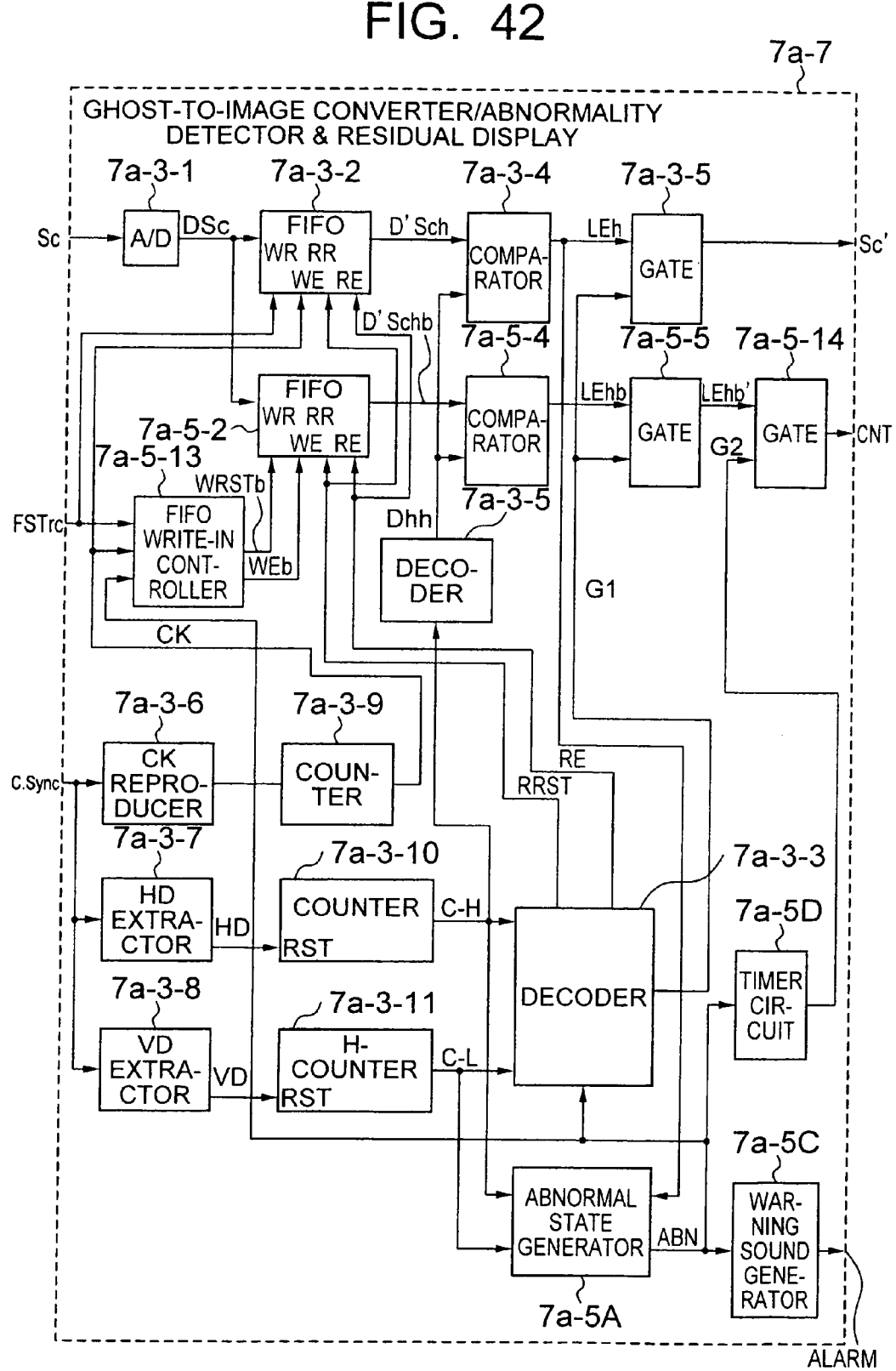
FIG. 42 is a block diagram showing one example of the ghost-status-to-video state/abnormal-state detector & residual display 7a-7 according to the invention.

As illustrated in FIG. 42, the A/D converter 7a-5-1, decoders 7a-5-3, 7a-5-12, CK reproducer 7a-5-6, HD-extractor 7a-5-7, VD-extractor 7a-5-8, counters 7a-5-9, 7a-5-10, and H-counter 7a-5-11 can be omitted because they can be shared.

The operation of the transmission-to-video converter 7a' is the same as the transmission-to-video converter 7a, and thus will not be described.

Thus, according to the transmission-to-video converters 7, 7a, 7a' and transmission image superimposing device 7b mentioned above, since the ghost imaging signal, BER imaging signal and filed intensity imaging signal are displayed on a video monitor, the conditions, or status of the imaging signals can be comprehensively viewed in associated with each other, so that the transmission condition can be correctly grasped. However, we further need to consider the following points.

Recently, there is a trend toward the change of length of the guard interval (GI) as a buffer band against the mixing of reflected waves according to the transmission situations in order to cope with various transmission conditions.

That is, for example, a signal format of more adequate GI length is selected according to the information contents being transmitted, and transmission conditions from one signal format in which a guard interval waveform of 48 samples is added to the time base waveform of 1024 samples to form a time base waveform of 1072 samples/symbol in total, and the other signal format in which a guard interval waveform of 96 samples is added thereto to form a time base waveform of 1120 samples/symbol in total.

When the GI length is changed according to transmission conditions by switching, a GI mode signal for determining the GI length is supplied to the transmission path encoder and guard adder of the transmitting-side processor 101, and to the synchronizing detector & correlator and transmission path decoder of the receiving-side processor 203, shown in FIGS. 1 and 17, thereby changing the GI length.

However, the transmission-condition-to-image converters 7, 7a, 7a' and transmission image superimposing device 7b do not consider the transmission mode for changing the GI length according to the transmission situations, and the GI mode signal is not applied. Therefore, when the GI length is changed, the guard interval displayed at the position corresponding to the ghost imaging signal waveform cannot be changed in association therewith, and thus the transmission condition cannot be correctly understood.

Thus, according to the invention, a transmission-condition-to-image converter is proposed which can solve the above problem so that the guard interval can be displayed at the position corresponding to the ghost imaging signal waveform even when the GI length is changed, and hence that the transmission condition can be correctly grasped. This converter will be described with reference to FIGS. 43 through 52.

The transmission-condition-to-image converter is given a function to change the display position range in which the guard interval is displayed according to the change of the GI length by switching. Thus, even when the GI length is changed, the positional range in which the guard interval is displayed can be automatically changed by this function in association with the ghost imaging signal.

Figure 43:
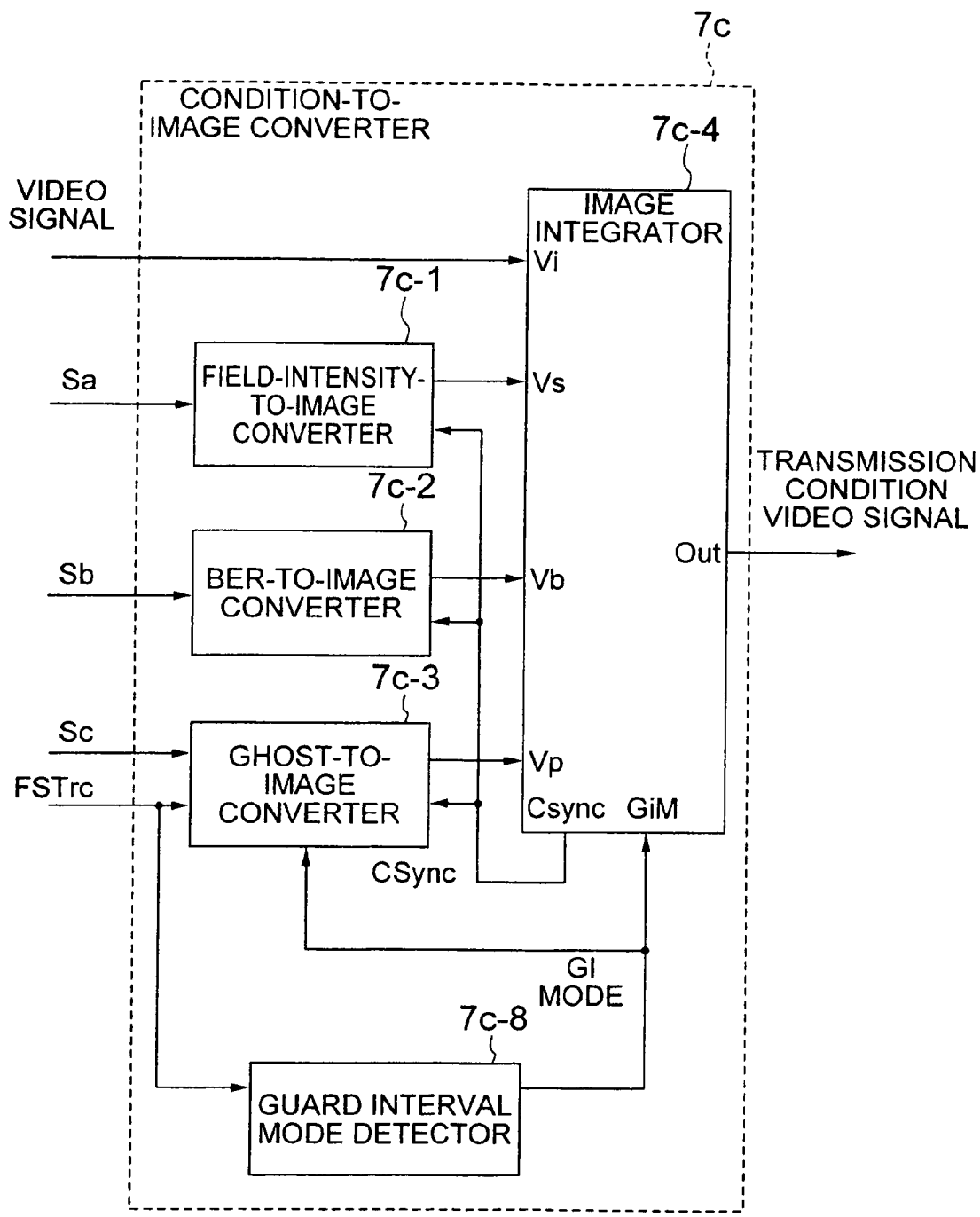
FIG. 43 is a block diagram showing one example of a transmission-condition-to-image converter 7c according to the invention.

FIG. 43 is a block diagram of the construction of a transmission-condition-to-image converter 7c capable of automatically detecting the GI mode signal, according to the invention. The portions equivalent to those in the transmission-condition-to-image converter 7 shown in FIG. 2A will not be described.

The correlation output signal Sc and pulse FSTrc with frame period are supplied to a ghost-to-image converter 7c-3. The FSTrc signal is also fed to a guard interval mode detector 7c-8. The output, GI mode signal from the guard interval mode detector 7c-8 is supplied to the ghost-to-image converter 7c-3 and an image integrator 7c-4. The output from the ghost-to-image converter 7c-3 is supplied to the image integrator 7c-4.

The synchronizing signal C.Sync from the image integrator 7c-4 is fed to the sync input terminals of a field-intensity-to-image converter 7c-1, a BER-to-image converter 7c-2 and the ghost-to-image converter 7c-3. The image integrator 7c-4 generates a transmission-condition imaging signal.

The field-intensity-to-image converter 7c-1, BER-to-image converter 7c-2, ghost-to-image converter 7c-3 convert signals of different transmission conditions to imaging signals according to the synchronizing signal C.Sync, respectively. The image integrator 7c-4 combines the imaging signals, and adds a sync signal for video image to those combined imaging signals. Or this integrator superimposes those imaging signals on an externally applied video signal.

The guard interval mode detector 7c-8 detects the GI mode corresponding to the guard interval length, and sends the resulting GI mode signal to associated blocks.

The transmission-condition-to-image converter 7c of this construction automatically detects the GI mode signal corresponding to the range of the guard interval from the FSTrc signal by use of the guard interval detector 7c-8. In addition, the converter 7c changes the displayed range and length of the guard interval, the range (alarm range) in which any one or more transmission conditions are abnormal, and the sampling period of correlation output signal Sc by switching in accordance with the GI mode signal.

Figure 44A:
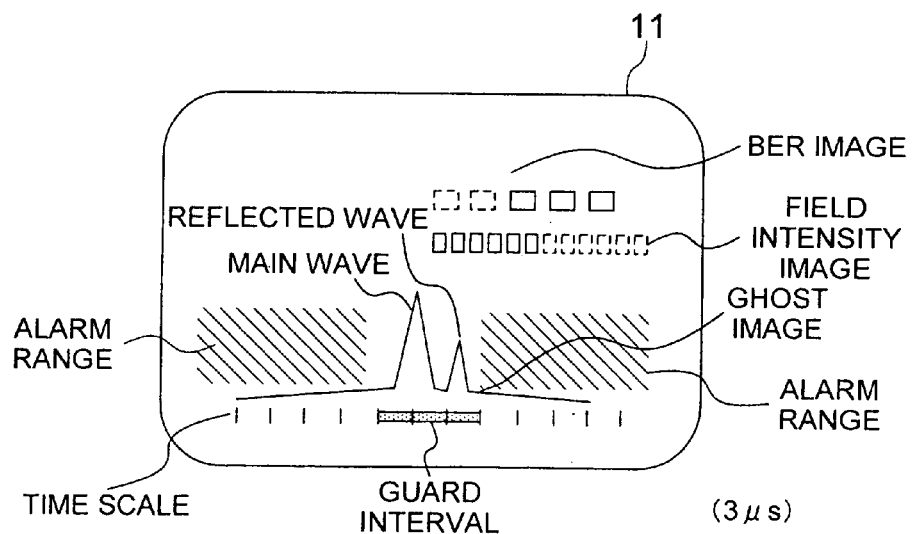
FIGS. 44A and 44B are schematic diagrams showing examples of the displayed state of each transmission-condition imaging signal according to the invention.

FIG. 44A shows an example of the screen displayed when the guard interval is 3 μsec. In this case, the guard interval length is three graduations, and the alarm range is out of the guard interval.

Figure 44B:
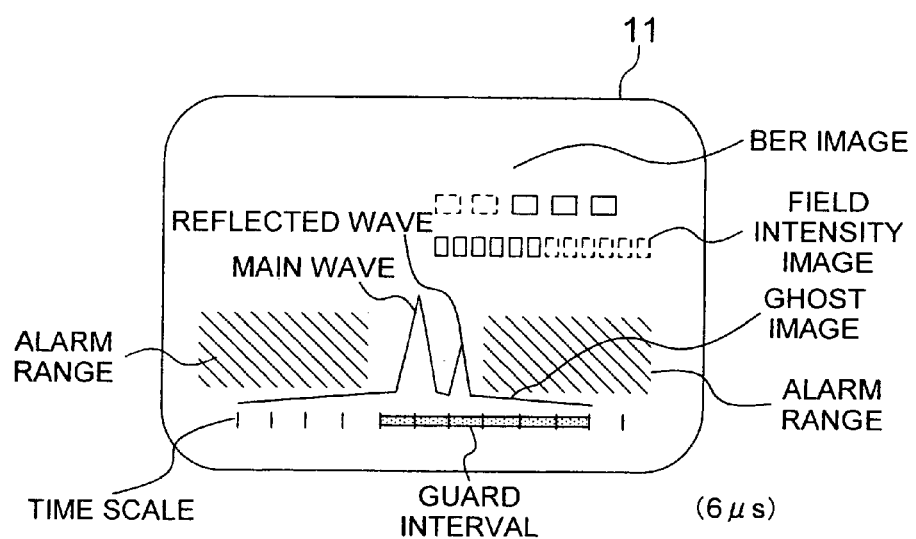

FIG. 44B shows an example of the screen displayed when the guard interval is 6 μsec. In this case, the guard interval is as long as 6 graduations, and the alarm range is displayed narrower on the right side of the screen away from the guard interval.

Figure 45:
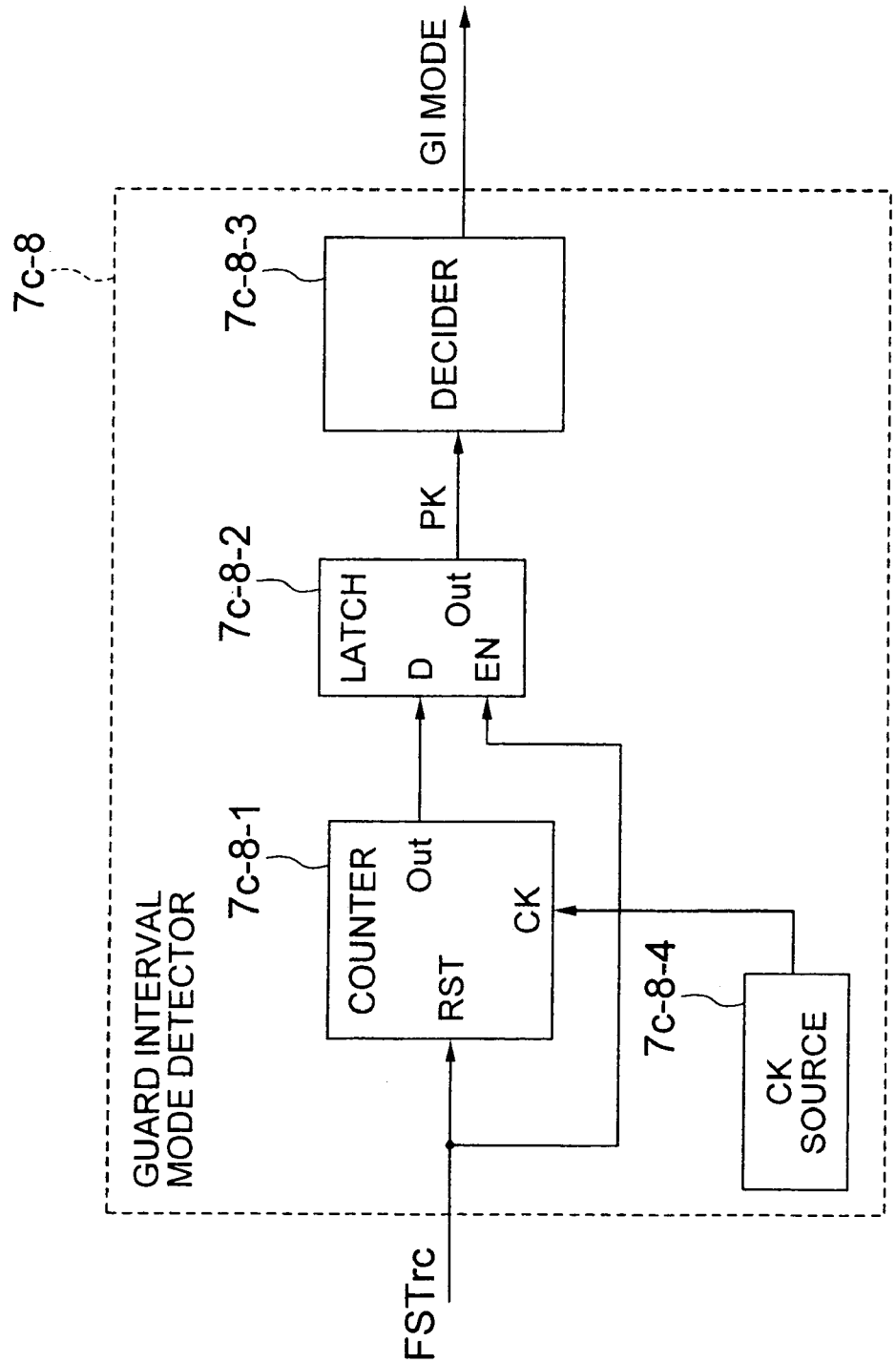
FIG. 45 is a block diagram showing one example of the guard interval mode detector 7c-8 of the converter 7c of FIG. 43.

FIG. 45 is a block diagram of a specific construction of the guard interval mode detector 7c-8. The FSTrc signal is supplied to the reset terminal of a counter 7c-8-1 and the enable terminal of a latch 7c-8-2. The output terminal of the counter 7c-8-1 is connected to the D-input terminal of the latch 7c-8-2. A clock (CK) source 7c-8-4 is connected to the CK input terminal of the counter 7c-8-1. The output terminal of the latch 7c-8-2 is connected to the input terminal of a determiner 7c-8-3.

The operation of the guard interval mode detector 7c-8 will be described. If the CK frequency of the CK source 7c-8-4 is 16 MHz, since the FSTrc signal occurs with a period of 60.3 m sec, the maximum value that the counter 7c-8-1 counts is about 964800.

The counter 7c-8-1 is once reset by the next FSTrc signal into 0, but the latch 7c-8-2 holds the value just before the resetting, or the maximum value of the counter 7c-8-1.

Therefore, since the determiner 7c-8-3 detects the value of the output PK from the latch 7c-8-2, the associated guard interval can be determined.

Since the maximum value of 964,800 is not always produced depending on the frequency accuracy of the CK source 7c-8-4, an allowance of ±21,600 is given for the determination.

Figure 46A:
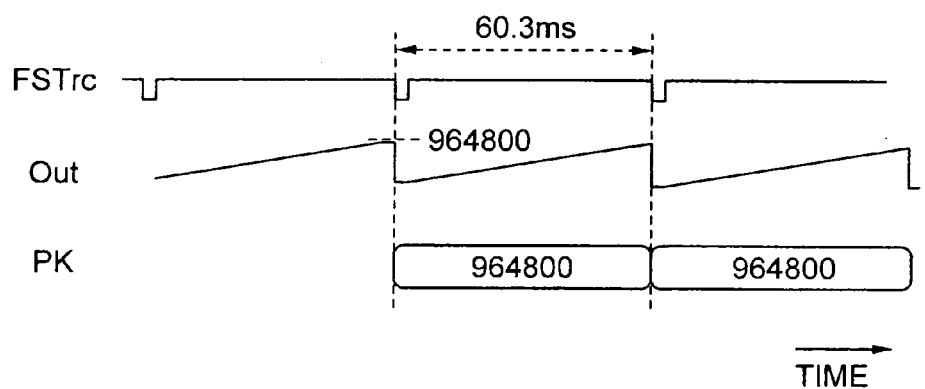
FIGS. 46A and 46B are diagrams to which reference is made in explaining the guard interval mode detection operation according to the invention.

FIG. 46A shows the relation among the FSTrc, the counter output and the latch output when the maximum value of the counter 7c-8-1 is about 964,800 that corresponds to a guard interval of 3 μsec.

Figure 46B:
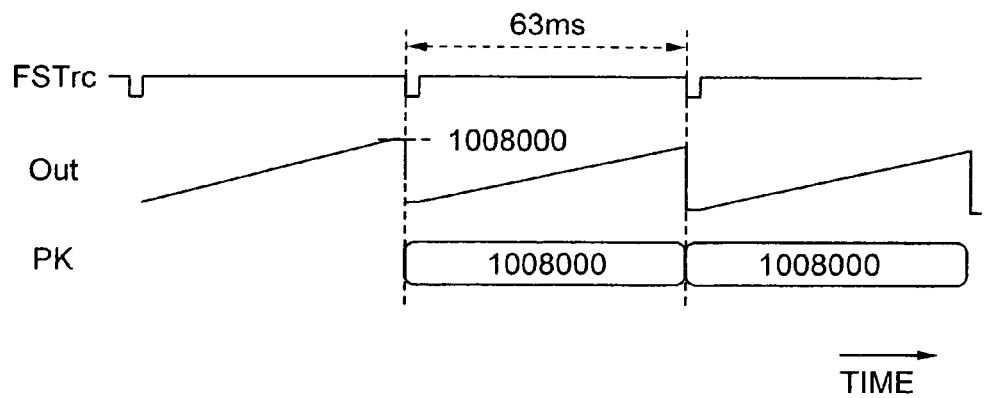

FIG. 46B shows the relation among the FSTrc, the counter output and the latch output when the maximum value of the counter 7c-8-1 is about 1,008,000 that corresponds to a guard interval of 6 μsec.

Thus, the GI mode can be decided by discriminating the output values of the latch 7c-8-2, or the maximum values of the counter 7c-8-1.

Figure 47:
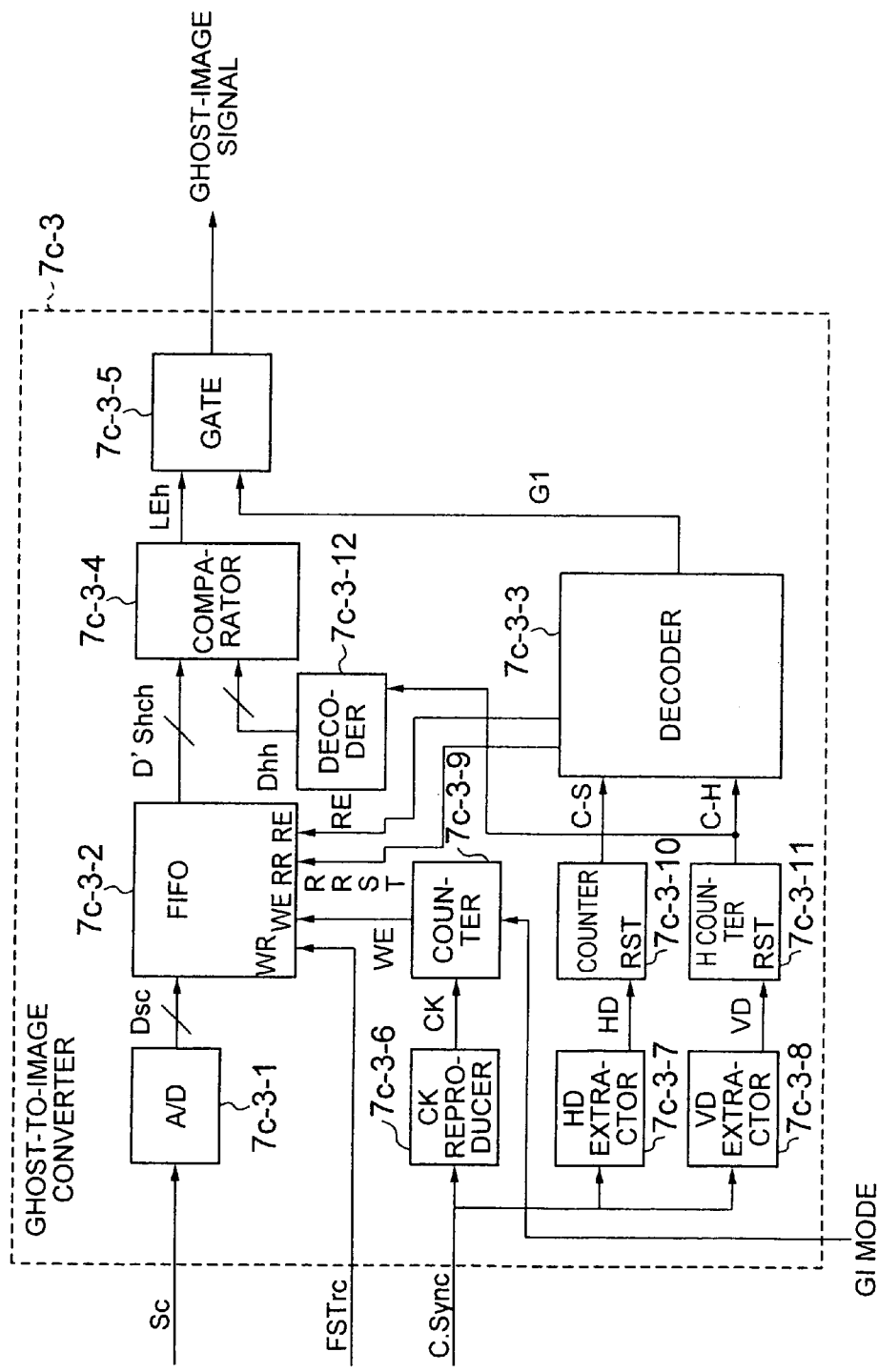
FIG. 47 is a block diagram showing one example of the ghost-status-to-image converter 7c-3 according to the invention.

FIG. 47 is a block diagram of a specific construction of the ghost-to-image converter 7c-3. This converter will be described. The CK signal from a CK reproducer 7c-3-6 is supplied to a counter 7c-3-9. The GI mode signal is supplied to the counter 7c-3-9. The output WE signal from the counter 7c-3-9 is fed to the WE terminal of an FIFO 7c-3-2.

Since the change of the correlation output signal Sc usually depends on the symbol period, the increase of the guard interval length (from 3 μsec to 6 μsec) will result in the change of ghost imaging signal from 67 μsec to 70 μsec.

The counter 7c-3-9 changes the period with which the WE signal occurs in accordance with that change, and hence the sampling period is changed according to the GI mode signal.

Figure 48:
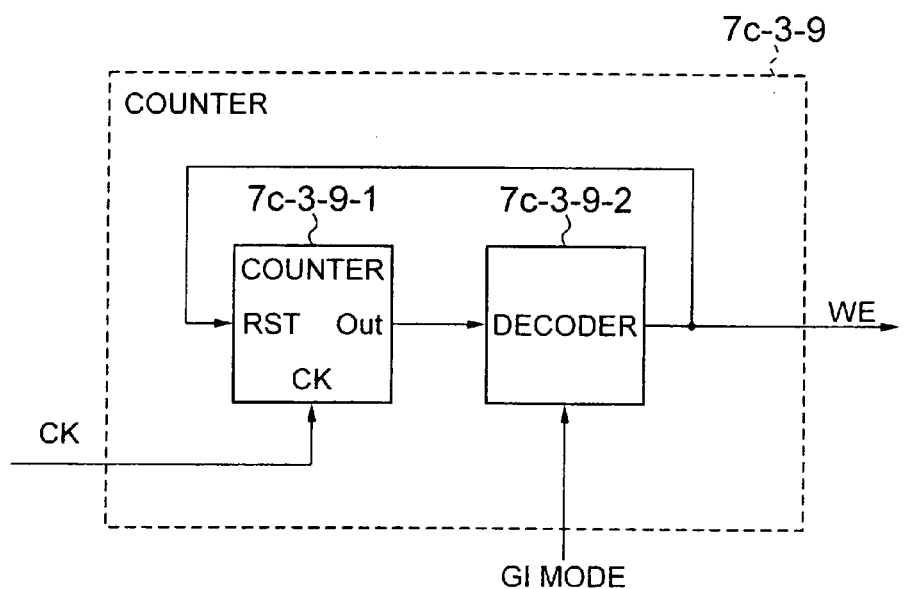
FIG. 48 is a block diagram of the counter 7c-3-9 of the ghost-status-to-image converter 7c-3 of FIG. 47.

FIG. 48 shows a specific construction of the counter 7c-3-9. Referring to FIG. 48, the CK signal is supplied to the CK terminal of a counter 7c-3-9-1. The output from the counter 7c-3-9-1 is fed to a decoder 7c-3-9-2.

The output from the decoder 7c-3-9-2 is supplied to the reset terminal RST of the counter 7c-3-9-1, and to the outside as the WE signal. The GI signal is supplied to the decode value switching terminal of the decoder 7c-3-9-2.

The operation of each part of the counter 7c-3-9 will be described. The counter 7c-3-9-1 counts the CK signal when the reset terminal RST is at level "High".

The decoder 7c-3-9-2 generates, for example, level "Low" when 1,071 for 1,072 samples/symbol or 1,119 for 1,120 samples/symbol is applied according to the GI mode signal. When the reset terminal is at level "Low", the content of the counter 7c-3-9-1 is reset back to zero.

The result is that the counter 7c-3-9-1 repeats counting 0~1,071 or 0~1,119.

Figure 49A:
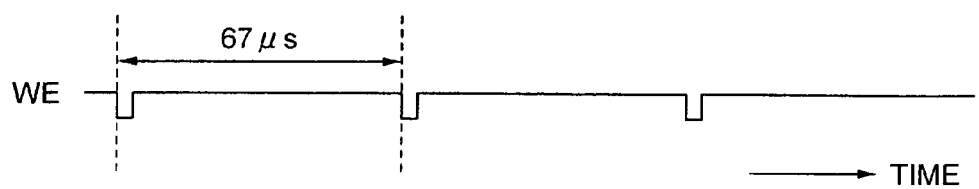
FIGS. 49A and 49B are waveform diagrams to which reference is made in explaining the operation of the counter 7c-3-9 of FIG. 48.

FIG. 49A shows the output WE from the counter 7c-3-9 when the guard interval is 3 μsec. As shown in FIG. 49A, the WE signal becomes level "Low" with a period of 67 μsec.

Figure 49B:
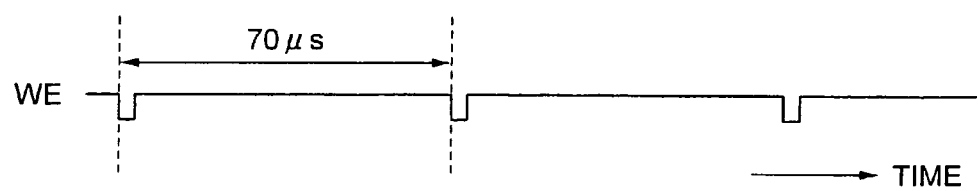

FIG. 49B shows the output WE from the counter 7c-3-9 when the guard interval is 6 μsec. From FIG. 49B, it will be seen that the WE signal becomes level "Low" with a period of 70 μsec.

Figure 50:
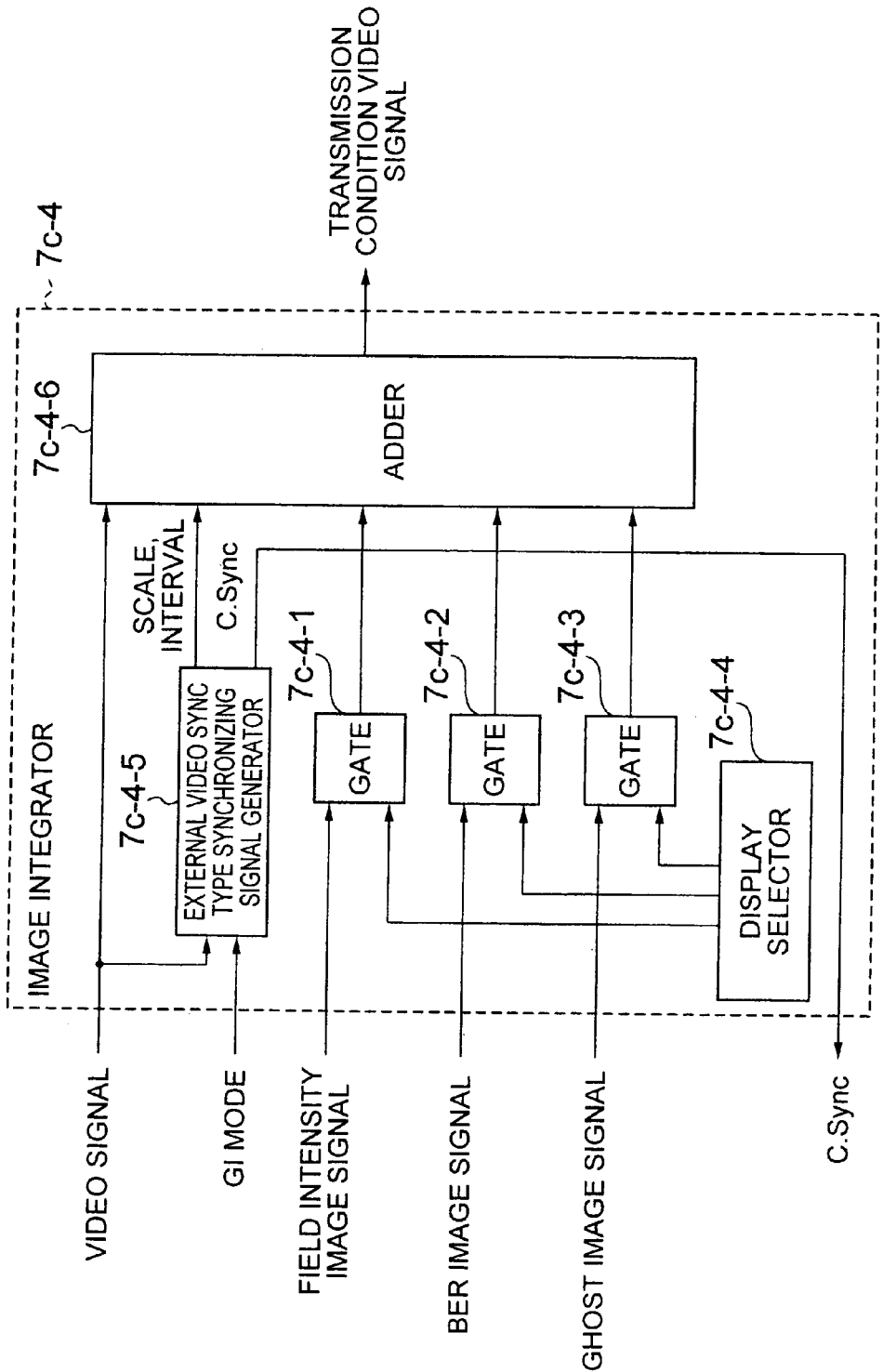
FIG. 50 is a block diagram showing one example of the image integrator 7c-4 according to the invention.

FIG. 50 is a block diagram of a specific construction of the image integrator 7c-4. The field intensity imaging signal, BER imaging signal and ghost imaging signal are supplied to an adder 7c-4-6 via gates 7c-4-1, 7c-4-2 and 7c-4-3, respectively.

A display selector 7c-4-4 generates add-on/off signals that control the field intensity imaging signal, BER imaging signal and ghost imaging signal to be separately added or not, respectively.

The GI mode signal is fed to an external video sync type synchronizing signal generator 7c-4-5. The video signal is supplied to the external video sync type synchronizing signal generator 7c-4-5 and adder 7c-4-6. The external video sync type synchronizing signal generator 7c-4-5 supplies the synchronizing signal C.Sync to the outside. It also supplies a display signal of the time scale and guard interval to the adder 7c-4-6.

The gates 7c-4-1, 7c-4-2, 7c-4-3 are controlled by the display selector 7c-4-4 to allow the input imaging signals to be passed therethrough or not. The signals passed through the gates 7c-4-1, 7c-4-2, 7c-4-3 are added together with the C.Sync signal, by the adder 7c-4-6, to produce the transmission-condition imaging signal.

An example of the addition rates of signals in the adder 7c-4-6 will be shown. If the signals to be applied are all +5 Volts in digital level, the rates of the field intensity imaging signal, BER imaging signal and ghost imaging signal are 0.2, the rates of the time scale signal and guard interval signal are 0.05, and the rate of the C.Sync signal is 0.1. Thus, the imaging signal of about 1 $Volt_{p-p}$ including the sync portion can be produced.

Figure 51:
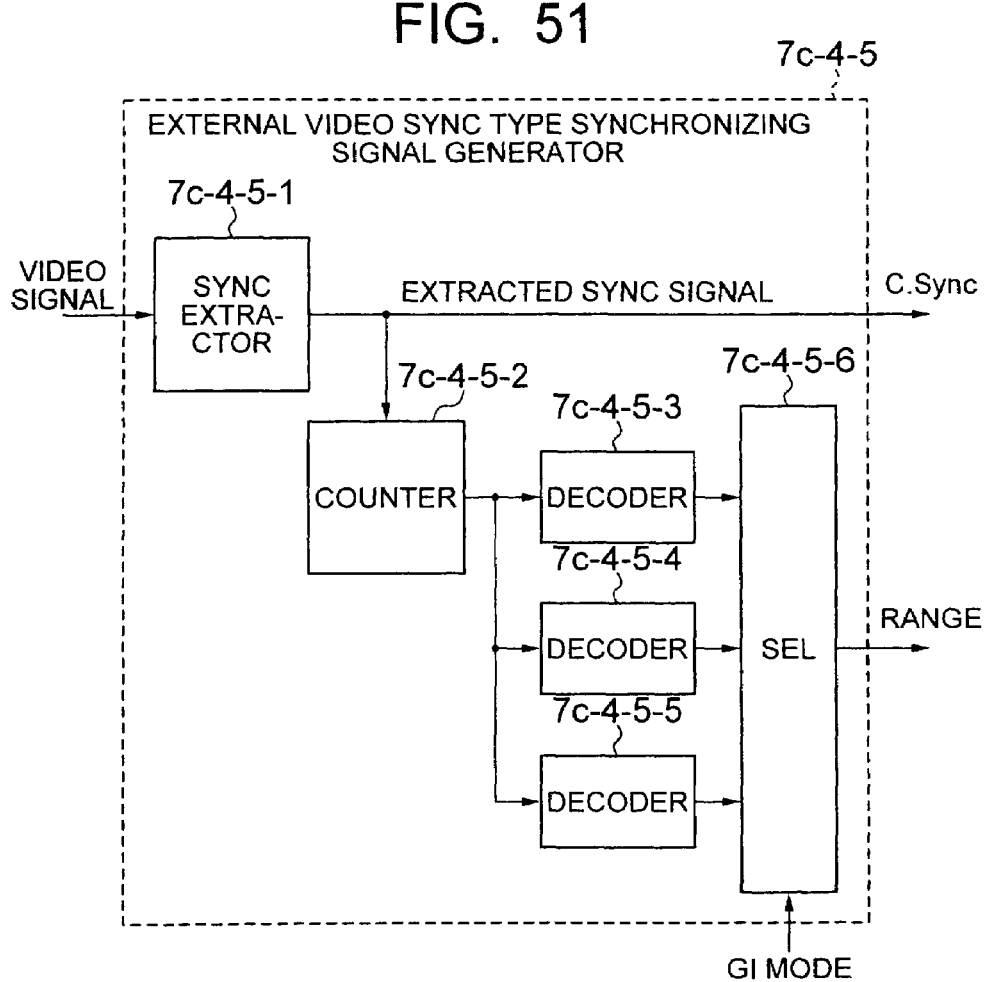
FIG. 51 is a block diagram showing one example of the external video synchronizing type synchronizing signal generator 7c-4-5 according to the invention.

FIG. 51 is a block diagram of a specific construction of the external video sync type synchronizing signal generator 7c-4-5. This generator will be described.

A sync extractor 7c-4-5-1 extracts an extracted sync signal from the input video signal. This sync signal is supplied to a counter 7c-4-5-2. The counter 7c-4-5-2 is reset by the vertical sync signal. The output from the counter 7c-4-5-2 is fed to decoders 7c-4-5-3, 7c-4-5-4, 7c-4-5-5.

The outputs of, for example, 3 μsec, 6 μsec and 12 μsec of guard interval length, from the decoders 7c-4-5-3, 7c-4-5-4 and 7c-4-5-5 are supplied to a selector (SEL) 7c-4-5-6, and thereby any one is selected in accordance with the GI mode signal as an output of each different guard interval length.

Figure 52A:
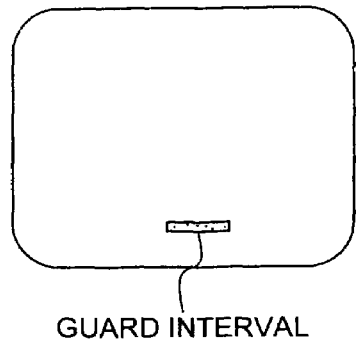
FIGS. 52A and 52B are schematic diagrams to which reference is made in explaining the displayed states of the guard interval range.

FIG. 52A shows a guard interval length signal of 3 μsec. In this example, this signal is displayed as a band shape of a range surrounded by the 220-th and 230-th scanning lines as counted from the bottom of the display screen, and by the 400-th and 580-th pixels in the lateral direction.

Figure 52B:
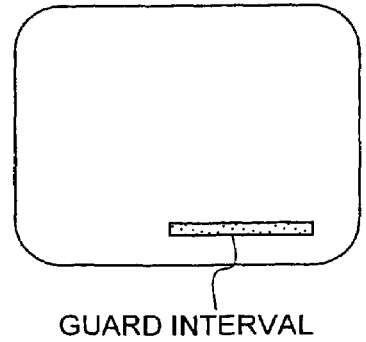

FIG. 52B shows a guard interval length signal of 6 μsec. In this example, this signal is displayed as a band shape of a range surrounded by the 220-th and 230-th scanning lines as counted from the bottom of the display screen, and by the 400-th and 760-th pixels in the lateral direction.

The alarm ranges shown in FIGS. 44A and 44B are switched by the same method. Although this embodiment automatically detects the guard interval, and switches modes for each portion, the GI mode signal may be changed manually.

According to the embodiments of the invention mentioned above, since a digital transmission system can be produced in which the field intensity, BER and ghost status indicative of the levels/presence or absence of reflected waves can be converted to different transmission-condition imaging signals and displayed so that those transmission-condition imaging signals or plus the received/decoded video signal can be comprehensively observed in association with each other, the alignment operation can be more correctly and easily performed. In addition, a digital transmission system having the function to alarm when the transmission condition is abnormal can be produced, and thus the transmission path characteristics can be grasped more correctly and easily.

While the OFDM system digital transmission has been described as an example, the present invention can be applied not only to this multi-carrier system such as OFDM but also to a single-carrier digital system. The following example can be considered as the ghost status signal detection method in the single-carrier system.

Ghost information is derived from the received signal by self-correlation processing and by using the preamble waveform component in a transmission system including a symbol mode in which the modulated signal includes periodical waveform components with respect to time, for example, in the single QAM system disclosed in U.S. Pat. No. 5,946, 350.

Figure 53:
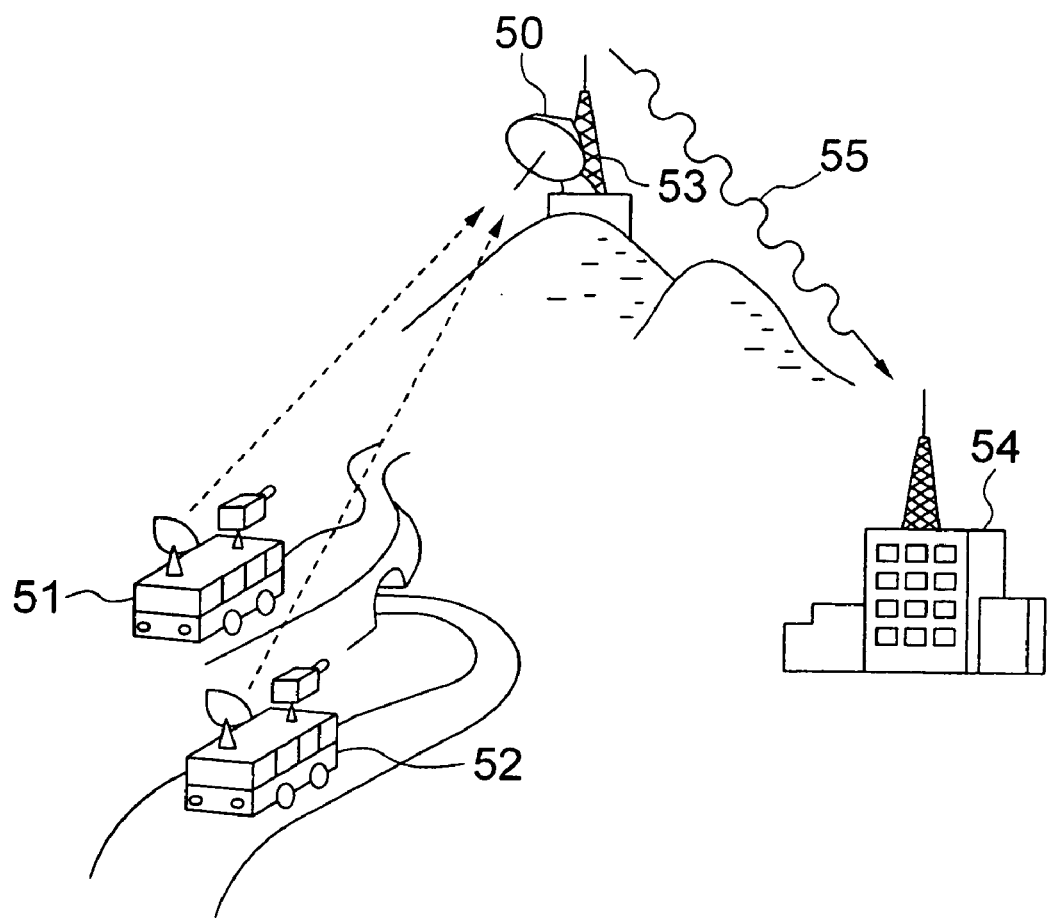
FIG. 53 is a schematic diagram showing an example of the operation of the digital transmission system.
Figure 54:
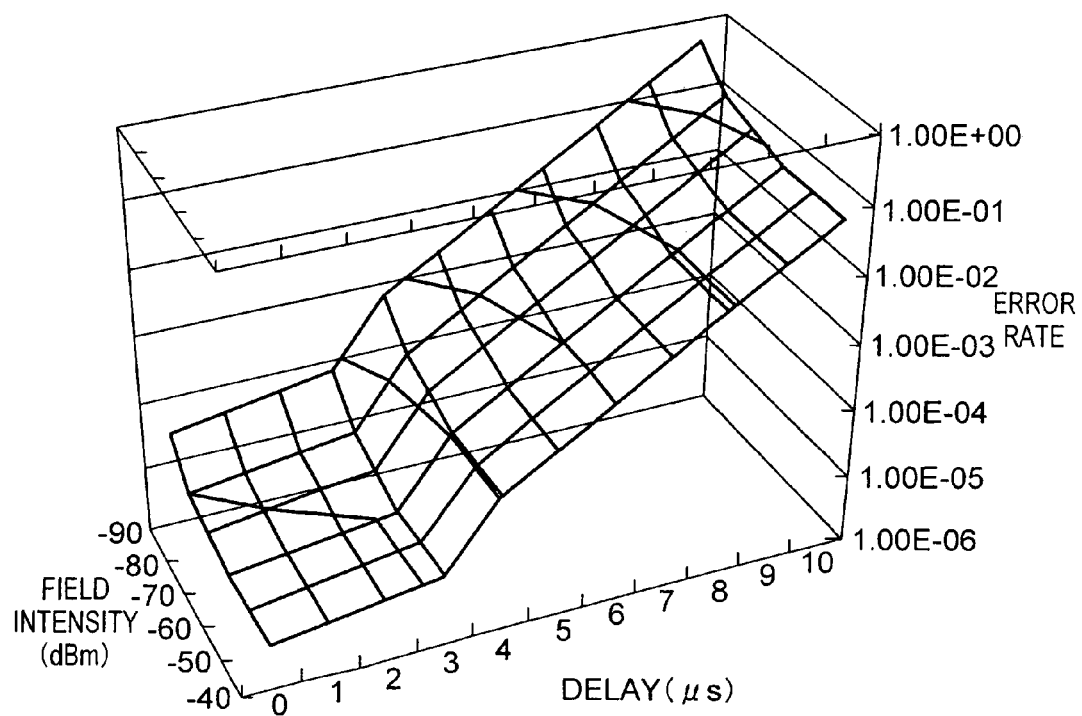
FIG. 54 is a diagram showing the relation among the field intensity, error rate and delay time between main wave and reflected wave.

With reference to drawings, a description will be made of an embodiment in which the ghost status imaging signal, and BER and field intensity imaging signals are transmitted together with the video signals that are transmitted from the outside broadcast vans 51 and 52 via the relaying station 53 to the broadcast station 54 as shown in FIG. 53. In this embodiment, since the program director in the broadcast station 54 can view the information of ghost status, BER and field intensity on the display, he can correctly and easily decide to select a satisfactorily transmitted video signal from the video signals that are transmitted from a plurality of outside broadcast vans. Like elements corresponding to those in the above-mentioned embodiments have fundamentally the same functions, and thus will not be described.

FIG. 55 is a block diagram of the whole construction of another embodiment according to the invention. FIGS. 56A, 56B and 56C show output video signals at each portion and displayed screens, respectively. This embodiment will be described in detail.

The transmission side such as outside broadcast vans has the MPEG-ENC 101M and the transmission-side processor 101. The receiving side of the first relaying station built on, for example, a hill has the receiving-side processor 203, the MPEG-DEC 203M, and the transmission-condition images superimposing device 7T. The signal processings from the transmission-side processor 101 to the receiving-side processor 203, and to transmission-condition images superimposing device 7T are the same as in the embodiment described with reference to FIG. 1 or FIG. 16.

The AGC control signal Sa indicative of a received field intensity, correlation-calculated signal Sc indicative of mixture status of reflected waves (ghost), and signal Sb indicative of BER status, which are produced from the receiving-side processor 203, are supplied to the transmission-condition images superimposing device 7T. The FSTrc pulse as the operation timing reference from the receiving-side processor 203 is also supplied to the transmission-condition images superimposing device 7T. The video output $V_i$ (FIG. 56A) from the MPEG-ENC 203M is fed as the video signal to the transmission-condition images superimposing device 7T. The video output $V_i$ is not limited to the output from the MPEG-ENC 203M, but may be an externally fed video signal from other video apparatus.

The video signal and audio signal received by the receiving-side of the relaying station are transmitted directly or via a plurality of other relaying stations (not shown) to the final receiving station, or broadcast station having studios. This transmission is made by means of, for example, analog FPU of microwave band.

The superimposed information extractor & transmission-condition-to-image converter 7R is provided on the final receiving station, or studio side.

The transmission-condition images superimposing device 7T receives the correlation-calculated signal Sc indicative of the mixture of reflected waves (ghost-status), and signals Sa indicative of the field strength, Sb indicative of the BER state together with the reference signal FSTrc indicative of pulses in frame period from the receiving-side processor 203, and it superimposes the information of these transmission conditions on the vertical blanking (VBL) period, out of the video effective period, of the video signal (FIG. 56A) that is fed from the MPEG-ENC 203M. The video signal Vs (FIG. 56B) with the transmission-conditions information superimposed is transmitted from a predetermined video transmitter 203T to the studio side.

On the studio side, a predetermined video receiver 300 produces a video signal Vs' by receiving the transmitted signal from the relaying station. The superimposed information extractor & transmission-condition-to-image converter 7R extracts, from the video signal Vs', information Sa', Sb' and Sc' indicative of transmission-conditions superimposed on the VBL period. Then, it receives the extracted information Sa', Sb' and Sc' indicative of the transmission conditions according to the synchronizing signal C.Sync, and outputs those information as a transmission-condition imaging signal to display 11 according to the synchronizing signal C.Sync within the video effective period which will be described later.

This transmission-condition imaging signal is displayed on the display as shown in FIG. 56C.

The construction of the transmission-condition images superimposing device 7T is fundamentally the same as in FIG. 11, but the construction of the image integrator 7-4 is slightly changed in this superimposing device 7T.

Figure 57:
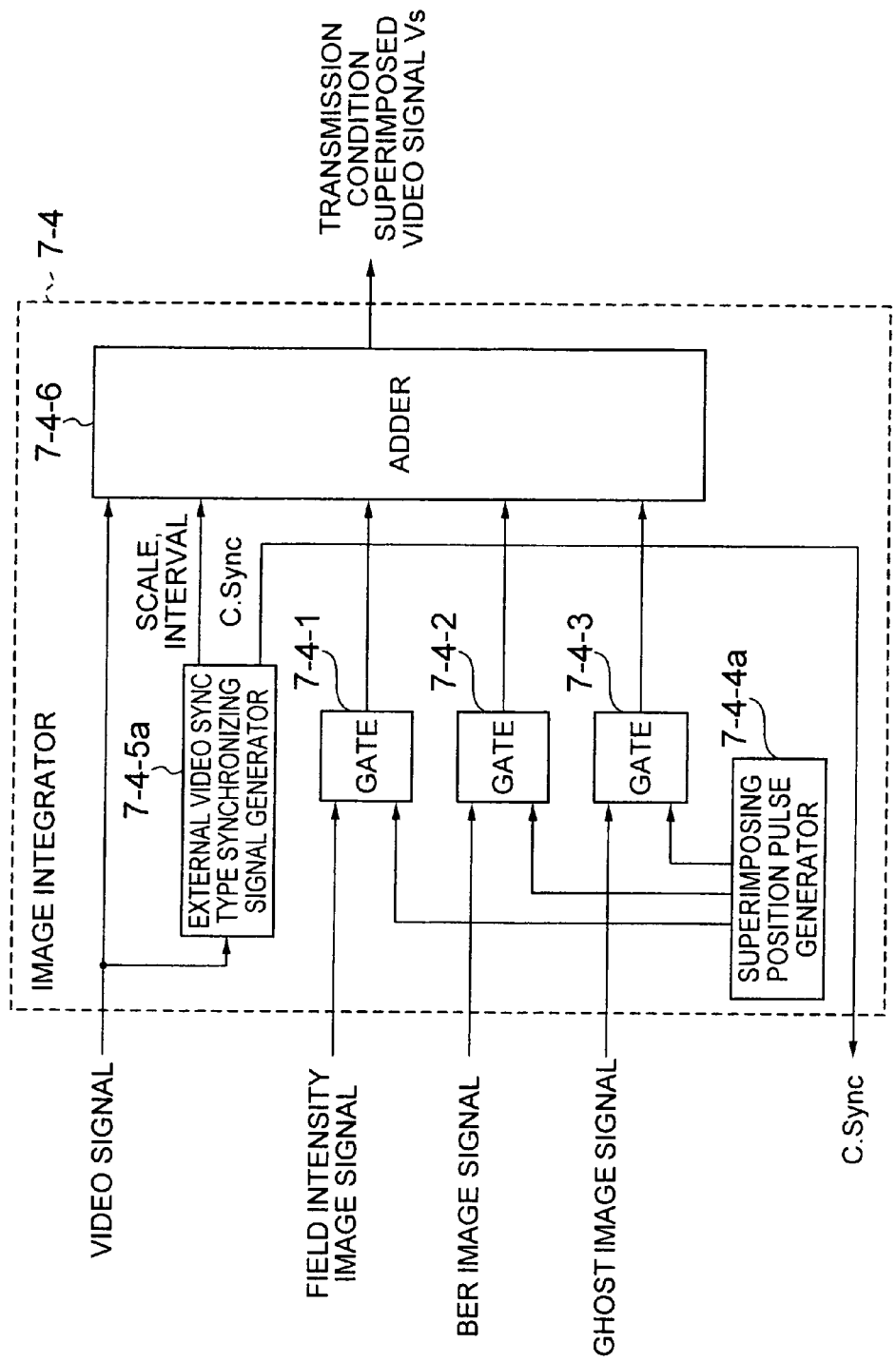
FIG. 57 is a block diagram of one embodiment of the image integrator 7-4 according to the invention.

FIG. 57 is a block diagram of an example of the image integrator 7-4. This integrator will be described in detail.

The video signal is supplied to an external video sync type synchronizing signal generator 7-4-5a and the adder 7-4-6. The synchronizing signal C.Sync from the generator 7-4-5a is fed to the outside. The adder 7-4-6 adds the imaging signals passed through the gates 7-4-1, 7-4-2, 7-4-3, the signal indicative of the time base scale and guard interval relative to the ghost imaging signal, and the video signal to produce the transmission-condition superimposed video signal Vs. A superimposing position pulse generator 7-4-4a specifies the position at which each imaging signal is superimposed on the video signal.

An example of the addition rates in the adder 7-4-6 will be given. If all signals applied to the adder 7-4-6 are +5 Volts in digital level, the rates of the field-intensity imaging signal, BER imaging signal and ghost imaging signal are 0.2, the rates of the time base scale signal and guard interval range signal are 0.05, and the rate of the video signal of which the video portion is analog signal of about 0.7 Volts is one.

Figure 58:
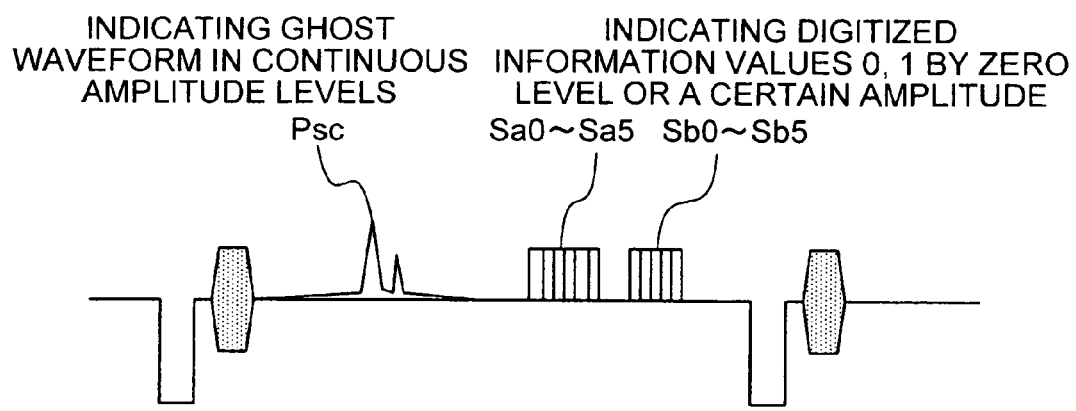
FIG. 58 is a schematic diagram showing a transmission-condition superimposed video signal waveform according to the invention.

FIG. 58 shows one example of the waveform of the transmission-condition superimposed video signal Vs. From FIG. 58, it will be seen that the ghost imaging signal Psc, field intensity imaging signal Sa0 through Sa5, and BER imaging signal Sb0 through Sb5 are superimposed on the VBL period of one line.

Since the ghost imaging signal is superimposed in analog level, the amplitude of the ghost waveform can be expressed by continuous curves with peaks. The field intensity level and BER can be expressed by binary values of which "0" or "1" indicates the presence or absence of the amplitude. That is, the presence or absence of amplitude is expressed by value "0" or "1" of digitized information.

Figure 59A:
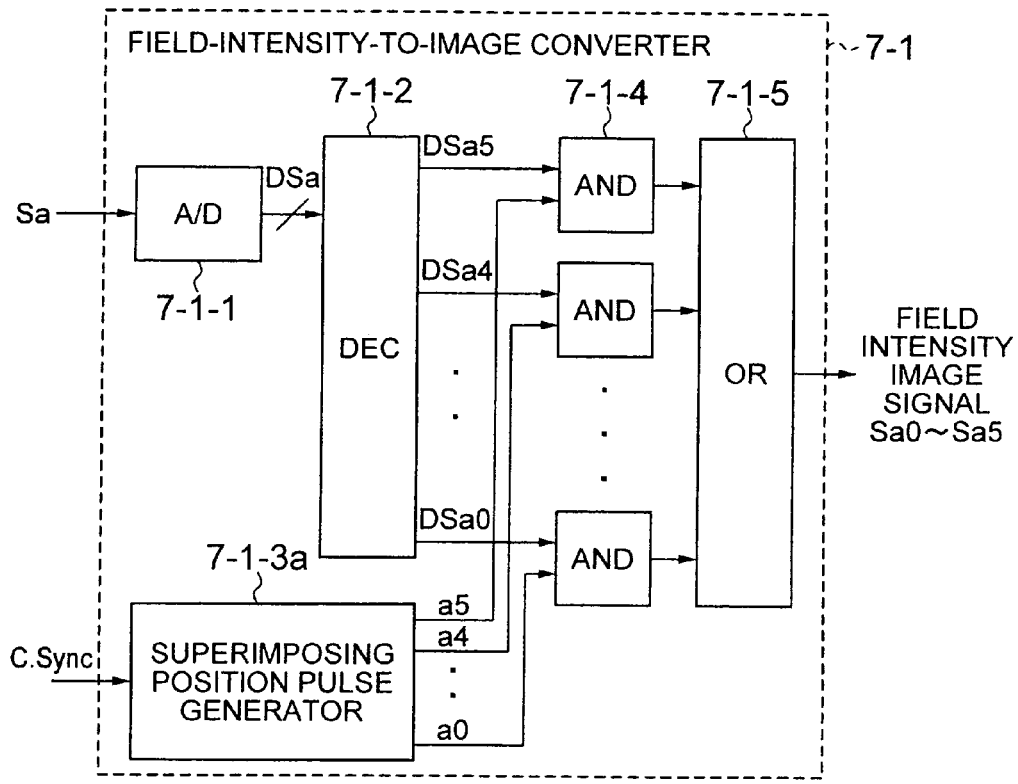
FIG. 59A is a block diagram of the field-intensity-to-image converter 7-1 according to the invention.

FIG. 59A is a block diagram of an embodiment of the field-intensity-to-image converter 7-1. This converter will be described.

The control signal Sa indicative of a field intensity is supplied to, and converted by the A/D converter 7-1-1 into the digital signal DSa of, for example, 6 bits. The signal DSa indicative of the field intensity is fed to, and converted by the decoder (DEC) 7-1-2 into, for example, all six signals of DSa0 through DSa5. The output signals DSa0 through DSa5 are fed to one terminals of the six AND gates (AND) 7-1-4, respectively. The six output signals from the AND 7-1-4 are supplied to the OR gate (OR) 7-1-5. The synchronizing signal C.Sync is fed to the superimposing position pulse generator 7-1-3a, which then generates associated superimposing position pulses a0 through a5 in synchronism with the synchronizing signal C.Sync. The pulses a0 through a5 are supplied to the other terminals of the AND 7-1-4, which then take the logical products of them and signals DSa0 through DSa5.

If the signal DSa indicative of the field intensity is 00 h, or 0 in decimal notation, only the signal Da0 becomes level "High", and thus only the product of the pulse a0 and signal DSa0 is level "High", with the result that only the signal DSa0 of the position corresponding to the pulse a0 is produced. If the signal DSa is 03 h, or 3 in decimal notation, the products of DSa0 through DSa3 and a0 through a3 are level "High", so that the signals DSa0 through DSa3 of the positions corresponding to the pulses a0 through a3 are produced. Then, those output signals from the AND are logically processed in the OR 7-1-5 to produce the field intensity imaging signals Sa0 through Sa5.

Figure 59B:
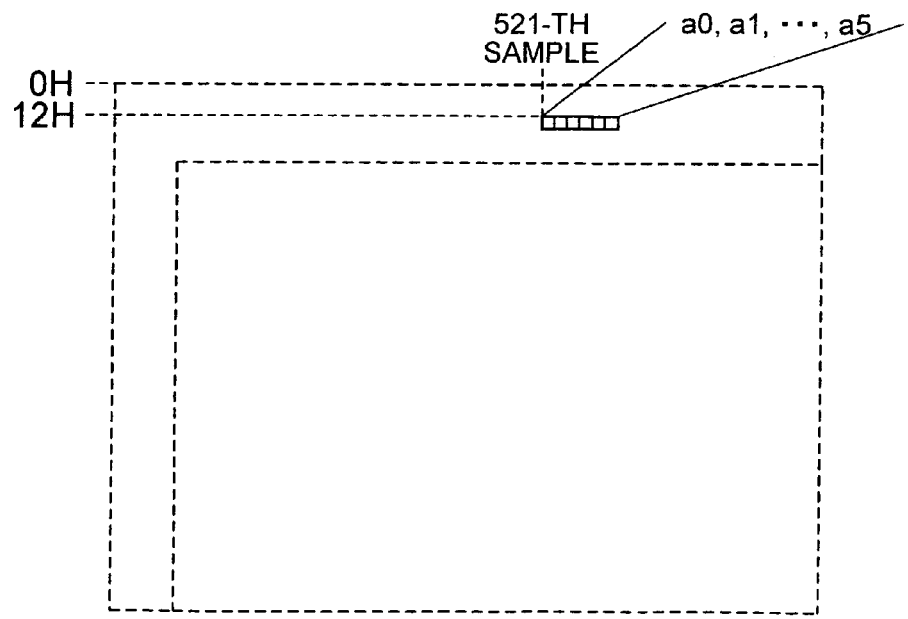
FIG. 59B is a schematic diagram showing one example of the displayed picture.

Here, If the pulse a0 corresponds to the position of the 12-th H, and the 512-nd through 520-th sample, pulse a1 the position of the 12-th H, and 521-st through 529-th sample, and pulse a5 the position of the 12-th H, and the 540-th through 548-th sample, the field intensity imaging signal Sa0 through Sa5 is superimposed on the VBL period, out of the video effective area, of the video signal as shown by the raster scanning screen of FIG. 59B.

Figure 60A:
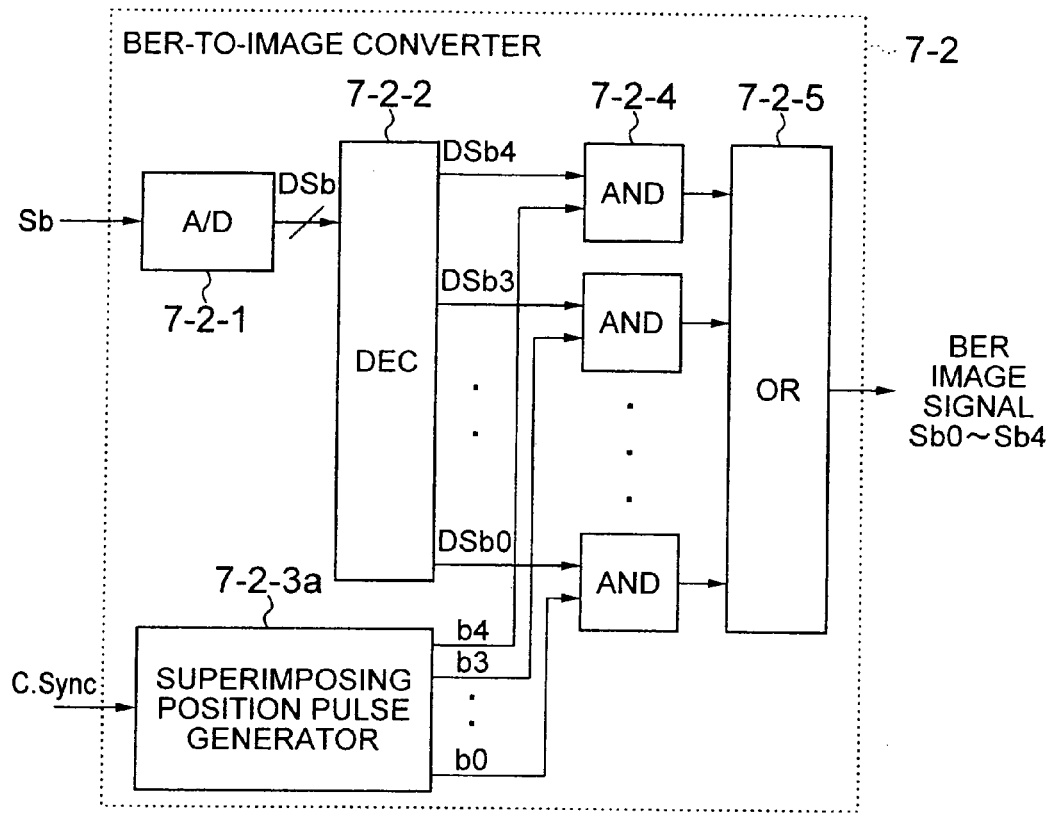
FIG. 60A is a block diagram of the BER-to-image converter 7-2 according to the invention.

FIG. 60A is a block diagram of an embodiment of the BER-to-image converter 7-2. This converter will be described.

The signal Sb indicative of BER is supplied to, and converted by the A/D converter 7-2-1 into the digital signal DSb of about 3 bits. The signal DSb indicative of the BER is converted by the decoder (DEC) 7-2-2 into, for example, all five signals DSb0 through DSb4.

The output signals DSb0 through DSb4 are fed to one input terminals of the five AND gates (AND) 7-2-4. The five output signals from the AND 7-24 are supplied to the OR gate (OR) 7-2-5.

The synchronizing signal C.Sync is supplied to a superimposing position pulse generator 7-2-3a, which then generates pulses b0 through b4 for superimposing the BER signal according to the timing of the synchronizing signal C.Sync.

The pulses b0 through b4 are fed to the other input terminals of the AND 7-2-4, which then take the logical products of the signals DSb0 through DSb4 and the pulses b0 through b4. Here, if the BER signal DSb is 00 h, or 0 in decimal notation, only the signal DSb0 is level "High", and thus only the product of the pulse b0 and signal DSb0 is level "High", so that the signal DSb0 of the position corresponding to the pulse b0 is produced. If the signal DSb is 03 h, or 3 in decimal notation, the logic products of the DSb0 through DSb3 and b0 through b3 are level "High", with the result that the signals DSb0 through DSb3 of the positions corresponding to the pulses b0 through b3 are produced.

The superimposing position pulse generator 7-2-3a, if it is for NTSC, makes logical processing by use of the 1/910 frequency dividing counter that counts at a clock of 14.3 MHz and is reset with a H-period, and the 1/525 frequency dividing counter that counts at a clock of ½ H and is reset with V-period.

Figure 60B:
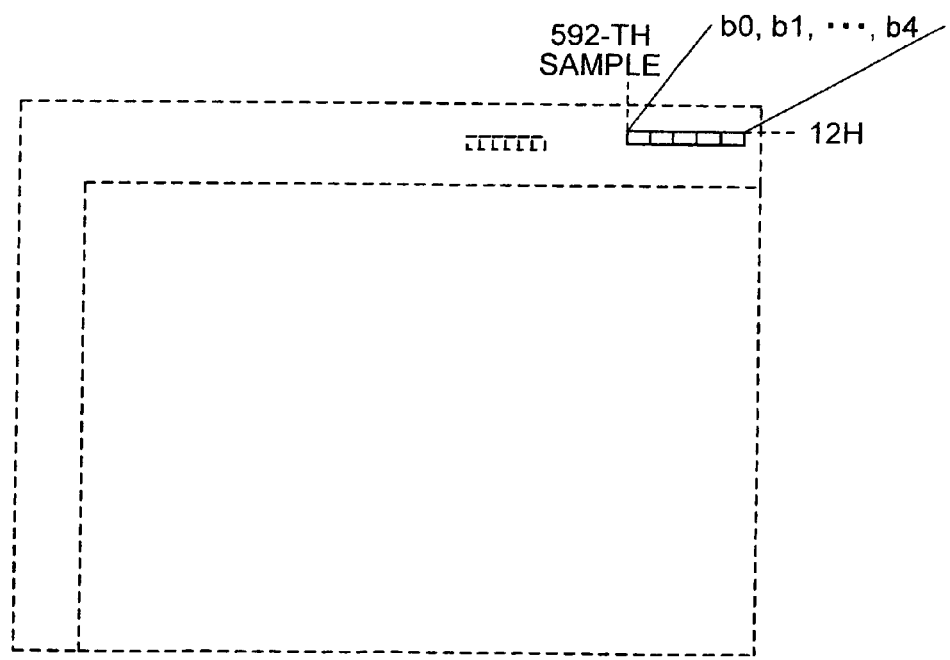
FIG. 60B is a schematic diagram showing one example of the displayed picture.

Thus, as, for example, illustrated on the raster screen of FIG. 60B, the b4 signal corresponds to the position of the 12-th H, and 560-th through 567-th sample, and the b3 signal the position of the 12-th H, and 568-th through 575-th sample. The b2 signal corresponds to the position of the 12-th H, and the 576-th through 583-rd sample, the b1 signal the position of the 12-th H, and the 584-th through 591-st sample, and the b0 signal the position of the 12-th H, and the 592-nd through 599-th sample. Therefore, at this time, the BER imaging signal Sb0 through Sb4 is superimposed on the VBL period, out of the effective area, of the video signal as shown in FIG. 60B.

Figure 61:
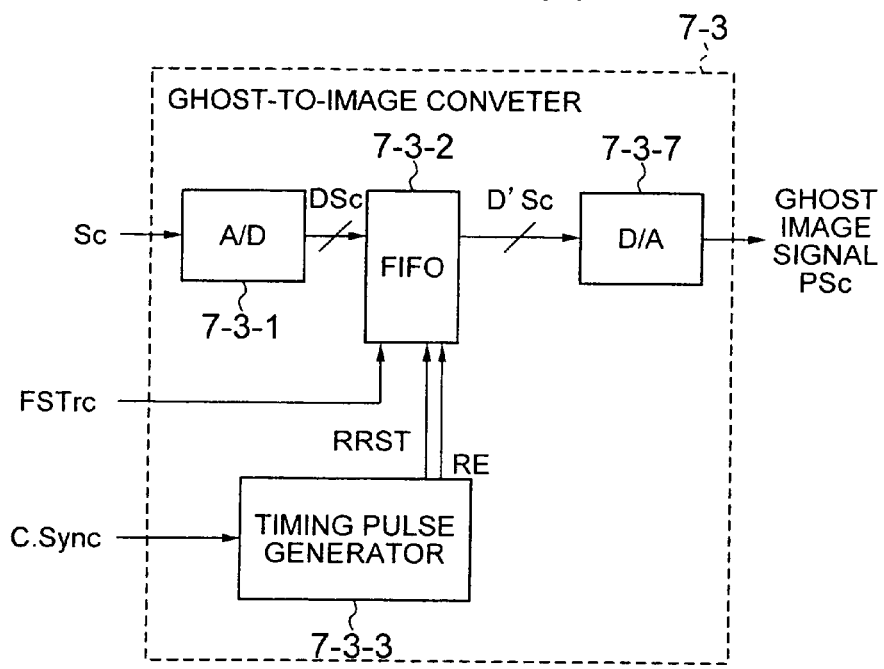
FIG. 61 is a block diagram showing the construction of the ghost-status-to-image converter 7-3 according to the invention.

FIG. 61 is a block diagram of an embodiment of the ghost-to-image converter 7-3. This converter will be described.

The correlation output signals indicative of the ghost status is supplied to, and converted by the A/D converter 7-3-1 into the digital correlation output signal DSc of 8 bits. This signal DSc is fed to the FIFO 7-3-2. The pulse FSTrc of frame period is supplied to the write-in reset terminal of the FIFO 7-3-2. The digital correlation output signal D'Sc from the FIFO 7-3-2 is fed to the D/A converter 7-3-7. The output from the D/A converter 7-3-7 is produced as the ghost imaging signal Psc. The synchronizing signal C.Sync is supplied to the timing pulse generator 7-3-3.

The generator 7-3-3 responds to the synchronizing signal C.Sync to generate the read reset signal RRST and read enable signal RE, and supply them to the FIFO 7-3-2.

Figure 62:
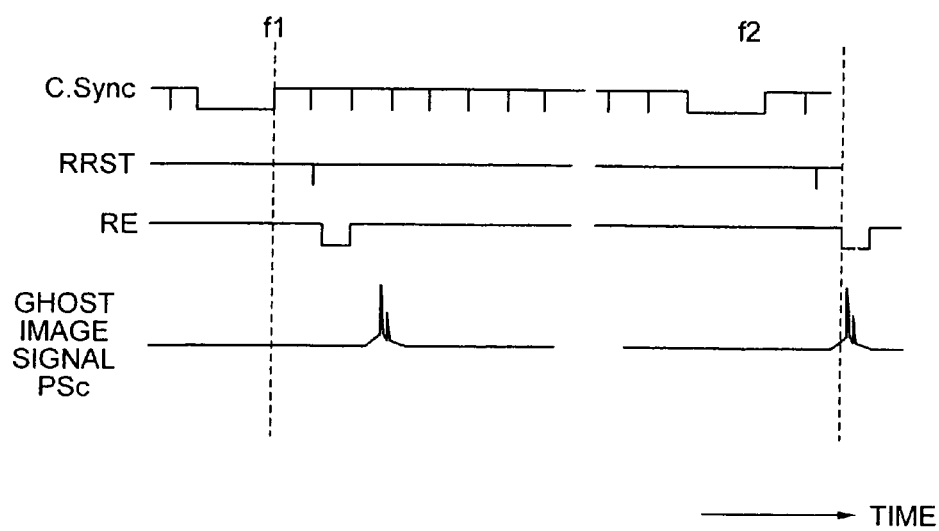
FIG. 62 is a timing chart of the signal at each part of the ghost-status-to-image converter 7-3 according to the invention.

FIG. 62 is a timing chart for the relation among the signal C.Sync, signal RRST, signal RE and ghost imaging signal Psc. The operation of the converter will be described.

The timing pulse generator 7-3-3 generates the reset signal RRST at the time of the 12-th H, and the 128-th sample in each video period, so that the FIFO 7-3-2 can be made ready to read the written contents from the beginning end. In addition, it generates the RE signal that becomes level "Low" at the time of the 12-th H, and the 130-th through 400-th sample, so that the contents (D'Sc) written in the FIFO 7-3-2 can be read in turn according to this signal.

The readout signal D'Sc is converted by the D/A converter 7-3-7 into the analog ghost imaging signal Psc, which is produced in the VBL period of each video period.

Figure 63A:
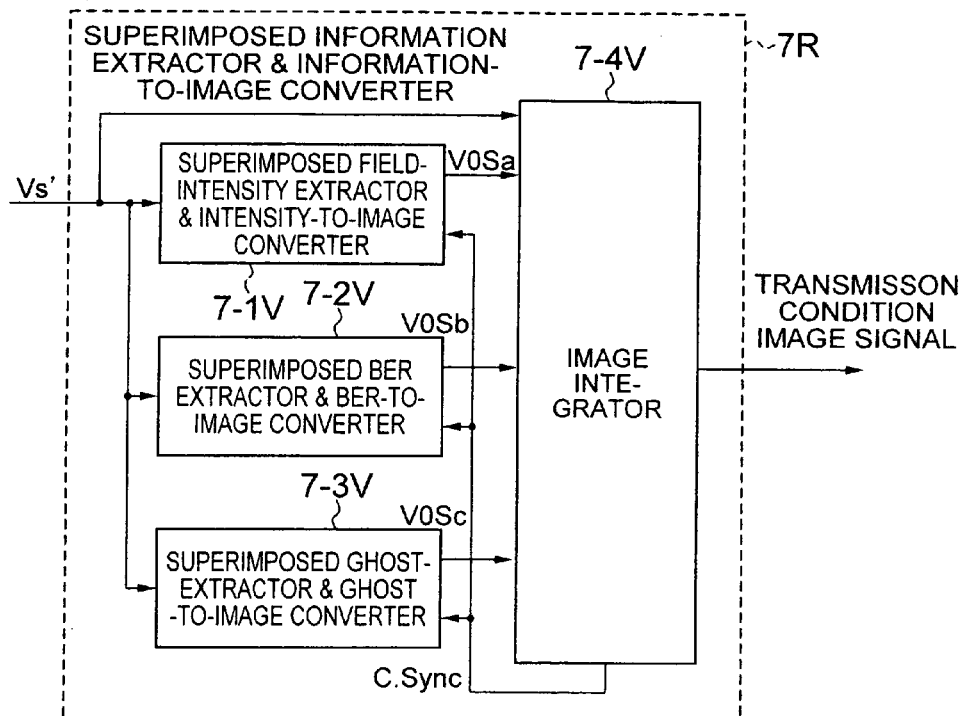
FIG. 63A is a block diagram of a superimposed information extractor & transmission-condition-to-image converter 7R according to the invention.

FIG. 63A is a block diagram of the superimposed information extractor & transmission-condition-to-image converter 7R as another example. This converter will be described.

The superimposed information extractor & transmission-condition-to-image converter 7R to which the video signal Vs' in which the transmission-condition information sa0' through sa5', sb0' through sb4', Psc' are superimposed on the VBL period is supplied has a superimposed field-intensity extractor & field-intensity-to-image converter 7-1V, a superimposed BER extractor & BER-to-image converter 7-2V, a superimposed ghost extractor & ghost-to-image converter 7-3V, and an image integrator 7-4V.

The synchronizing signal C.Sync is derived from the video signal Vs' in the image integrator 7-4V, and supplied from the image integrator 7-4V to the superimposed field-intensity extractor & field-intensity-to-image converter 7-1V, superimposed BER extractor & BER-to-image converter 7-2V, and superimposed ghost extractor & ghost-to-image converter 7-3V.

The outputs V0Sa, V0Sb, V0Sc from those extractor & converters 7-1V, 7-2V, 7-3V are supplied to the image integrator 7-4V.

The extractor & converters 7-1V, 7-2V, 7-3V find, in synchronism with the synchronizing signal C.Sync, the periods of the information sa0' through sa5', sb0' through sb4', Psc' that are indicative of the transmission-conditions superimposed on the VBL period of the input video signal Vs', and extracts these information. In addition, those extractor & converters 7-1V, 7-2V, 7-3V convert these information to the associated imaging signals so that they can be displayed on predetermined positions within the video effective period as will be described later.

The image integrator 7-4V unites these imaging signals to form the transmission-condition imaging signal.

Figure 63B:
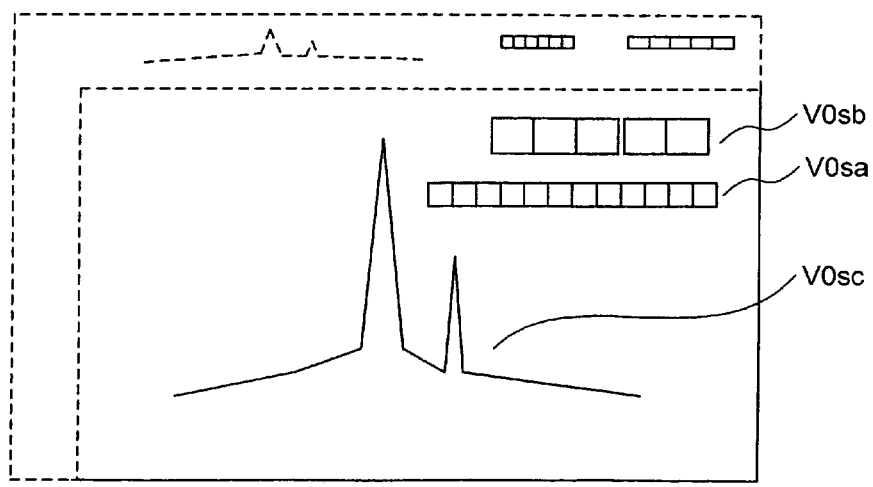
FIG. 63B is a schematic diagram showing one example of the displayed picture.

FIG. 63B is a schematic diagram showing this transmission-condition imaging signal (Vosa, Vosb, Vosc) fed to and displayed on a display 11 (FIG. 55) within the video effective period of the screen. Thus, since the various different transmission conditions (field intensity-Vosa, BER-Vosb, ghost-Vosc) are displayed within the video effective period of the screen, the director or operator on the studio side distant away from the OFDM transmission system can correctly grasp the transmission conditions, or transmission status.

Figure 64A:
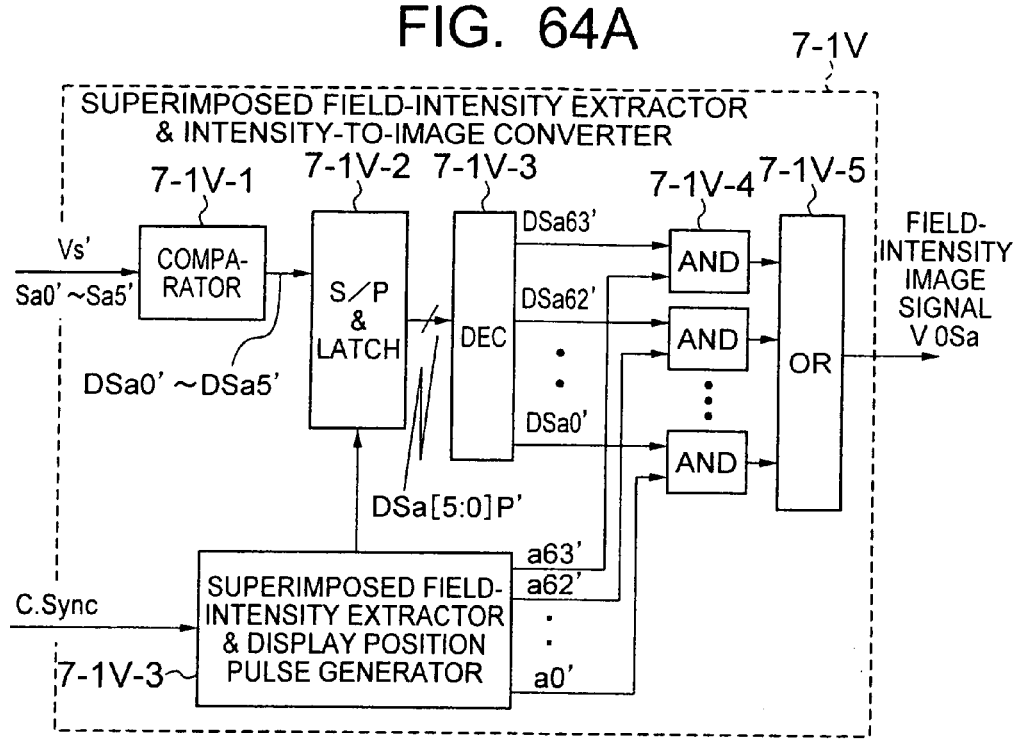
FIG. 64A is a block diagram of a superimposed field intensity extractor & field-intensity-to-image converter 7-1V according to the invention.

FIG. 64A is a block diagram of an example of the superimposed field intensity extractor & field-intensity-to-image converter 7-1V. This converter will be described.

The analog field intensity information sa0' through sa5' superimposed on the 12-th H of the video signal Vs' as described above is supplied to a comparator 7-1V-1, and converted thereby into digital signals DSa0' through DSa5'. These signals DSa0' through DSa5' are serially successive signals with respect to time.

The signals DSa0' through DSa5' are fed to a serial-to-parallel converter (S/P) & latch 7-1V-1, and converted thereby to parallel data DSa [5:0] P' of, for example, 6 bits.

The sampled, held parallel output DSa [5:0] P' from the S/P & latch 7-1V-1 is supplied to a decoder 7-1V-2. The decoder 7-1V-2 converts the DSa [5:0] P' of 6 bits to, for example, 64 pieces of data, DSa63' through DSa0'.

The outputs DSa63' through DSa0' from the decoder 7-1V-2 are supplied to 64 AND gates 7-1V-4, respectively. The outputs from the 64 AND gates 7-1V-4 are fed to an OR gate 7-1V-5. The synchronizing signal C.Sync is supplied to a superimposed field intensity extractor & display position pulse generator 7-1V-3. This extractor & pulse generator 7-1V-3 responds to the synchronizing signal C.Sync to generate the extraction pulse Psa and display position pulses a63' through a0'.

A total of six pulses of the extraction pulse Psa are generated during the interval, for example, from the 512-nd to 548-th sample of 12-th H out of the video effective period. The display position pulses a0' through a63' become level "High" during the positional range, for example, from the 200-th to 203-rd horizontal scanning line, and from the 384-th to 640-th sample.

That is, the signal a0' is displayed at the position of the 200-th through 203-rd H (Horizontal line), and the 384-th to 387-th sample. The signal a62' is displayed at the position of the 200-th through 203-rd H, and the 632-nd through 635-th sample.

The signal a63' is displayed at the position of the 200-th to 203-th H, and the 637-th through 640-th sample.

These pulses a' through a63' are supplied to the other input terminals of the AND gates 7-1V-4. The AND gates 7-1V-4 produce the logic products of the pulses a0' through a63' and DSa63' through DSa0', respectively.

Figure 64B:
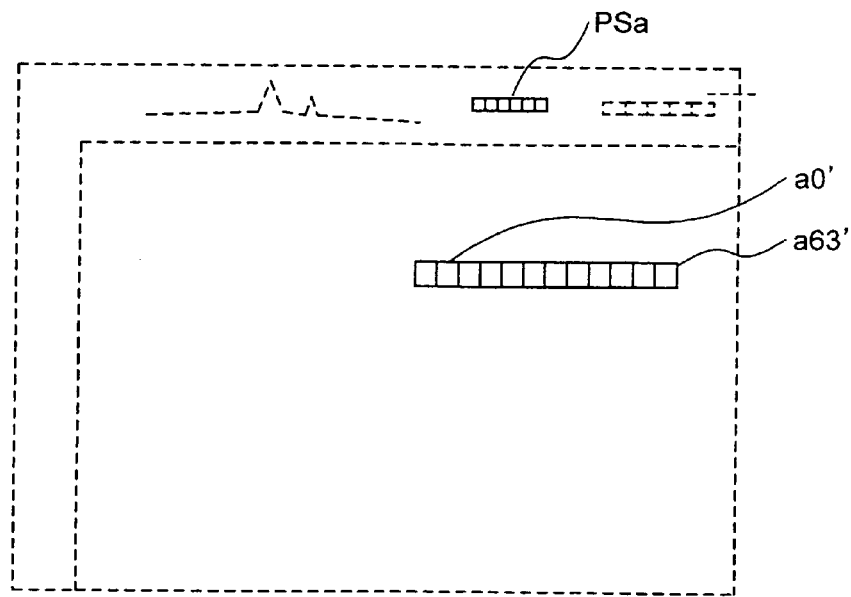
FIG. 64B is a schematic diagram of one example of the displayed picture.

FIG. 64B is a schematic diagram showing the extraction pulse Psa and display position pulses a0' through a63' displayed on the screen.

Figure 65A:
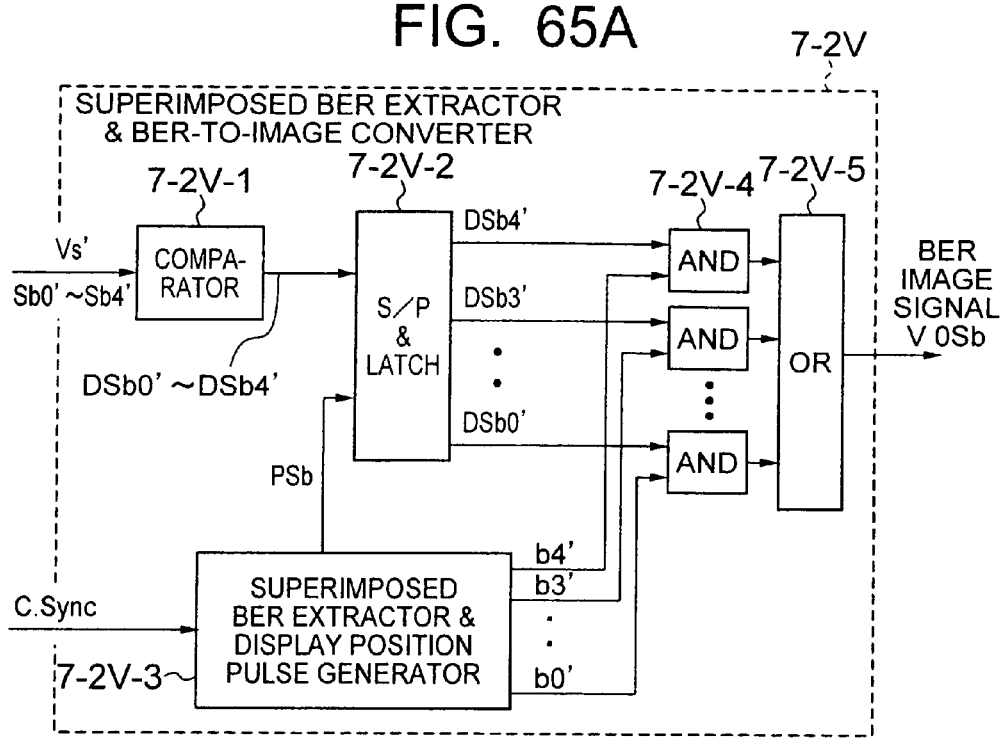
FIG. 65A is a block diagram of a superimposed BER extractor & BER-to-image converter 7-2V according to the invention.

FIG. 65A is a block diagram of an embodiment of the superimposed BER extractor & BER-to-image converter 7-2V. This extractor & converter 7-2V will be described.

The analog BER information Sb0' through Sb4' superimposed on the 12-th H of the video signal Vs' as described above are supplied to a comparator 7-2V-1, and converted thereby to digital signals DSb0' through DSb4'. The signals DSb0' through DSb4' are a total of five serially successive signals with respect to time. The signals DSb0' through DSb4' are supplied to a serial-to-parallel converter (S/P) & latch 7-2V-2, and converted thereby to, for example, a total of five parallel pieces of data DSb0' through DSb4'.

The signals DSb0' through DSb4' from the S/P & latch 7-2V-2 are fed to five AND gates 7-2V-4. The five outputs from the AND gates 7-2V-4 are supplied to an OR gate 7-2V-5.

The synchronizing signal C.Sync is supplied to a superimposed BER extractor & display position pulse generator 7-2V-3. The extractor & generator 7-2V-3 responds to the synchronizing signal C.Sync to generate display position pulses b0' through b4' during the video effective period. This extractor & generator 7-2V-3 also generates the extraction pulse PSb' at the 12-th H out of the video effective period.

Figure 65B:
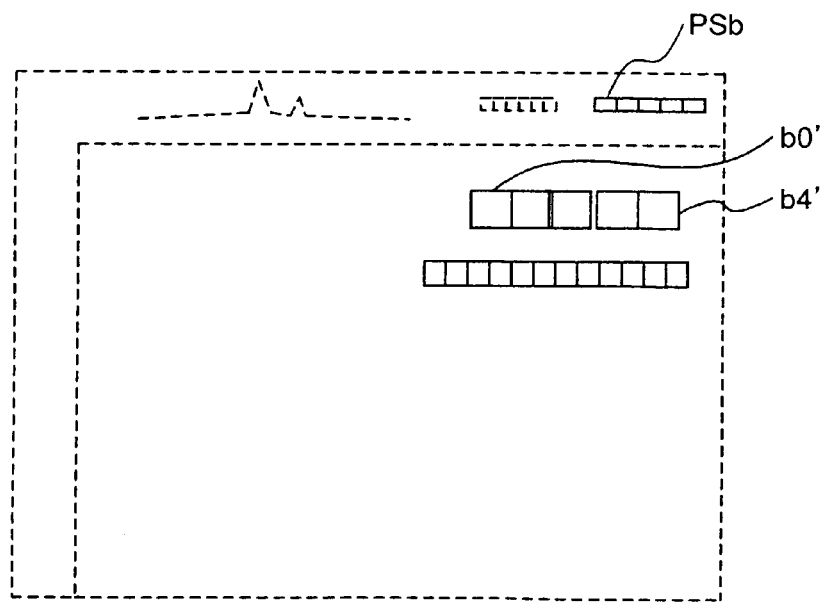
FIG. 65B is a schematic diagram showing one example of the displayed picture.

FIG. 65B is a schematic diagram showing the extraction pulse PSb and display position pulses b0' through b4' displayed on the screen.

The superimposed BER extractor & display position pulse generator 7-2V-3, if it is used for NTSC, makes logic processing by use of a 1/910 frequency dividing counter that counts at a clock of 14.3 MHz and is reset with H-period, and a 1/525 frequency dividing counter that counts at a clock of 1/2 H and is reset with V-period.

Consequently, for example, the signal b4' is displayed at the position of the 80-th through 96-th H, and the 512-nd through 526-th sample. The signal b3' is displayed at the position of the 80-th through 96-th H, and 528-th through 542-nd sample. The signal b2' is displayed at the position of the 80-th through 96-th H, and the 544-th through 558-th sample. The signal b1' is displayed at the position of the 80-th through 96-th H, and the 560-th through 574-th sample. The signal b0' is displayed at the position of the 80-th through 96-th H, and the 576-th through 590-th sample.

Figure 66A:
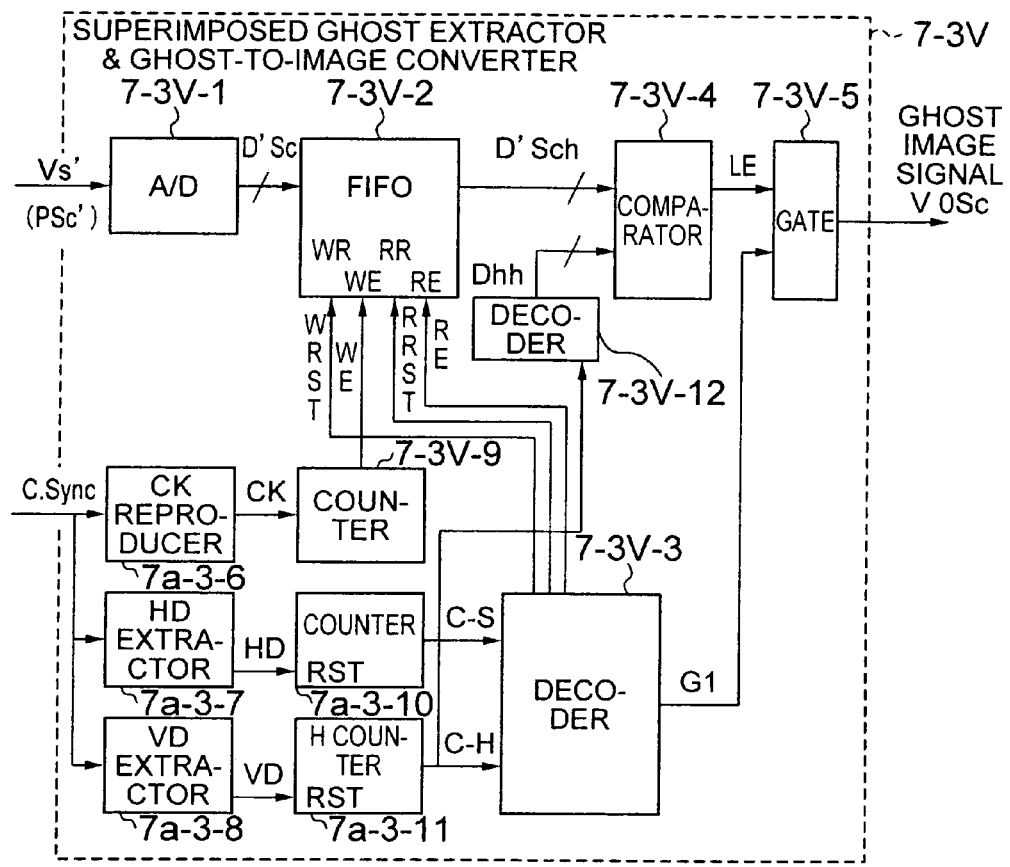
FIG. 66A is a block diagram of a superimposed ghost-status extractor & ghost-to-image converter 7-3V according to the invention.

FIG. 66A is a block diagram of an embodiment of the superimposed ghost extractor & ghost-to-image converter 7-3 V. This extractor & converter 7-3 V will be described.

The ghost information PSc' superimposed at the 12-th H of the video signal Vs' as described above is supplied to an A/D converter 7-3V-1. The output D'Sc from the A/D converter 7-3V-1 is fed to the write-in data terminal of an FIFO 7-3V-2. The output D'Sch from the FIFO 7-3V-2 is supplied to a comparator 7-3V-4. The output LE from the comparator 7-3V-4 is supplied to a gate 7-3V-5.

The synchronizing signal C.Sync is supplied to a CK reproducer 7-3V-6, an HD extractor 7-3V-7, and a VD extractor 7-3V-8. The output CK from the CK reproducer 7-3V-6 is fed to a counter 7-3V-9. The output WE from the counter 7-3V-9 is supplied to the WE terminal of the FIFO 7-3V-2.

The output HD from the HD extractor 7-3V-7 is supplied to a counter 7-3V-10. The output C-S from the counter 7-3V-10 is fed to a decoder 7-3V-3. The output VD from the VD extractor 7-3V-8 is supplied to an H-counter 7-3V-11. The output C-H from the H-counter 7-3V-11 is supplied to the decoder 7-3V-3 and a decoder 7-3V-12. The output RRST from the decoder 7-3V-3 is supplied to the RR terminal of the FIFO 7-3V-2. Similarly, the output RE from the decoder 7-3V-3 is fed to the RE terminal of the FIFO 7-3V-2.

The control signal WRST for use in extracting the ghost information PSc' is supplied from the decoder 7-3V-3 to the write-in reset terminal WR of the FIFO 7-3V-2. The WE is fed to the write-in control terminal WE of the FIFO 7-3V-2. The output Dhh from the decoder 7-3V-12 is fed to the comparator 7-3V-4.

The CK reproducer 7-3V-6 reproduces the CK of, for example, 14.3 MHz on the basis of the input synchronizing signal C.Sync. The HD extractor 7-3V-7 extracts the H-period component from the synchronizing signal C.Sync, and produces the HD signal of H-period. The counter 7-3V-10 is reset by the HD signal and produces the counter signal C-S of which the value increases at every CK period.

The VD extractor 7-3V-8 extracts the V-period component from the synchronizing signal C.Sync, and produces the VD signal of V-period. The H-counter 7-3V-11 is reset by the VD signal, and produces the counter signal C-H of which the value increases at every H-period.

The decoder 7-3V-3 receives the counter signals C-S and C-H, and produces on the basis of those signals the read reset signal RRST that becomes level "Low" for 1 CK period at every Horizontal scanning line during the interval from the m-th scanning line to the (m+n)-th scanning line. This RRST initializes the read address to the FIFO 7-3V-2 into 0. The decoder 7-3V-3 also produces the read enable signal RE that becomes level "High" during the interval, similarly, from the m-th scanning line to the (m+n)-th scanning line, and advances the read address to the FIFO 7-3V-2 so that the D'Sch as the correlation calculated signal Sc can be read from the FIFO 7-3V-2.

Figure 66B:
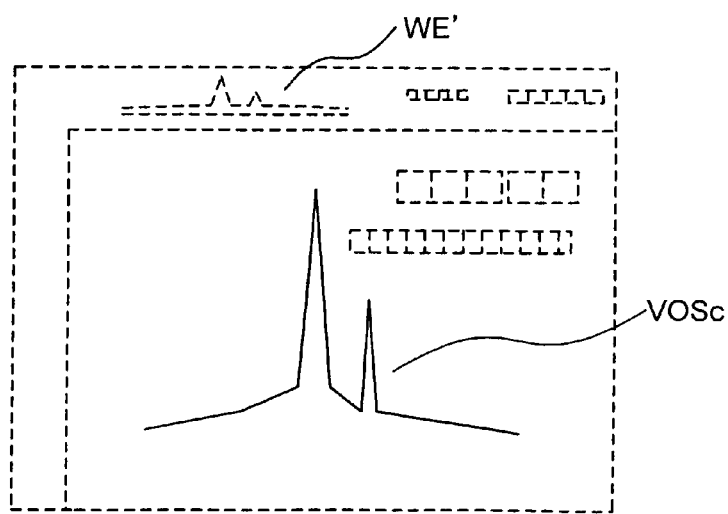
FIG. 66B is a schematic diagram showing one example of the displayed picture.

The decoder 7-3V-12 responds to the input counter signal C-H to generate the Dhh that becomes level 1$a$ at the m-th scanning line, then reduces its level by i at every horizontal scanning line, and becomes 1$b$ at the (m+n)-th scanning line. The comparator 7-3V-4 compares the D'Sch as the correlation calculated signal Sc and the Dhh, and produces output LEh that becomes level "High" when the condition of D'sch>Dhh is satisfied. FIG. 66B shows the ghost imaging signal VOSc superimposed on the reproduced picture of the video signal on the display screen.

Figure 67:
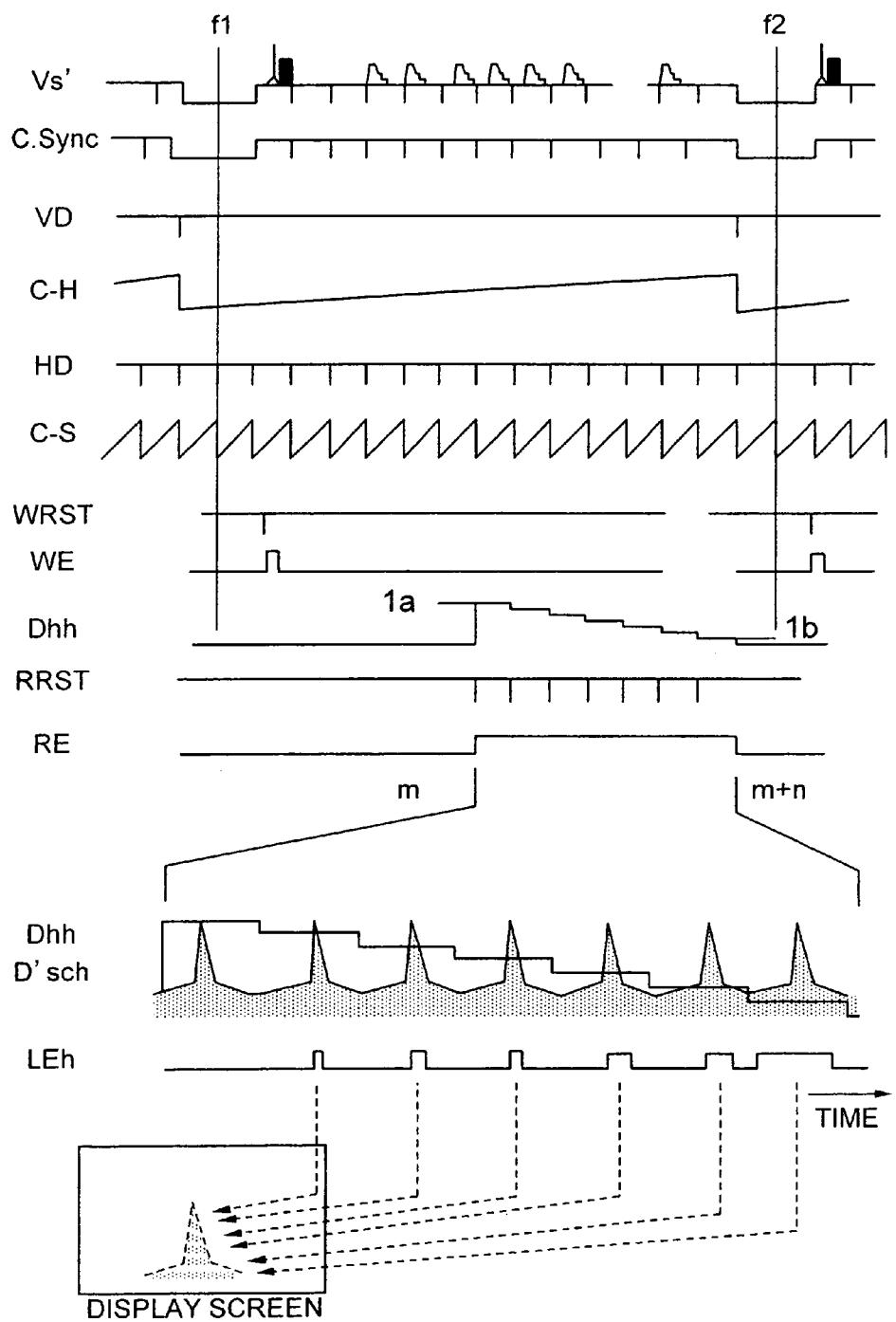
FIG. 67 is a timing chart to which reference is made in explaining the operation of the superimposed ghost-status extractor & ghost-to-image converter 7-3V of FIG. 66A.

FIG. 67 is a timing chart of the various signals mentioned above. The extractor & converter 7-3V will be further described.

The WRST signal is generated, for example, at the 100-th sample of the 12-th H of the video signal Vs' on which the information is superimposed at the 12-th H, and initializes the FIFO 7-3V-2. The WE signal is generated that becomes level "Low", for example, in the interval from the 128-th to the 256-th sample of the 12-th H of the video signal Vs' on which the information is superimposed at the 12-th H, so that the D'Sc can be written in the FIFO 7-3V-2.

The RE signal is produced during the interval from the m-th to the (m+n)-th sample at every H-period, so that the written contents can be read sequentially one by one. The signal D'Sch read out at every H-period of the video signal is compared with the value Dhh at every horizontal scanning line, so that the comparator generates the LE signal that becomes level "High" when the condition of D'Sc<Dhh is satisfied.

In order to prevent the LE signal from being generated in the blanking period, the GI signal that becomes level "Low" during the blanking period is used to forcibly make the ghost imaging signal VOSc level "Low" in the blanking period. The higher the level of the Sc signal, the longer the High-level period of the ghost imaging signal.

Thus, the information of the field intensity, BER and reflected wave mixture (ghost) that indicate the transmission conditions, status or situations in the transmission of signals from movable bodies can be transmitted to the studio side distant away from the OFDM transmission system. On the studio side, each piece of the information that indicates each of the superimposed transmission conditions is extracted from the received video signal, and displayed as a transmission-condition imaging signal within the video effective period, so that the director or operator can accurately understand these transmission conditions from the screen.

If the receiving side has no special receiver for the transmitted information indicative of the transmission conditions that require such transmission and displaying system as mentioned above, the operator cannot view the transmission conditions.

Thus, the next embodiment, which will be described below, enables the director or operator to grasp the transmission conditions without any special receiver by expressing the information of transmission conditions in amplitude levels or in pulse width values, and adding, or superimposing them on part of the video signal before the transmission of the information.

Figure 69:
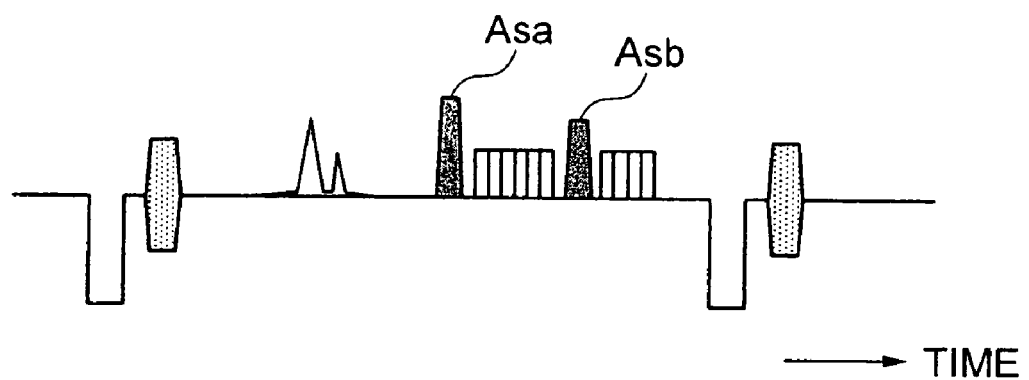
FIG. 69 is a schematic diagram showing one example of a transmission-condition superimposed imaging signal waveform according to the invention.

FIG. 69 schematically shows one example of the transmission-condition superimposed & continuous signal added video signal that has added therein a signal Asa of the field intensity information Sa expressed by amplitude level intensity and a signal Asb of the BER information Sb similarly expressed by amplitude level.

There is a video waveform monitor that is always taken as an apparatus in the field of the operation on a mobile relaying communicator such as the outside broadcast van. If this monitor is used for the operator to observe only the signal of a line containing the transmission-condition superimposed & continuous signal added video signal waveform by the line selection function, the transmission conditions can be viewed or observed without use of the special apparatus (the superimposed information extractor & transmission-condition-to-image converter 7R).

Figure 68:
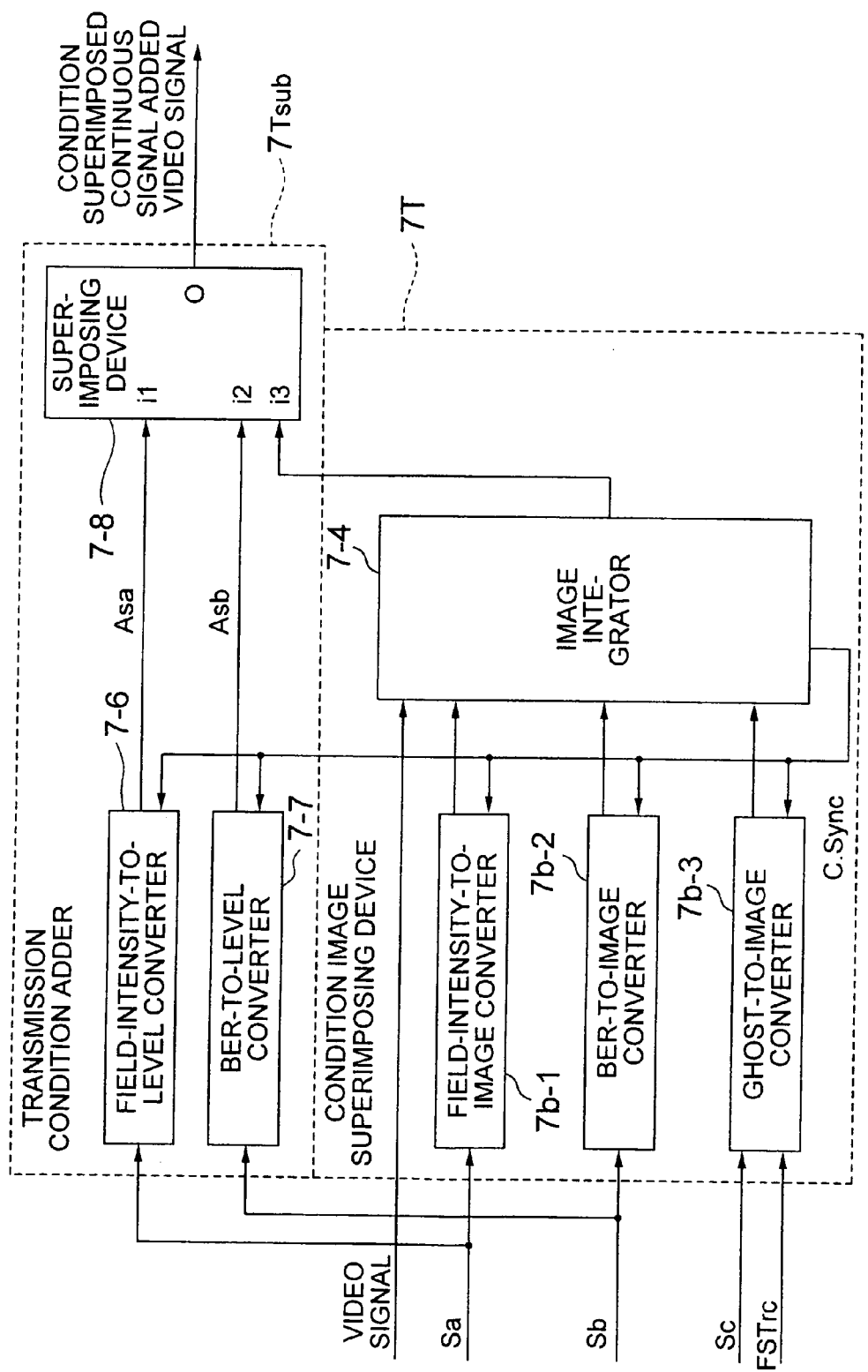
FIG. 68 is a block diagram showing the construction of one example of a transmission-condition image superimposing device and transmission-condition adder according to the invention.

FIG. 68 is a block diagram an example of the construction of the combination of a transmission-condition adder 7Tsub of the invention and the transmission-condition image superimposing device 7T shown in FIGS. 55 and 11. This construction will be described with reference to FIG. 68.

The video signal that serves to carry the information of the transmission conditions at the time of transmission is generated from a video integrator 7b-4 within the transmission-condition image superimposing device 7T, and supplied to the i3 terminal of a superimposing device 7-8 of the transmission-condition adder 7Tsub. A transmission-condition superimposed & continuous signal added video signal is produced from the output terminal O of the superimposing device 7-8.

The field intensity information Sa is supplied to a field-intensity-to-level converter 7-6 of the transmission-condition adder 7Tsub and to a field-intensity-to-image converter 7b-1 of the transmission-condition image superimposing device 7T. The BER information Sb is supplied to a BER-to-level converter 7-7 of the transmission-condition adder 7Tsub and to a BER-to-image converter 7b-2 of the transmission condition image superimposing device 7T.

The synchronizing signal C.Sync from the transmission-condition image superimposing device 7T is supplied to the field-intensity-to-level converter 7-6 and BER-to-level converter 7-7 of the transmission-condition adder 7Tsub. The outputs Asa and Asb from the field-intensity-to-level converter 7-6 and BER-to-level converter 7-7 are supplied to the input terminals i1 and i2 of the superimposing device 7-8, respectively.

The operation of each part will be described. Like elements corresponding to those in FIG. 11 make the same operation, and will not be described in detail.

The field-intensity-to-level converter 7-6 produces, from the input field intensity information Sa, the signal Asa of which the output level (for example, DC value) is changed according to its condition, or field intensity as a field intensity level signal indicative of a field intensity level only during a predetermined period in synchronism with the C.Sync signal.

The BER-to-level converter 7-7 produces, from the input BER information Sb, the signal Asb of which the output level (for example, DC value) is changed according to its condition, or BER as a BER level signal indicative of a BER level only during a predetermined period in synchronism with the C.Sync signal.

The signals Asa and Asb are, specifically shown in FIG. 69, added in part of the non-signal VBL period in order to indicate the field intensity information Sa and BER information Sb by their levels. Specifically, if the level, or amplitude of the signal Asa is large, the field intensity level is high. If the level, or amplitude of the signal Asb is large, the BER is satisfactory.

The superimposing device 7-8 adds the superimposed information signals fed to the input terminals i1, i2 and i3.

Figure 70A:
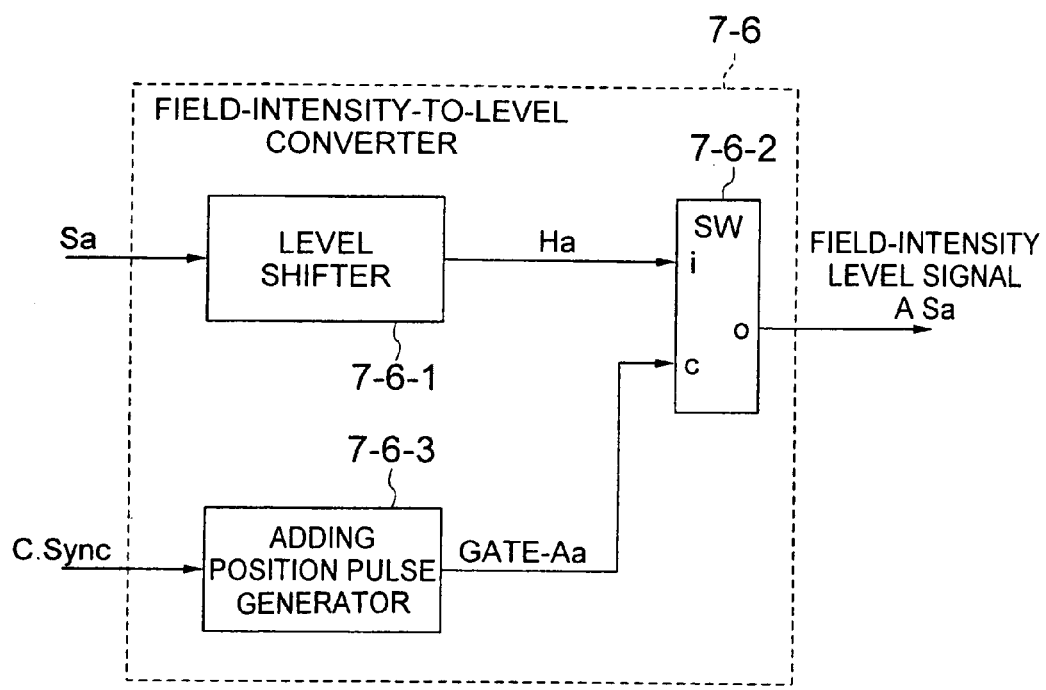
FIG. 70A is a block diagram of a field-intensity-to-level converter 7-6 according to the invention.

FIG. 70A is a block diagram of an embodiment of the field-intensity-to-level converter 7-6. This converter will be described.

The field-intensity information Sa is supplied to a level shifter 7-6-1, and the output Ha from the level shifter 7-6-1 is fed to the terminal i of a gate switch (SW) 7-6-2.

The C.Sync signal is supplied to an addition position pulse generator 7-6-3. The output GATE-Aa from the addition position pulse generator 7-6-3 is fed to the terminal c of the SW 7-6-2.

The operation of this converter will be described. The level shifter 7-6-1 generates the Ha of a DC voltage level that is higher than the pedestal level of the added video signal, and that is proportional to the field-intensity information Sa. The addition position pulse generator 7-6-3 generates, in synchronism with the C.Sync, the GATE-As as a control signal for causing the Ha to be superimposed on a predetermined period.

The SW 7-6-2 produces the signal Ha fed to the terminal i as the field-intensity level signal Asa from the output terminal O according to the status of the control signal GATE-Aa.

Figure 70B:
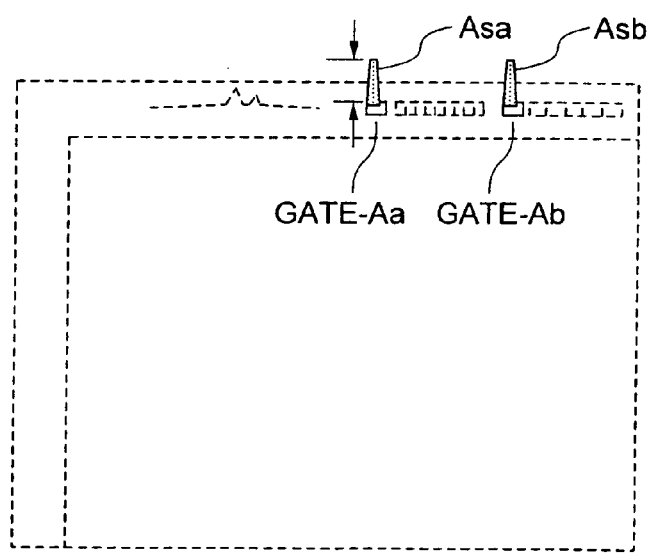
FIG. 70B is a schematic diagram showing one example of the displayed picture.

Thus, the level signal Asa is added to part of the non-signal VBL period as shown in FIG. 70B. The non-signal period can be easily found if it is out of the superimposition timing of the transmission-condition image superimposing device 7T, and thus it is selected to be that period.

Figure 71A:
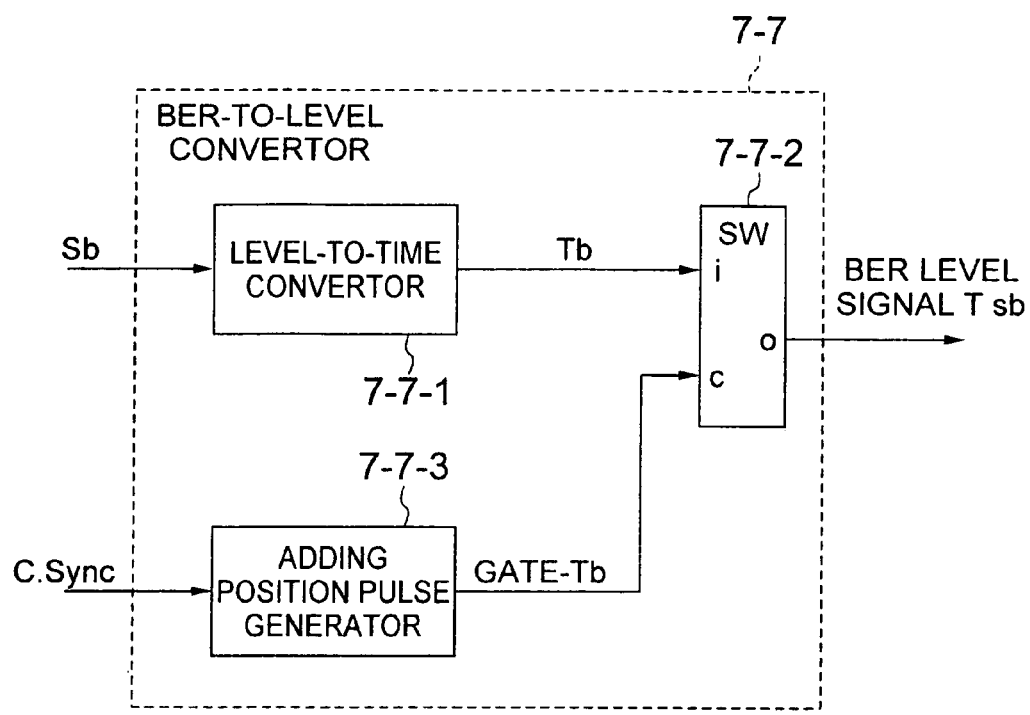
FIG. 71A is a block diagram of a BER-to-level converter 7-7 according to the invention.

FIG. 71A is a block diagram of an embodiment of the BER-to-level converter 7-7 for generating a pulse signal of which the duration is changed according to the BER information.

The BER information Sb is supplied to a level-to-time converter 7-7-1, and the output Tb from the level-to-time converter 7-7-1 is fed to the terminal i of a gate switch (SW) 7-7-2. The synchronizing signal C.Sync is supplied to an addition position pulse generator 7-7-3, and the output GATE-tb from the addition position pulse generator 7-7-3 is fed to the terminal c of the SW 7-7-2.

The operation of this converter will be described in detail. The level-to-time converter 7-7-1 generates the pulse Tb which has a DC voltage higher than the pedestal level of the video signal to which the BER information is added, and of which the duration is changed in proportion to the BER information Sb. The addition position pulse generator 7-7-3 generates, in synchronism with the synchronizing signal C.Sync, the GATE-tb as a control signal for causing the Tb to be superimposed on a predetermined period. This GATE-tb has a width corresponding to the maximum duration that the time pulse Tb can take.

The SW 7-7-2 generates the Tb fed to the input terminal i as the BER level signal Tsb from the output terminal 0 in accordance with the status of the control signal GATE-Tb, or so that the condition of GATE-Tb period length >Tb can be satisfied.

Figure 71B:
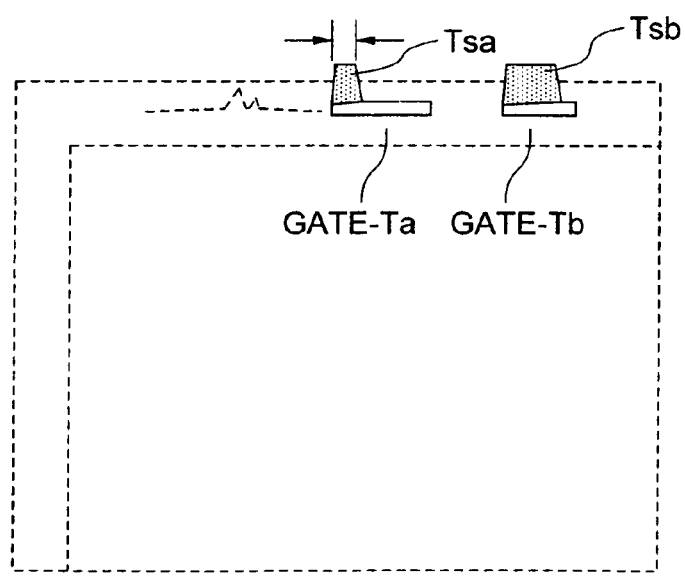
FIG. 71B is a schematic diagram showing one example of the displayed picture.

Thus, the BER level signal Tsb, as shown in FIG. 71B, is added to part of the non-signal VBL period. The non-signal period can be easily found if it is out of the superimposition timing of the transmission image superimposing device 7T, and thus it is selected to be that period.

If the BER status is better, the duration of Tsb becomes longer. If the BER status is worse, the duration of Tsb becomes shorter.

While the above embodiment employs the field-intensity-to-level converter 7-6 for generating the level signal of which the level is changed in accordance with the amplitude level as shown in FIG. 70A, and the BER-to-level converter 7-7 for generating the level signal of which the level is changed in accordance with the duration of the time pulse as shown in FIG. 71A, the level signals to be generated in the converters 7-6 and 7-7 may be changed in the opposite way to the above, or in accordance with the duration and amplitude of the time pulse, respectively. Or both the level signals may be changed in accordance with any one of the duration and amplitude.

In addition, while the field intensity level signal Asa is added to the digitized field intensity information signal Sa left as shown in FIG. 70B, only the field intensity level signal Asa may be superimposed on the video signal as shown in FIG. 71B because both the signals are fundamentally the same field intensity information.

In this case, however, when the superimposed information is extracted on the receiving side, it should be noted that the level or pulse duration indicates the transmission condition.

Figure 72A:
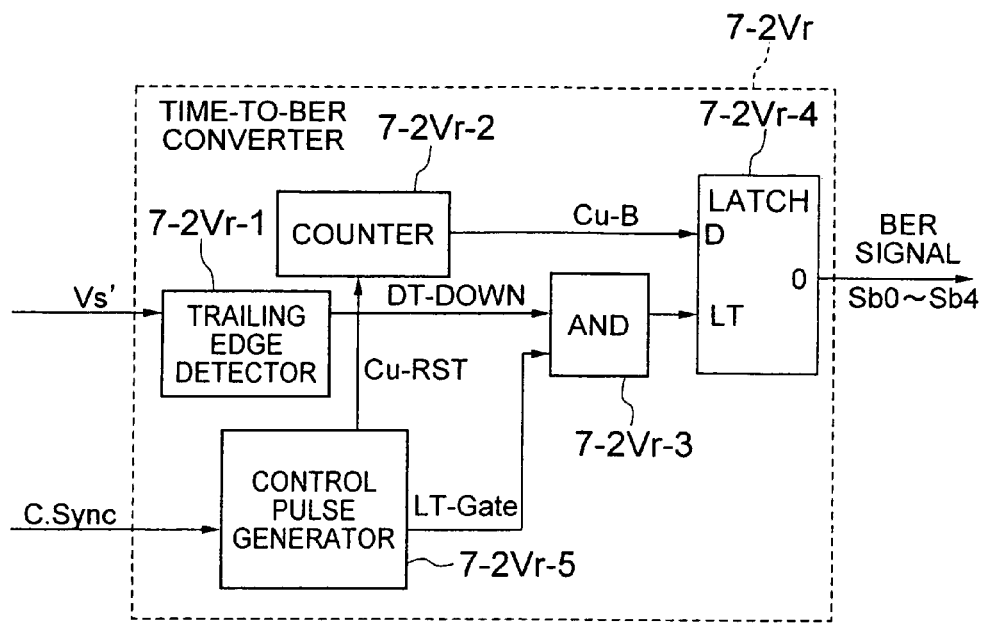
FIG. 72A is a block diagram of a time-to-BER converter 7-2Vr according to the invention.

FIG. 72A is a block diagram showing an example of the construction of the time-to-BER converter 7-2Vr for detecting the pulse duration. This converter will be described. This converter is associated with the superimposed BER extractor & BER-to-image converter 7-2V shown in FIG. 65A.

The video signal Vs' with the field intensity information Tsa and BER information Tsb added is supplied to a trailing-edge detector 7-2Vr-1. The output DT-DOWN from the trailing-edge detector 7-2Vr-1 is supplied to an AND gate 7-2Vr-3. The synchronizing signal C.Sync is fed to a control pulse generator 7-2Vr-5. The output Cu-RST from the generator 7-2Vr-5 is supplied to a counter 7-2Vr-2. The output LT-Gate from the control pulse generator 7-2Vr-5 is supplied to the other input terminal of the AND gate 7-2Vr-3. The output Cu-B from the counter 7-2Vr-2 is fed to a latch 7-2Vr-4. The output from the AND gate 7-2Vr-3 is supplied to the LT-terminal of the latch 7-2Vr-4.

Figure 72B:
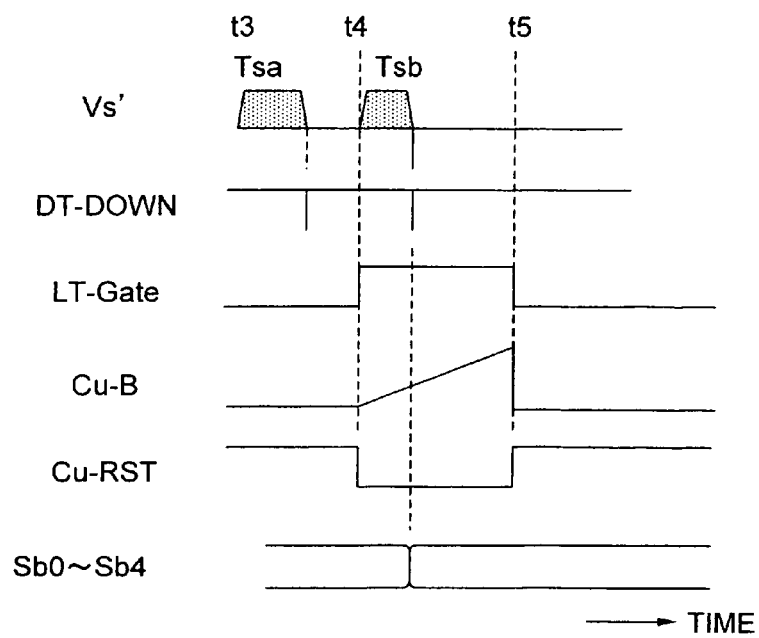
FIG. 72B is a timing chart of signals in the time-to-BER converter 7-2Vr.

The operation of each element of the converter will be described. The trailing-edge detector 7-2Vr-1 detects the trailing edges contained in the information-superimposed video signal Vs'. FIG. 72B shows the waveforms of the signals fed and produced.

The trailing-edge detector 7-2Vr-1 detects the ends of pulse, or trailing edges of signals Tsa and Tsb irrespective of the kind of the tailing edges of the input signal.

The control pulse generator 7-2Vr-5 is responsive to the C.Sync signal to generate the signal LT-Gate that becomes level "High" for the time interval from t4 to t5 in which the Tsb probably exists, and the signal Cu-RST that becomes level "Low" during the same time interval. The AND gate 7-2Vr-3 transmits to the latch 7-2Vr-4 only the leading edge pulse contained within the time interval from t4 to t5. The counter 7-2Vr-2 counts only during that time interval to count up the value with lapse of time. During the other time interval, since the signal Cu-RST is level 0, the counter content remains 0.

Consequently, the latch 7-2Vr-4 holds that counted value just at the instant when the signal Tsb falls off. Thus, the value proportional to the pulse duration of the signal Tsb can be extracted.

While the embodiments described with reference to FIGS. 55 through 72B are related with the transmission of the video signal with the transmission-condition image signals including the ghost image signal being superimposed on the blanking period of the video signal, the present invention can also transmit the transmission-condition image signals by other methods. For example, the transmission-condition image signals can be transmitted, through another separate channel different from the transmission channel using the video signal, from the repeater station 53 to the broadcast station 54 or those image signals can be transmitted by multiplexing with the video signal, for example, time-division multiplexing to the broadcast station 54.

Figure 73:
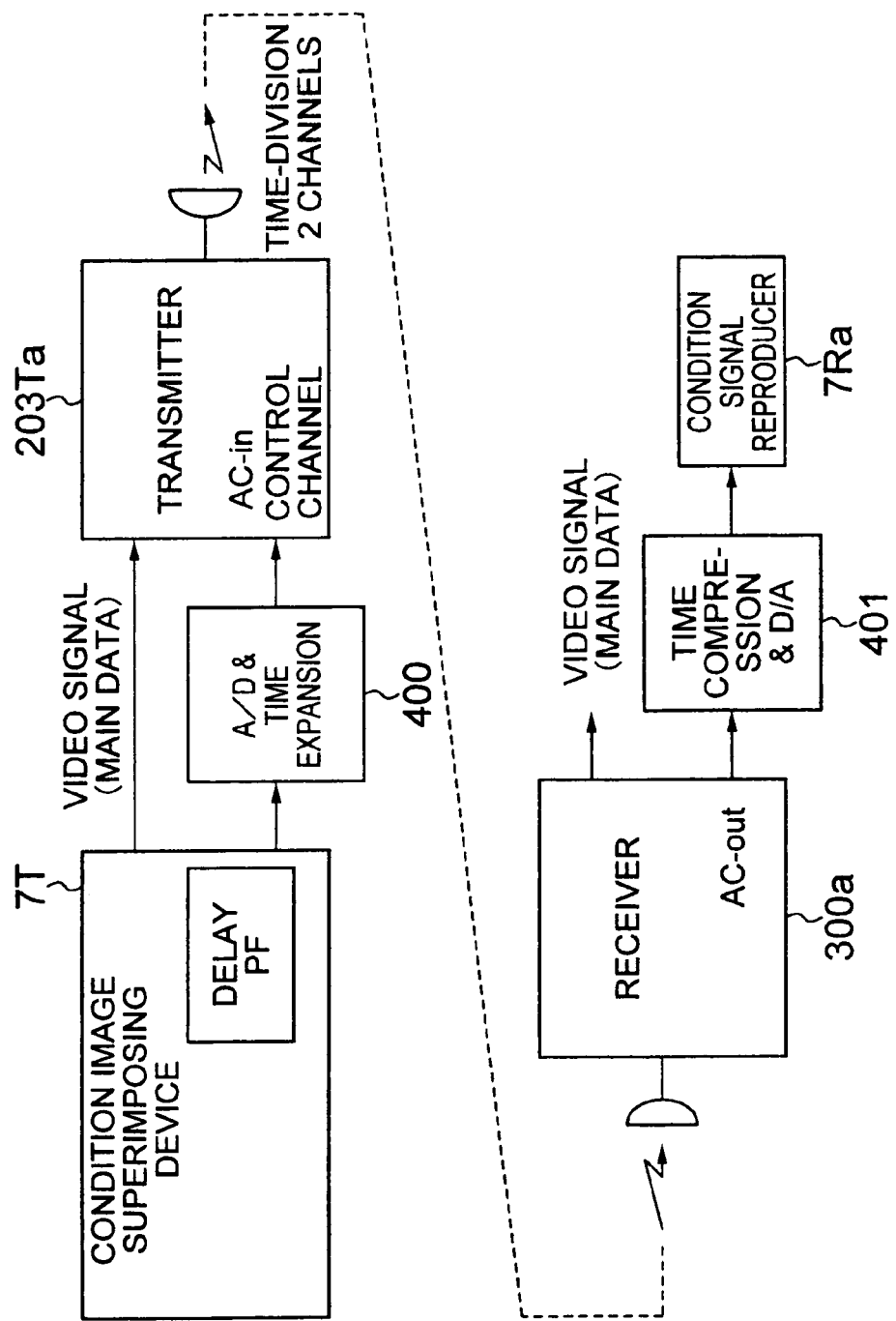
FIG. 73 is a block diagram showing the whole construction of a single-carrier system transmission system of still another embodiment of the invention.

FIG. 73 is a block diagram of one example of the transmission of the video signal as main data and the transmission-condition image signals via separate channels from the relay station to the broadcast station. On the receiving side of the relay station, the transmission-condition image signals of 1 H (a horizontal period) superimposed on the vertical blanking period are converted by an AD converter (not shown) of an AD & time-expansion processor 400 into a digital signal, and the fast digital data of the 1-H signal is further converted by use of a memory (not shown) of the processor 400 to a slow digital signal of one frame period. The next stage, a microwave band FPU (field pickup unit) 203Ta as a digital type video transmitter has the function to transmit the video signal as main data and the function to transmit the other auxiliary data. The converted low-speed digital signal (superimposed transmission-condition image signals) corresponding to 1 H period is supplied to a terminal ACin, as the input terminal for the auxiliary data, of the transmitter 203Ta, and transmitted therefrom to the broadcast station.

On the broadcast station, the low-speed signal (transmission-condition image signals) corresponding to 1 H period reproduced from the terminal ACout of a digital video receiver FPU 300a is fed to a time-compression & DA processor 401, where it is converted by use of a memory back to the fast signal of 1 H period, and further converted back to the analog signal by a DA converter (not shown). This analog signal is supplied to a transmission signal reproducer 7Ra on the studio side.

Thus, according to the embodiments of the invention, since the transmission conditions such as the field intensity, BER and the presence or absence and levels of reflected waves -can be transmitted from the OFDM transmission system to other remote places such as studios, and on the receiving side they can be extracted and displayed, the operator even at other remote places can easily and accurately observe the transmission conditions of signals from mobile communicators such as outside broadcast vans.

What is claimed is:

1. A signal processing unit, to which a demodulated signal and a correlation value signal from a digital signal receiver are supplied, said digital signal receiver receiving a digital signal from a digital transmitter, said digital signal including a plurality of signal units, each of said signal units having a guard interval to reduce multi-path effect, said digital signal receiver demodulating said digital signal and producing said correlation value signal from said demodulated signal, said signal processing unit comprising:

a signal converter, coupled with said digital signal receiver, from which said correlation value signal is supplied, for generating at least a main wave signal level, a ghost imaging signal level corresponding to said correlation value signal, and a guard interval signal corresponding to a period of said guard interval; and a display, coupled with said signal converter, for displaying a main wave corresponding to said main wave signal level and a reflected wave corresponding to said ghost imaging signal level in each horizontal scanning period of said display, and for displaying whether said main wave and said reflected wave are placed within a period of said guard interval signal to indicate a transmission condition of said digital signal from the digital signal transmitter.

2. A signal processing unit according to claim 1, wherein said signal converter further generates a Bit Error Rate (BER) signal indicative of the bit error rate of said digital signal and a field intensity signal indicative of the field intensity of said digital signal, and said display displays said BER signal and said field intensity signal in association with said main wave and said reflected wave.

3. A signal processing unit according to claim 1, wherein said signal converter further generates a time scale signal and said display further displays a time scale based on said time scale signal in association with said main wave and said reflected wave.

4. A signal processing unit according to claim 1, wherein said signal converter further includes an abnormality detecting unit for detecting an abnormality of said digital signal from said correlation value signal and outputting a signal indicative of said abnormality.

5. A signal processing unit according to claim 4, wherein said signal converter further includes a memory unit, in which the signal indicative of said abnormality is stored and said display indicates simultaneously the signal indicative of main wave and said reflected wave.

6. A signal processing unit according to claim 4, wherein said guard interval is so designed to be variable in a time period.

* * * * *